(12) United States Patent
Berman

(10) Patent No.: US 8,625,597 B2
(45) Date of Patent: Jan. 7, 2014

(54) METHODS, SYSTEMS AND APPARATUS FOR THE INTERCONNECTION OF FIBRE CHANNEL OVER ETHERNET DEVICES

(75) Inventor: Stuart B. Berman, Newport Coast, CA (US)

(73) Assignee: Jeda Networks, Inc., Newport Beach, CA (US)

( * ) Notice: Subject to any disclaimer, the term of this patent is extended or adjusted under 35 U.S.C. 154(b) by 114 days.

(21) Appl. No.: 12/987,057

(22) Filed: Jan. 7, 2011

(65) Prior Publication Data

US 2012/0177041 A1 Jul. 12, 2012

(51) Int. Cl.
*H04L 12/28* (2006.01)
*H04L 12/56* (2011.01)

(52) U.S. Cl.
USPC .......................................................... 370/392

(58) Field of Classification Search
None
See application file for complete search history.

(56) References Cited

U.S. PATENT DOCUMENTS

| | | | |
|---|---|---|---|
| 7,149,214 B2 | 12/2006 | Wu et al. |
| 7,155,494 B2 | 12/2006 | Czeiger et al. |
| 7,573,916 B1 | 8/2009 | Bechtolsheim et al. |
| 7,586,915 B1 | 9/2009 | Indiresan et al. |
| 7,606,886 B1 | 10/2009 | Bechtolsheim et al. |
| 7,616,637 B1 | 11/2009 | Lee et al. |
| 7,720,997 B1 | 5/2010 | Gourlay et al. |
| 7,792,148 B2 | 9/2010 | Carlson et al. |
| 7,944,812 B2 | 5/2011 | Carlson et al. |
| 7,969,989 B2 | 6/2011 | Hirata |
| 7,991,907 B2 | 8/2011 | Parnafes et al. |
| 8,006,063 B2 | 8/2011 | Mimatsu et al. |
| 8,060,587 B2 | 11/2011 | Ahmad et al. |
| 8,108,454 B2 | 1/2012 | Snively et al. |
| 8,175,539 B2 | 5/2012 | Diener et al. |
| 8,214,528 B2 | 7/2012 | Hirata et al. |
| 8,238,347 B2 | 8/2012 | DeSanti et al. |
| 8,243,746 B2 | 8/2012 | DiBenedetto |
| 8,264,985 B2 * | 9/2012 | DeSanti ........................ 370/254 |
| 8,270,420 B2 | 9/2012 | Wang et al. |
| 8,284,785 B2 | 10/2012 | Hirata |
| 8,369,347 B2 | 2/2013 | Xiong et al. |
| 2008/0072305 A1 | 3/2008 | Casado et al. |
| 2008/0189769 A1 | 8/2008 | Casado et al. |

(Continued)

OTHER PUBLICATIONS

Das, et al., Unifying Packet and Circuit Switched Networks with OpenFlow, OPENFLOW-TR-2009-4, Dec. 7, 2009, http://OpenFlowSwitch.org/downloads/technicalreports/openflow-tr-2009-4-unification.pdf, abstract, pp. 1-9.

(Continued)

*Primary Examiner* — Ayaz Sheikh
*Assistant Examiner* — Blanche Wong
(74) *Attorney, Agent, or Firm* — David B. Murphy; O'Melveny & Myers LLP

(57) ABSTRACT

Methods, apparatus and systems are provided for forwarding Fibre Channel Initialization Protocol (FIP) frames and Fibre Channel over Ethernet (FCoE) frames by a FCoE device interconnection apparatus (FIA) and with a Fibre Channel over Ethernet device interconnection apparatus controller (FIAC). An FCoE frame received by the FIA from the FCoE device includes at least destination and source Ethernet MAC address fields which are replaced, such as where the destination Ethernet MAC address is replaced by the MAC address assigned to a remote FCoE device, such as the desired end port. The frame is forwarded to the destination FCoE device. Preferably, first and second ports are coupled to the connectivity apparatus, which are then coupled to first and second FCoE devices.

19 Claims, 48 Drawing Sheets

(56) References Cited

U.S. PATENT DOCUMENTS

| | | |
|---|---|---|
| 2008/0195756 A1 | 8/2008 | Galles |
| 2008/0201455 A1 | 8/2008 | Husain |
| 2009/0037977 A1 | 2/2009 | Gai et al. |
| 2009/0046734 A1 | 2/2009 | Cheriton et al. |
| 2009/0052461 A1 | 2/2009 | Brown et al. |
| 2009/0132701 A1 | 5/2009 | Snively |
| 2009/0138577 A1 | 5/2009 | Casado et al. |
| 2009/0161692 A1 | 6/2009 | Hirata et al. |
| 2009/0245791 A1 | 10/2009 | Thaler et al. |
| 2009/0252181 A1 | 10/2009 | Desanti |
| 2009/0276526 A1 | 11/2009 | Carlson et al. |
| 2009/0296726 A1 | 12/2009 | Snively et al. |
| 2010/0011114 A1 | 1/2010 | Thomas et al. |
| 2010/0017497 A1 | 1/2010 | Brown et al. |
| 2010/0115132 A1 | 5/2010 | Hirata et al. |
| 2010/0232419 A1 | 9/2010 | Rivers |
| 2010/0232793 A1 | 9/2010 | Atkinson |
| 2010/0246388 A1 | 9/2010 | Gupta et al. |
| 2010/0257263 A1 | 10/2010 | Casado et al. |
| 2012/0079104 A1 | 3/2012 | Casado et al. |
| 2012/0177039 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0195188 A1 | 8/2012 | Zhang |
| 2013/0028135 A1 | 1/2013 | Berman |

OTHER PUBLICATIONS

Eastlake 3rd, et al., "RBridges: Support of IEEE 802.1Qbb, 802.1Qaz, and 802.1Qau <draft-eastlake-trill-rbridge-dcb-00.txt>", Aug. 17, 2010, 23 pages.

Guttman, et al., "RFC 2608 Service Location Protocol (SLP), Version 2", Jun. 1999, 51 pages.

IEEE Computer Society, "IEEE Std 802.1Q—2005, IEEE Standards for Local and Metropolitan Area Networks—Virtual Bridged Local Area Networks", May 16, 2006, 303 pages.

IEEE Computer Society, "IEEE Standard for Local and metropolitan area networks, Media Access Control (MAC) Security", IEEE Std 802.1AE-2006, Aug. 18, 2006. 154 pages.

IEEE Computer Society, 802.1D, IEEE Standard for Local and metropolitan area networks, Media Access Control (MAC) Bridges, SH95213, Jun. 9, 2004, 281 pages.

IEEE Computer Society, "IEEE Standard for Local and metropolitan area networks—Virtual Bridged Local Area Networks Amendment 10: Provider Backbone Bridge Traffic Engineering", IEEE Std. 802.1 Qay-2009, Aug. 5, 2009, 145 pages.

IEEE Computer Society, "IEEE Standard for Local and metropolitan area networks—Port-Based Network Access Control", LAN/MAN Standards Committee, IEEE Std 802.1X-2001, Jun. 14, 2001 2001, 142 pages.

International Search Report and Written Opinion for PCT/US2011/067643, Mar. 20, 2012, 14 pages.

McKeown et al., "OpenFlow: Enabling Innovation in Campus Networks", Mar. 14, 2008, 6 pages.

Monia et al., "RFC 4172 Ifcp—A Protocol for Internet Fibre Channel Storage Networking", Sep. 2005, 85 pages.

Nicira, "Network Virtualization Platform" http://nicira.com/en/netwOrk-virtualization-platform, printed Jun. 6, 2012, 2 pages.

Nicira, "Nicira Network Virtualization Platform (NVP), Visualize the Network", Product Data Sheet, printed Jun. 6, 2012, pp. 1-2.

Nicira, "It's Time to Virtualize the Network, Network Virtualization for Cloud Data Centers", White Paper, 2012, printed Jun. 6, 2012, 8 pages.

Open Networking Foundation, "Testing-Interop Working Group", Interoperability Event White Paper, Mar. 2012, Version 1.0, pp. 1-20.

Open Networking Foundation, "Software-Defined Networking: The New Norm for Networks", ONF White Paper, Apr. 13, 2012, pp. 1-12.

Open Networking Foundation, "OpenFlow 1.2", Dec. 2011, title page, pp. 1-82.

Open Networking Foundation, "OpenFlow Switch Specification", Version 1.3.0 (Wire Protocol 0x04), Apr. 16, 2012, pp. 1-105.

Open Networking Foundation, "OF-Config 1.1, OpenFlow Management and Configuration Protocol", Document Version .15, 2012, title page, pp. 1-117.

Open Networking Foundation, "OpenFlow Configuration and Management Protocol, OF-Config 1.0", 2012, printed Jun. 6, 2012, pp. 1-73.

Sherwood, et al., "FlowVisor. A Network Virtualization Layer", OPENFLOW-TR-2009-1, Oct. 14, 2009, http://OpenFlowSwitch.org/downloads/technicalreports/openflow-tr-2009-1-flowvisor.pdf., abstract, pp. 1-14.

Simpson, "RFC 1661 The Point-to-Point Protocol (PPP)", Jul. 1994, 54 pages.

Touch, et al., "RFC 5556 RBridges: Base Protocol Specification <draft-ietf-trill-rbridge-protocol-16.txt>", Mar. 3, 2010, 117 pages.

Tseng, et al., "RFC 4171 Internet Storage Name Service (iSNS)", Sep. 2005, 124 pages.

Weber, et al., "RFC 3643 Fibre Channel (FC) Frame Encapsulation", Dec. 2003, 21 pages.

Yap, et al. "Blueprint for Introducing Innovation into the Wireless Networks we use every day", OPENFLOW-TR-2009-3, Oct. 12, 2009, http://OpenFlowSwitch.org/downloads/technicalreports/openflow-tr-2009-3-openflow-wireless.pdf, abstract, pp. 1-7.

Yap, et al., "Separating Authentication, Access and Accounting: A Case Study with Open WiFi", OPENFLOW-TR-2011-1, Jul. 2011, last updated: Sep. 2011, abstract and 6 pages.

* cited by examiner

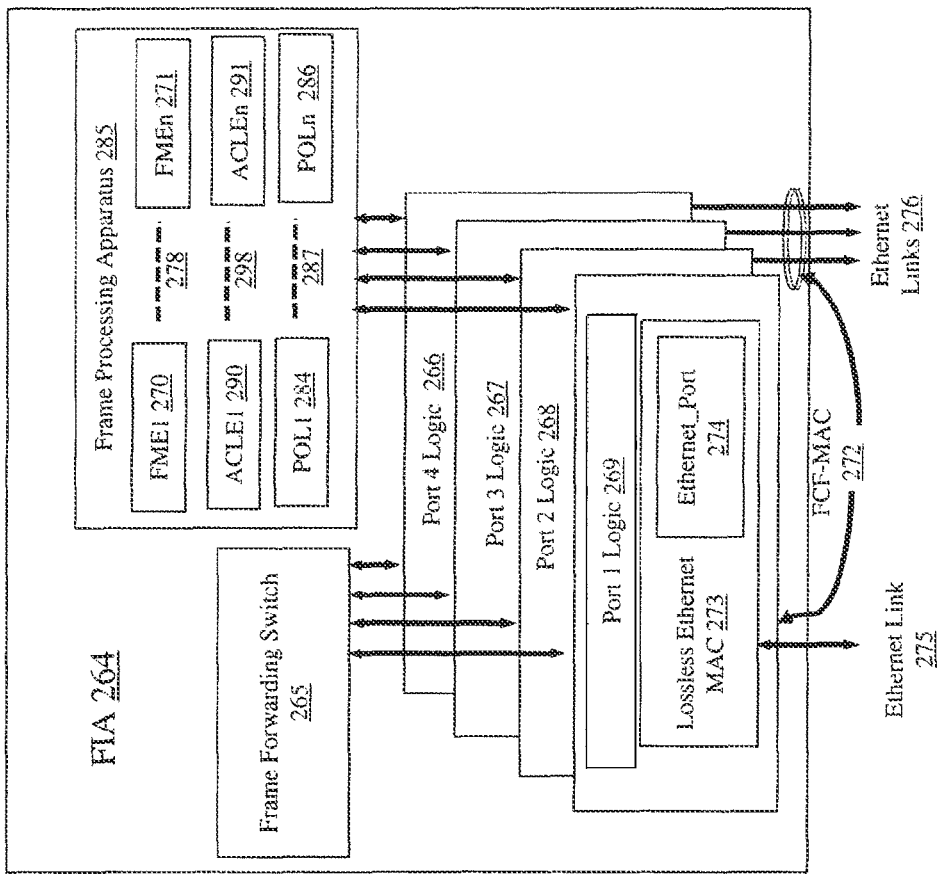
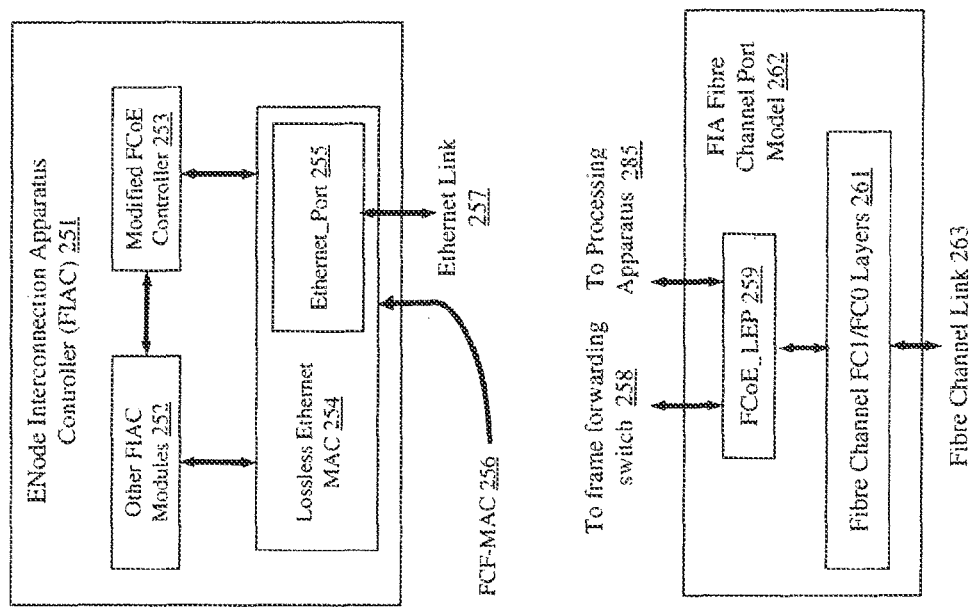
FIG. 8

METHODS, SYSTEMS AND APPARATUS FOR THE INTERCONNECTION OF FIBRE CHANNEL OVER ETHERNET DEVICES

RELATED APPLICATION INFORMATION

This patent application is related in subject matter to United States patent application entitled "Methods, Systems and Apparatus for the Interconnection of Fibre Channel Over Ethernet Devices Using a Fibre Channel Over Ethernet Interconnection Apparatus Controller", filed on even date herewith; United States patent application entitled "Methods, Systems, and Apparatus for the Servicing of Fibre Channel Fabric Login Frames", filed on even date herewith; United States patent application entitled "Methods, Systems and Apparatus for Utilizing an iSNS Server in a Network of Fibre Channel Over Ethernet Devices", filed on even date herewith; United States patent application entitled "Methods, Systems and Apparatus for the Interconnection of Fibre Channel Over Ethernet Devices Using a TRILL Network", filed on even date herewith; United States patent application entitled "Methods, Systems and Apparatus for Converged Network Adapters", filed on even date herewith; and United States patent application entitled "Methods, Systems and Apparatus for the Interconnection of Fibre Channel Over Ethernet Devices Using Shortest Path Bridging", filed on even date herewith; which are all incorporated herein by reference as if fully set forth herein.

FIELD OF THE INVENTION

The disclosures and embodiments of the invention relate to network systems and communications networks, more particularly, certain embodiments of the invention relate to a method and system for Fibre Channel over Ethernet networking, Fibre Channel networking, and IEEE 802.2 frame forwarding.

BACKGROUND OF THE INVENTION

Today they are at least two separate networks found in Data Centers. The more ubiquitous of the networks, the Local Area Network (LAN), is based on the Ethernet protocol and is mainly used for server to server and server to Internet communications. The other network, the Storage Area Network (SAN), is specialized to carry server to storage communications. The Data Center SAN is mainly based on the Fibre Channel protocol and has the following characteristics: low latency, high bandwidth, and a loss-less network. Recently there have been innovations to merge the SAN with the LAN. The promised benefits include a savings from the reduced equipment needs and the resulting savings on the amount of equipment real estate, power, and cooling required. Newly created standards comprising this LAN/SAN convergence define how SAN frames, namely Fibre Channel protocol frames, are mapped over the Ethernet network. These new frames are called Fibre Channel over Ethernet (FCoE) frames. Additional standards define how to make the Ethernet network lossless, i.e., to add flow control at the network level to prevent Ethernet frames from being dropped due to congestion. Still other standards define how to segment the transmission line into classes that virtually separate the communications over the transmission line.

Converging the LAN and SAN networks has created additional complexity in the management, control, and data switching areas. Singly, the Fibre Channel switch fabric protocols are very complex and have shown to be not very interoperable between the small number of vendors who build products that support them. Mapping the Fibre Channel switch fabric protocols over Ethernet has resulted in a dizzying amount of new standards that have inhibited the market acceptance of the Fibre Channel over Ethernet (FCoE) mapping over this new converged network. New switches have been defined called Fibre Channel Forwarders (FCFs) and Fibre Channel Data Forwarders (FDFs), which add Fibre Channel over Ethernet and Ethernet elements to the already complex Fibre Channel switch architecture. FCFs and FDFs interconnect ENodes, which are Fibre Channel or devices nodes that are able to transmit Fibre Channel over Ethernet frames. There have been some standards and innovations applied to ENodes, and their embedded Virtual N_Ports (VN_Ports), to connect without using FCFs or FDFs. One of these efforts defines an ENode to ENode connection method, called VN_Port to VN_Port (VN2VN) whereby ENodes can connect to each other over a Lossless Ethernet network without an FCF or FDF. Other methods have been suggested to move some of the FCF/FDF intelligence to the ENode. Both the emerging VN2VN standard and the emerging direct ENode direct connect methods have many significant disadvantages. These disadvantages include but are not limited to: the requirement for the ENode to choose a unique Media Access Control (MAC) address for each VN_Port, the requirement for the ENode to choose a unique Fibre Channel address identifier for each VN_Port, the lack of visibility into the network's supported maximum frame size or other capabilities, the lack of standardized discovery of specific ENode types such as Storage targets, the lack of the ability to automatically and dynamically create Fibre Channel zones or access control lists (ACLs) for intermediate Ethernet bridges, the lack of visibility to load balance across several paths from a source ENode to a destination ENode based on FCIDs, and the increased complexity to scale to hundreds of ENodes which requires error prone manual configuration. Due to the lack of Fibre Channel fabric control, these emerging ideas and standards target smaller networks of ENodes, which are impractical in today's Data Center.

In parallel with the innovations around converging the LAN and SAN, there have also been a trend to virtualize servers, i.e., consolidate a corporation's many underutilized servers onto fewer more utilized servers. The server virtualization trend has many advantages, including more utilization of existing underutilized servers, lower equipment space, power, and cooling requirements since there are fewer servers. This trend results in fewer and higher utilized servers which have changed the traffic characteristics of the LAN that interconnects them. The traffic requirements which used to be flowing from Internet to Server have changed to an any-to-any server flow. This migration in traffic patterns has produced a trend to "flatten" LANs, i.e., consolidate the normally three layers (core, distribution, and access) of switches commonly found in a Data Center to two layers (core and access). In parallel with this physical flattening trend is the trend towards utilizing layer 2 forwarding methods to keep the network in a single broadcast domain, which helps support any-to-any connection requirements of virtualized servers and their hypervisors. New link level protocols have been defined to accelerate the ability for any to any server based virtual machine communications. Many of these new link level protocols need new switch hardware and new ways to manage the resulting network.

What is needed is a simpler way to converge the LAN and SAN in a scalable and less complex method than the trajectory of both the standards committees and emerging ENode to ENode inventions. What is also needed is have this simpler method be more compatible with the trend towards flattening the large Data Center networks. Both simpler methods need to be easily managed, scalable, and interoperable. Accomplishing this would accelerate the LAN/SAN network convergence trend and accelerate the flattening of the LAN to more easily attain the benefits of virtualization, convergence, and consolidation.

BRIEF SUMMARY OF THE INVENTION

Methods, apparatus and systems are provided for forwarding Fibre Channel Initialization Protocol (FIP) frames and Fibre Channel over Ethernet (FCoE) frames by a FCoE device interconnection apparatus (FIA) and with a Fibre Channel over Ethernet device interconnection apparatus controller (FIAC). In one aspect, a FIP frame is received from a FCoE device by a FIA. The FIP frame includes at least a destination and source Ethernet Media Access Control (MAC) address fields. The received FIP frame is forwarded to a FCoE device interconnection apparatus controller (FIAC) over an Ethernet link. The FCoE frame received by the FIA from the FCoE device includes at least destination and source Ethernet MAC address fields. The destination and source Ethernet MAC addresses are replaced, such as where the destination Ethernet MAC address is replaced by the MAC address assigned to a remote FCoE device, such as the desired end port. Finally, the frame is forwarded to the destination FCoE device. Preferably, first and second ports are coupled to the connectivity apparatus, which are then coupled to first and second FCoE devices.

Methods, apparatus and systems are provided for forwarding Fibre Channel Initialization Protocol (PIP) and Fibre Channel over Ethernet (FCoE) frames by a FCoE device interconnection apparatus (FIA) and a Fibre Channel over Ethernet device interconnection apparatus controller (FIAC). In one aspect of the invention, a command is sent from a FIAC to the FIA to set the frame processing apparatus to identify received FIP frames, which are forwarded with the original destination and source Ethernet Media Access Control (MAC) addresses. A PIP frame received by the FIA is identified and forwarded by the frame processing apparatus. A command is sent from the FIAC to the FIA to identify received FCoE frames, and to have the source and destination Ethernet MAC addresses in said received FCoE frame replaced. When a FCoE frame is received by the FIA, the source and destination Ethernet MAC addresses are replaced, such as where the destination Ethernet MAC address of the received matched FCoE frame is replaced by the MAC address assigned to the desired end port. The FCoE frame is forwarded to a destination FCoE device.

Methods, apparatus and systems are provided for processing Fibre Channel Fabric Login frames by a FCoE device interconnection apparatus (FIA) and a FCoE device interconnection apparatus controller (FIAC). A Fabric Login (FLOGI) Fibre Channel frame is received from a Fibre Channel device at a Fibre Channel device interconnection apparatus (FIA). The FLOGI Fibre Channel frame is encapsulated into a Fibre Channel over Ethernet (FCoE) FIP FLOGI frame at the FIA. The encapsulated frame is transmitted from the FIA to a FCoE device interconnection apparatus controller (PAC). At the FIAC, the FIP FLOGI frame is received and processed. Thereafter, a FIP link service accept (LS_ACC) frame is transmitted by the FIAC to the FIA, and the FIP LS_ACC frame is received by the FIA. The FIP frame is decapsulated into a Fibre Channel LS_ACC frame at the FIA. The Fibre Channel LS_ACC frame is transmitted back to the said Fibre Channel device. Preferably, first and second ports are coupled to the connectivity apparatus and adapted to receive FCoE and FIP frames, which are then coupled to first and second FCoE devices.

Methods, apparatus and systems are provided for assigning Fibre Channel Domain identifiers with an iSNS Server, a Fibre Channel over Ethernet device interconnection apparatus controller (FIAC), and a Fibre Channel over Ethernet device interconnection apparatus (FIA). A Request Domain Identifier iSNS protocol message is sent from a FCoE device interconnection apparatus controller (FIAC) to a iSNS Server. A Request Domain Identifier iSNS protocol message reply is received from the iSNS Server by the FIAC A Fibre Channel Initialization Protocol (FIP) Fabric Login (FLOGI) frame is received from a Fibre Channel over Ethernet (FCoE) device by a FCoE device interconnection apparatus (FIA). The FIP FLOGI frame is forwarded by the FIA. At the FIAC, a new Fibre Channel address identifier is assigned, using the Domain Identifier assigned from the Request Domain Identifier response message. At the FIAC, a FIP link service accept (LS_ACC) response is transmitted to the FIP FLOGI comprising the newly assigned Fibre Channel address identifier at the FIAC. At the FIA, the FIP LS_ACC is received and forwards the FIP LS_ACC frame to the FCoE device that transmitted the FIP FLOGI frame.

Methods, apparatus and systems are provided for forwarding Fibre Channel over Ethernet (FCoE) frames over a TRILL network by a FCoE device interconnection apparatus (FIA). A FCoE frame is received from a FCoE device at the FIA. The frame includes at least destination Ethernet MAC address and source Ethernet MAC address fields. The destination Ethernet MAC address of the incoming frame is replaced with the MAC address of the remote FCoE device as determined by the Fibre Channel destination address identifier in the received. FCoE frame. The source Ethernet MAC address of the incoming frame is replaced. The frame is encapsulated in a TRILL header. The frame is forwarded to an egress FCoE device interconnection apparatus (FIA). The frame is then decapsulated into a FCoE frame, which is forwarded to an attached FCoE device with the original destination and source Ethernet MAC addresses.

Methods, apparatus and systems are provided for creating virtual links between Fibre Channel over Ethernet (FCoE) nodes. FIP Discovery Advertisement frames are received from multiple FCoE device interconnection apparatus (FIA). The FIP Discovery Advertisement frames preferably includes source Ethernet MAC addresses, a destination Ethernet MAC address of All-ENode-MACs, Fabric FP descriptor, and a Priority FIP descriptor. A list is stored of one or more of the source Ethernet MAC address, FIP Priority descriptor, and FIP Fabric descriptor for each unique FIP Discovery Advertisement frame received as indicated by the Fabric descriptor. The Name Server is queried for each source Ethernet MAC address in said storage. For all FCoE devices that match in more that one Name Server, connect to those FCoE devices using the highest priority Ethernet MAC address from matching list items.

Methods, apparatus and systems are provided for forwarding Fibre Channel over Ethernet (FCoE) frames over a Shortest Path Bridged network with a FCoE device interconnection apparatus (FIA). A FCoE frame is received from a FCoE device, the frame including at least destination Ethernet MAC address and source Ethernet MAC address fields. The destination Ethernet MAC address of the incoming frame is replaced with the MAC address of the remote FCoE device as determined by the Fibre Channel destination address identifier in the received FCoE frame. The source Ethernet MAC address of the incoming frame is replaced. The frame is encapsulated in a MAC header. The frame is forwarded to an egress FCoE device interconnection apparatus (FIA). Thereafter, the outer MAC header of the received frame is decapsulated into a FCoE frame. The decapsulated frame is forwarded to an attached FCoE device with the original destination and source Ethernet MAC addresses.

BRIEF DESCRIPTION OF THE DRAWINGS

The drawings illustrate only exemplary embodiments of the invention and therefore do not limit its scope because the inventive concepts lend themselves to other equally effective embodiments.

FIG. 8 is a diagram of a FIA and FIAC Functional Model.

FIG. 11 is a diagram showing the interconnection of Fibre Channel nodes over a TRILL Ethernet Network.

ACRONYMS

Figure 1:
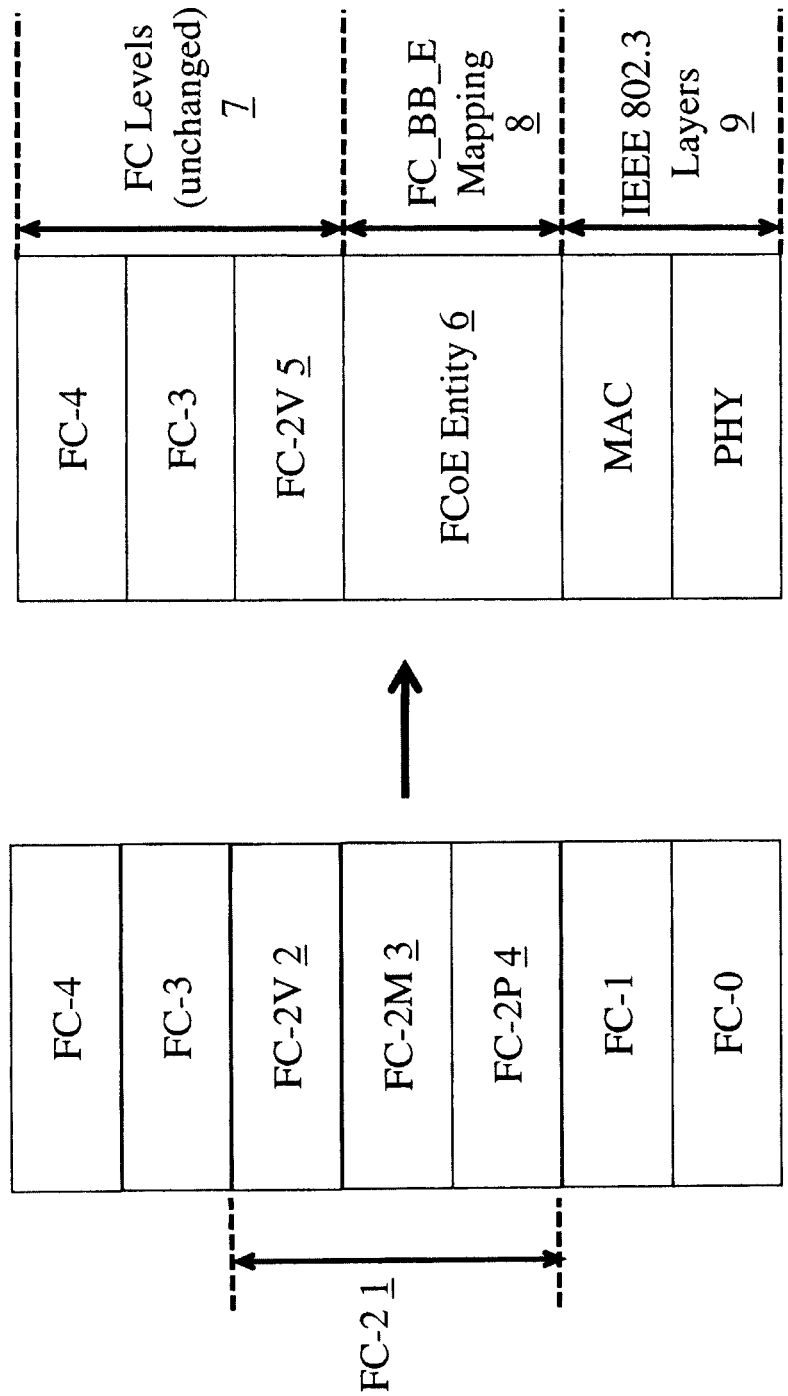
FIG. 1 illustrates the prior art FC-BB_E mapping of Fibre Channel levels and sublevels over IEEE 802.3 layers.

ACE Access Control Entry
ACL Access Control List
ACLE Access Control List Entry
BPDU Bridge PDU
CNA Converged Network Adapter
DA Destination Address
DCB Data Center Bridging
DCBX DCB Exchange protocol
EISS Extended Internal Sublayer Service
ENode FCoE Node
ETS Enhanced Transmission Selection (IEEE 802.1Qaz)
FC-MAP FCoE Mapped Address Prefix
FCF FCoE Forwarder FIA FCoE device and Fibre Channel node interconnection Apparatus
FCF-MAC FCoE Forwarder Media Access Control
FCID Fibre Channel address or port identifier
FCoE Fibre Channel over Ethernet
FCoE Device Another term for ENode
FCoE_LEP FCoE Link Endpoint
FDF FCoE Data Forwarder
Fibre Channel device Another term for Fibre Channel node
FIP FCoE Initialization Protocol
FME Frame Match Entry
FPMA Fabric Provided MAC Address
IEEE Institute of Electrical and Electronics Engineers
IP Internet Protocol
IS-IS Intermediate System to Intermediate System
ISS Internal Sublayer Service
LAN Local Area Network
MAC Media Access Control
PDU Protocol Data Unit
PRY Physical Layer
PPP Point-to-Point Protocol
PFC Priority-based Flow Control (IEEE 802.1Qbb, 802.3bd)
RBridge Routing Bridge
SA Source Address
SNMP Simple Network Management Protocol
SPBM Shortest Path Bridging MAC-in-MAC
SPBV Shortest Path Bridging VLAN
SPF Shortest Path First
SPMA Server Provided MAC Address
TRILL Transparent Interconnection of Lots of Links
VE_Port Virtual E_Port
VF_Port Virtual F_Port
VID VLAN Identifier
VLAN Virtual Local Area Network
VN_Port Virtual N_Port
VRP VLAN Registration Protocol
vSwitch Virtual Switch

CONSTANTS

FIP_TYPE: 8914h The value specified in the Ethernet TYPE field for a FIP PDU
FCoE_TYPE: 8906h The value specified in the Ethernet TYPE field for an FCoE PDU
All-FCoE-MACs: 01-10-18-01-00-00 The group address for all FCoE devices.
All-ENode-MACs: 01-10-18-01-00-01 The group address for all ENodes
DEFAULT_FC-MAP: 0EFC00h The default value for the FC-MAP field in a FIP FC-MAP descriptor Definitions Access control lists (ACL): are comprised of Access Control Entries (ACE), allow network managers to define classification actions and rules for specific ports. Frames entering the port, with an active ACL, are either admitted or denied entry.

Address or Port identifier: An address value used to identify source (S_ID) or destination (D_ID) of a frame.

Converged Network Adapter (CNA): is a technology that supports data networking (TCP/IP) and storage networking (Fibre Channel) traffic on a single I/O adapter. CNAs support both Enhanced Ethernet and Fibre Channel over Ethernet (FCoE).

Discovery Domains (DD): are a security and management mechanism used to administer access and connectivity to devices.

Discovery Domain Set (DDS): is a container object for Discovery Domains (DDs). DDSs may contain one or more DDs. Similarly, each DD can be a member of one or more DDSs. DDSs are a mechanism to store coordinated sets of DD mappings.

Domain Identifier: Bits 23 through 16 of an address identifier.

E_Port: A Fabric "Expansion" Port that attaches to another Interconnect_Port to create an Inter-Switch Link. An E_Port is the combination of one PE_Port and one VE_Port operating together Encapsulated FC frame: An SOF/EOF delimited FC frame prefixed with a 28-byte FC frame Encapsulation Header (see RFC 3643).

ENode: An FCoE Node, a Fiber Channel node (see FC-FS-3) that is able to transmit FCoE frames using one or more ENode MACs. The term ENode and FCoE device is used interchangeably.

ENode MAC: A Lossless Ethernet MAC coupled with an FCoE Controller in an ENode.

ENode MAC address: The MAC address used by the FCoE Controller on an ENode MAC for the FCoE Initialization Protocol (FIP).

Fabric: As defined in FC-FS-3 an entity that interconnects various Nx_Ports attached to it, and is capable of routing frames using only the D_ID information in an FC-2 frame header.

Fabric_Name: the Fabric_Name (see FC-FS-3) identifying the Fabric.

Fabric Provided MAC Address (FPMA): A MAC address that is assigned by an FCF to a single ENode MAC, and is not assigned to any other MAC within the same Ethernet VLAN. A Fabric Provided MAC Address is associated with a single VN_Port at that ENode MAC.

FC-BB_E: a protocol mapping defined in order to transport Fibre Channel over a Lossless Ethernet network.

FCF (FCoE Forwarder): A Fibre Channel Switching Element (see FC-SW-5) that is able to forward FCoE frames across one or more FCF-MACs, and that optionally includes one or more Lossless Ethernet bridging elements and/or a Fibre Channel Fabric interface.

FCF-MAC: A Lossless Ethernet MAC coupled with an FCoE Controller in an FCF. In the context of the invention, FCF-MAC also refers to a Lossless Ethernet MAC coupled to a modified FCoE Controller in a FCoE device interconnection apparatus controller (FIAC), FCF-MAC address: The MAC address of an FCF-MAC.

FC-MAP (Mapped Address Prefix): In a Fabric Provided MAC Address, the required value for the upper 24 bits of a MAC address assigned to a VN_Port.

FCoE Controller: A functional entity, coupled with a Lossless Ethernet MAC, instantiating and de-instantiating VE_Ports, VF_Ports, VN_Ports, and/or FCoE_LEPs.

FCoE Device: a term used interchangeable with an ENode

FCoE Device Interconnection Apparatus (FIA): an apparatus that interconnects one or more of the following: ENodes, Fibre Channel nodes, FCF, and FDF's. A FIA is capable of substituting source and destination Ethernet addresses and capable of inspecting the Fibre Channel destination address identifier in received FCoE frames. A FIA is also capable of communicating with one or more FIACs. The FCoE Device Interconnection Apparatus (FIA) is a term used interchangeably with ENode and Fibre Channel node interconnection apparatus and FCoE Device and Fibre Channel node interconnection apparatus.

FCoE Device Interconnection Apparatus Controller (FIAC): An ENode and Fibre Channel interconnection apparatus controller. The FIAC includes a modified FCoE Controller and a FCF-MAC. The modified FCoE controller is capable of receiving and processing certain FIP and FCoE frames from ENodes and Fibre Channel Nodes and capable of transmitting certain FIP and FCoE frames to ENodes and Fibre Channel Nodes. The FIAC communicates with FIA's and optionally other FIACs.

FCoE Entity: The interface, containing one or more FCoE_LEPs, between a VN_Port, a VF_Port, or a VE_Port, and a Lossless Ethernet MAC.

FCoE frame: An Ethernet frame (see IEEE 802.3-2008) that contains an FCoE PDU

FCoE_LEP (FCoE Link End-Point): The data forwarding component of an FCoE Entity that handles FC frame encapsulation/decapsulation, and transmission/reception of encapsulated frames through a single Virtual Link.

FCoE PDU: A PDU identified by the FCoE Ethernet Type that encapsulates a byte-encoded FC frame.

FDF (FCoE Data Forwarder): a Fibre Channel Switching Element (see FC-SW-5) that is able to forward FCoE frames across on or more FCF-MACs, and that optionally includes one or more Lossless Ethernet bridging elements. A FDF includes a subset of FCF features, most notably routing and zoning. A FDF is controlled by a FCF.

FIP frame: An Ethernet frame (see IEEE 802.3-2008) containing a FCoE initialization Protocol (FIP) PDU.

FIP PDU: A PDU identified by the FIP Ethernet Type that encapsulates one or more FIP operations FLOGI: Fabric Login ELS (see FC-LS-2).

Frame Match Entry (FME): A FME is send from a FIAC Controller to a FIA. The FME consists of match fields, counters, and actions. The match fields are applied against an incoming frame. The match fields consist of the ingress port and frame headers. The actions include instructions on how to handle the incoming frame and the counters are statistics tables.

F_Port: A port by which non-loop N_Ports are attached to a Fabric. Does not include FL_Ports (see FC-SW-5 and FC-FS-3).

F_Port_Name: A Name_Identifier that identifies an F_Port Inter-Switch Link (ISL): A Link directly connecting the E_Port of one Switch to the E_Port of another Switch.

Lossless Ethernet bridging element: An Ethernet bridging function operating across Lossless Ethernet MACs.

Lossless Ethernet MAC: A full duplex Ethernet MAC implementing extensions to avoid Ethernet frame loss due to congestion (e.g., the PAUSE mechanism (see IEEE 802.3-2008) or the Priority-based Flow Control mechanism (see IEEE 802.1Qbb).

LS_ACC: Link Service Accept (see FC-LS-2).

Lossless Ethernet network: An Ethernet network composed only of full duplex links, Lossless Ethernet MACs, and Lossless Ethernet bridging elements.

LS_RJT: Link Service Reject (see FC-LS-2).

Name_Identifier: is used to identify entities in Fibre Channel such as a VN_Port, N_Port, node, VF_Port, F_Port, Fabric or other Fibre Channel objects, The Name_Identifier for an entity shall be unique within the Fibre Channel interaction space.

Multicast MAC address: A MAC address associated with a group of logically related Ethernet stations on an Ethernet network and called a Multicast-Group Address in IEEE 802.3-2008.

PE_Port (Physical E_Port): The LCF within the Fabric that attaches to another PE_Port through a native FC link (see FC-SW-5).

PF_Port (Physical F_Port): The LCF within the Fabric that attaches to a PN_Port through a native FC link (see FC-SW-5).

PN_Port (Physical N_Port): An LCF that supports only VN_Ports (see FC-FS-3)

Name_Identifier: A value with a specified size and format used to identify a Fibre Channel Entity.

Node Name: A Name_Identifier associated with a node (see FC-FS-3).

N_Port: A device port that generates/terminates FC-4 channel traffic.

N_Port_Name: A Name_Identifier that identifies an N_Port.

Path selection: Path Selection is the process by which a Switch determines the best path from a source domain to a destination domain. These paths may then be used in any appropriate manner by the Switch to move frames to their destinations. This path selection process does not require nor preclude the use of static or dynamic load-balancing. The standard defines the Fabric Shortest Path First (FSPF) protocol.

PLOGI: N_Port Login (see FC-LS-2).

Router: a device that performs forwarding of IP (L3) packets, based on L3 addressing and forwarding information. Routers forward packets from one L2 broadcast domain to another (one, or more in the IP multicast case)—distinct—L2 broadcast domain(s). A router terminates an L2 broadcast domain.

Server Provided MAC Address (SPMA): A MAC address that is assigned by an ENode to a single one of its ENode MACs, and is not assigned to any other MAC within the same Ethernet VLAN. A Server Provided MAC Address may be associated with more than one VN_Port at that ENode MAC.

Switch_Name: A Name_Identifier that identifies a Switch or a Bridge device. The format of the name is specified in FC-FS-3. Each Switch and Bridge device shall provide a unique Switch_Name within the Fabric.

Unicast MAC address: A MAC address associated with a particular Ethernet station on an Ethernet network and called an Individual Address in IEEE 802.3-2008.

Virtual Switch: is a software program that allows one virtual machine (VM) to communicate with another virtual machine (VM). A virtual machine can intelligently direct communication on the network by inspecting packets before passing them on.

VF_ID: the VF_ID (see FC-FS-3) associated with a Fabric.

VF_Port (Virtual F_Port): An instance of the FC-2V sublevel of Fibre Channel that communicates with one or more VN_Ports (see FC-SW-5) and that is dynamically instantiated on successful completion of a FIP FLOGI Exchange.

VF_Port/FCoE_LEP pair: A VF_Port and one of its associated FCoE_LEPs.

VF_Port/FCoE_LEP pair: A VN_Port and its associated FCoE_LEP.

Virtual Link: The logical link connecting two FCoE_LEPs.

VN_Port (Virtual N_Port): An instance of the FC-2V sublevel of Fibre Channel that operates as an N_Port (see FC-FS-3) and is dynamically instantiated on successful completion of a FIP FLOGI or FIP NPIV FDISC Exchange.

VN_Port MAC address: The MAC address used by an ENode for a particular VN_Port.

Zone: A group of Zone Members. Members of a Zone are made aware of each other, but not made aware of Zone Members outside the Zone.

Zone Definition: The parameters that define a Zone.

Zone Member: The specification of a device to be included in a Zone.

DETAILED DESCRIPTION OF THE INVENTION

Figure 2:
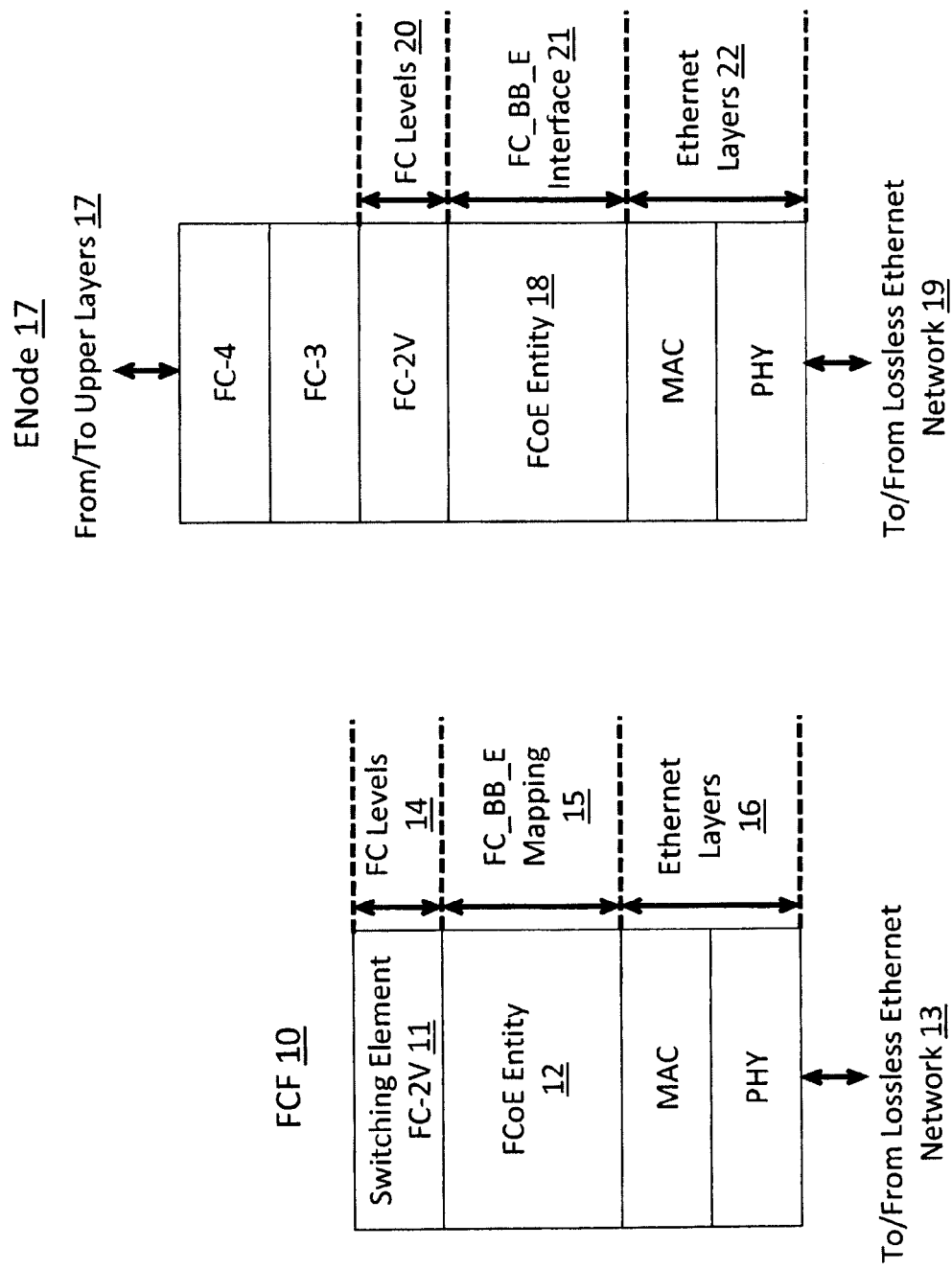
FIG. 2 shows the prior art FC-BB_E definition of end devices, an ENode and a FCoE Forwarder (FCF).

FIGS. 1 through 7 and 39 through 41 describe prior art designs, the understanding of which are useful to understand the inventions disclosed and claimed herein. The FC-BB_E model defines the structured operation by which Fibre Channel frames are transported over a Lossless Ethernet network. FC-BB_E protocol mapping is referred to as Fibre Channel over Ethernet (FCoE). FIG. 1 illustrates the FC-BB_E mapping 8 of Fibre Channel levels and sublevels over IEEE 802.3 layers 9. Fibre Channel FC-2 1 sublevels, FC-2M 3 and FC-2P 4, are mapped into the FCoE Entity 6 which is defined by the FC_BB_E mapping 8. Higher Fibre Channel levels 7 remain unchanged. FIG. 2 shows FC-BB_E definition of end devices, an ENode 17 and a FCoE Forwarder (FCF) 10. ENodes 17 are Fibre Channel nodes (see FC-FS-3) that are able to transport Fibre Channel over Lossless Ethernet 19. FCFs 10 are Fibre Channel. Switching Elements (see FC-SW-5) that are able to transport Fibre Channel over Lossless Ethernet 13.

Figure 3:
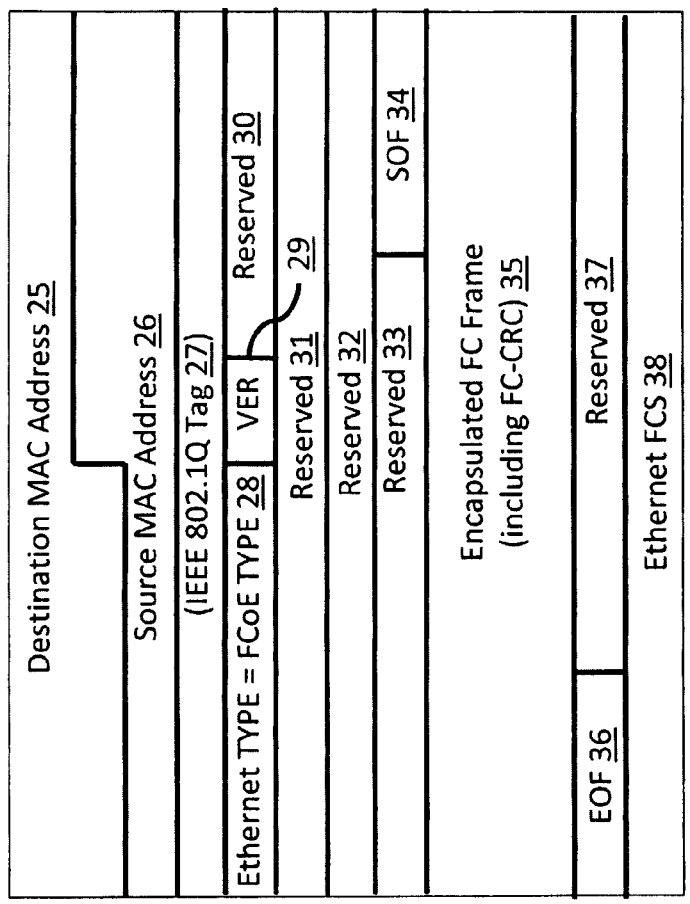
FIG. 3 is a diagram showing the prior art FCoE frame format.

FIG. 3 is a diagram showing the FCoE frame format. FCoE is encapsulated over Ethernet with the use of a dedicated Ethertype 0x8906 referred in FIG. 3 as FCoE_TYPE 28. The Ethernet header includes a source 26 and destination 25 MAC address (6 bytes each) and an optional IEEE 802.1Q Virtual LAN (VLAN) tag 27. A single 4-bit field (version 29) satisfies the IEEE sub-type requirements. The SOF (start of frame) 34 and EOF (end of frame) 36 are encoded as specified in RFC 3643. Reserved bits 30 31 32 33 37 are present to guarantee that the FCoE frame meets the minimum length requirement of Ethernet. Inside the encapsulated Fibre Channel frame 35, the frame header is retained so as to allow connecting to a storage network by passing on the Fibre Channel frame directly after de-encapsulation. An Ethernet trailer 38 consists of a Frame Check Sequence (FCS). This is where the Cyclic Redundancy Check (CRC) value is held that will be used to confirm that the frame has not been corrupted when it reaches its destination.

Figure 4:
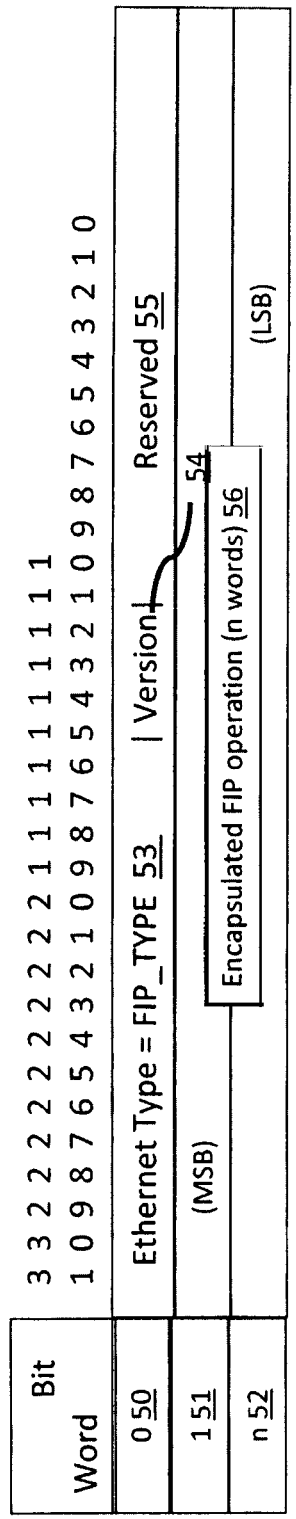
FIG. 4 illustrates the prior art FTP frame PDU format.
Figure 5:
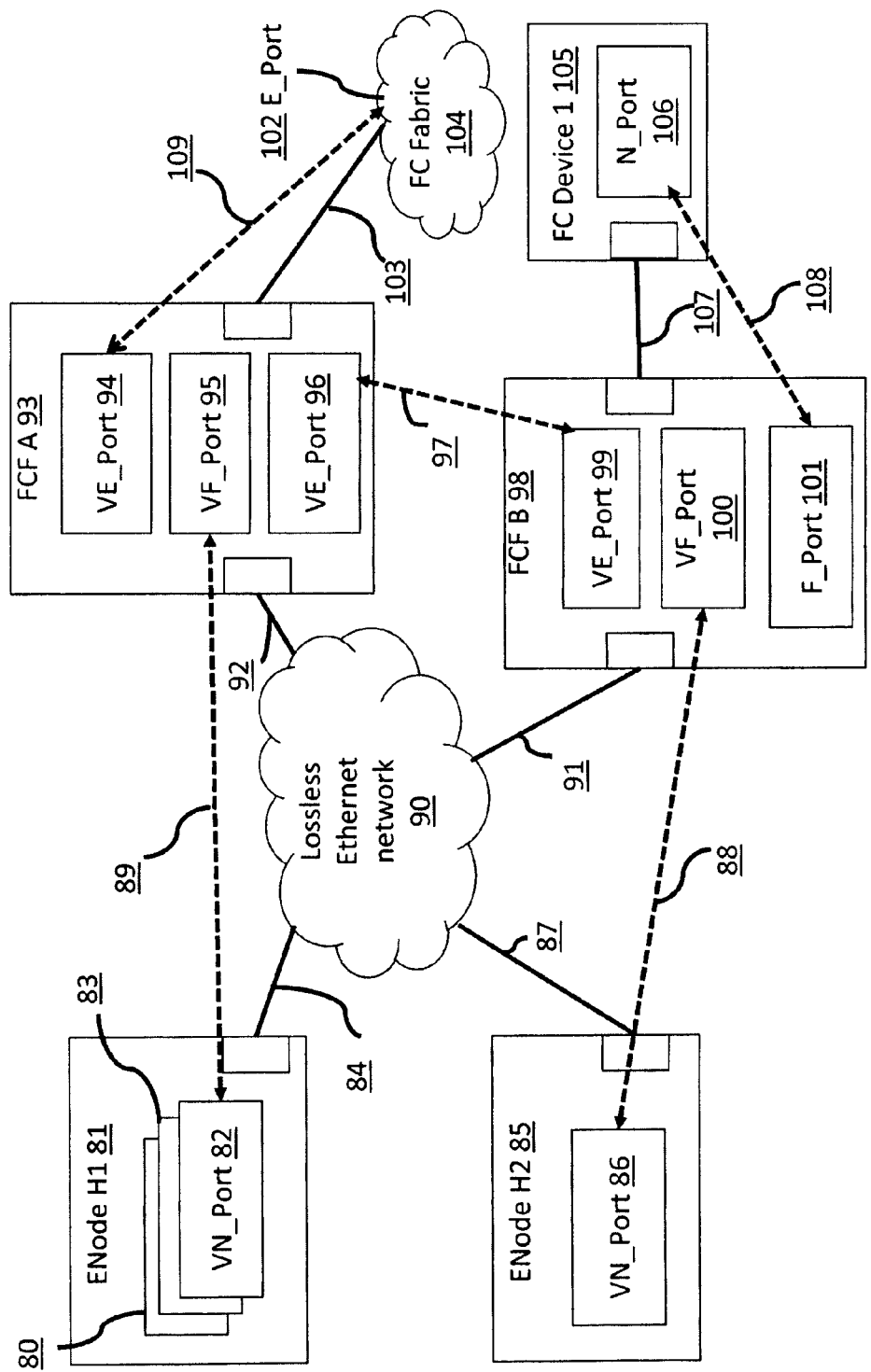
FIG. 5 is a diagram illustrating the prior art ENode and FCF connection model.

The FCoE Initialization Protocol (FIP) is used to perform the functions of FC-BB_E device discovery, initialization, and maintenance. A new Ethernet TYPE frame is specified, different from the FCoE Ethernet TYPE to enable the distinction of discovery, initialization, and maintenance traffic from other FCoE traffic. FIG. 4 illustrates the FIP frame PDU format 50 51 52, which consists of the FIP_TYPE 53 Ethernet TYPE, Version 54, and the rest of the encapsulated frame 56. FIG. 5 is a diagram illustrating the ENode and FCF connection model. The model illustrates FCoE VN_Port to VF_Port 88 89, VE_Port to VE_Port 97, VE_Port 94 to E_Port 102, and FCF F_Port 101 to N_Port 108 virtual links. Physical links numbered 84 87 91 and 92 are Ethernet links, physical links numbered 103 and 107 are Fibre Channel links. The VE_Port to VE_Port virtual connection 97 is an instance of the FC-2V sublevel, see FIG. 6 118 of Fibre Channel that operates as an E_Port in accordance with FC-SW-5 (T11 Fibre Channel Switch) and is dynamically instantiated together with its FCoE_LEP, see FIG. 6 119 on successful completion of a FIP ELP Exchange. Inter-Switch Links (ISLs) 97 are used by FCFs to transmit and receive frames with other FCFs or switches or Bridge devices. An ISL always connects exactly one E_Port or VE_Port on a Switch to exactly one E_port or VE_Port on another Switch or exactly one B_Port on a Bridge device. ENode H1 81 and ENode H2 85 have a single physical Ethernet connection 84 87 to the Lossless Ethernet network 90, while Fibre Channel Device 1 105 has a single physical Fibre Channel connection 107 to the FCF F_Port 101 in FCF B 98. FCF A 93 and FCF B 98 also have single physical Ethernet connections 91 92 to the Lossless Ethernet network 90. Each ENode 81 85 may instantiate multiple VN_Ports 80 82 83. As illustrated, the FCF inherits much of the functions and complexity of a Fibre Channel switch (i.e., from FC-SW and FC-GS). FCF A 93 VE_Port 96 to FCF B 98 VE_Port 99 Interswitch Link (ISL) 97 and FCF E_Port 94 to Switch Fabric 104 E_Port 109 Interswitch link (ISL) 109 are still preserved. VE_Port operation specifies the tools and methods for interconnection and initialization of FCFs 93 98 to create a multi-Switch Fabric. FCF VE_Port operation defines how ports discover and self-configure for their appropriate operating mode. Once a port establishes connection to another FCF and/or Fibre Channel Switch and is operating as a VE_Port 94 96 99, an address assignment algorithm is executed to allocate port addresses throughout the Fabric and the FSPF Fibre Channel based routing algorithm is executed.

Figure 6:
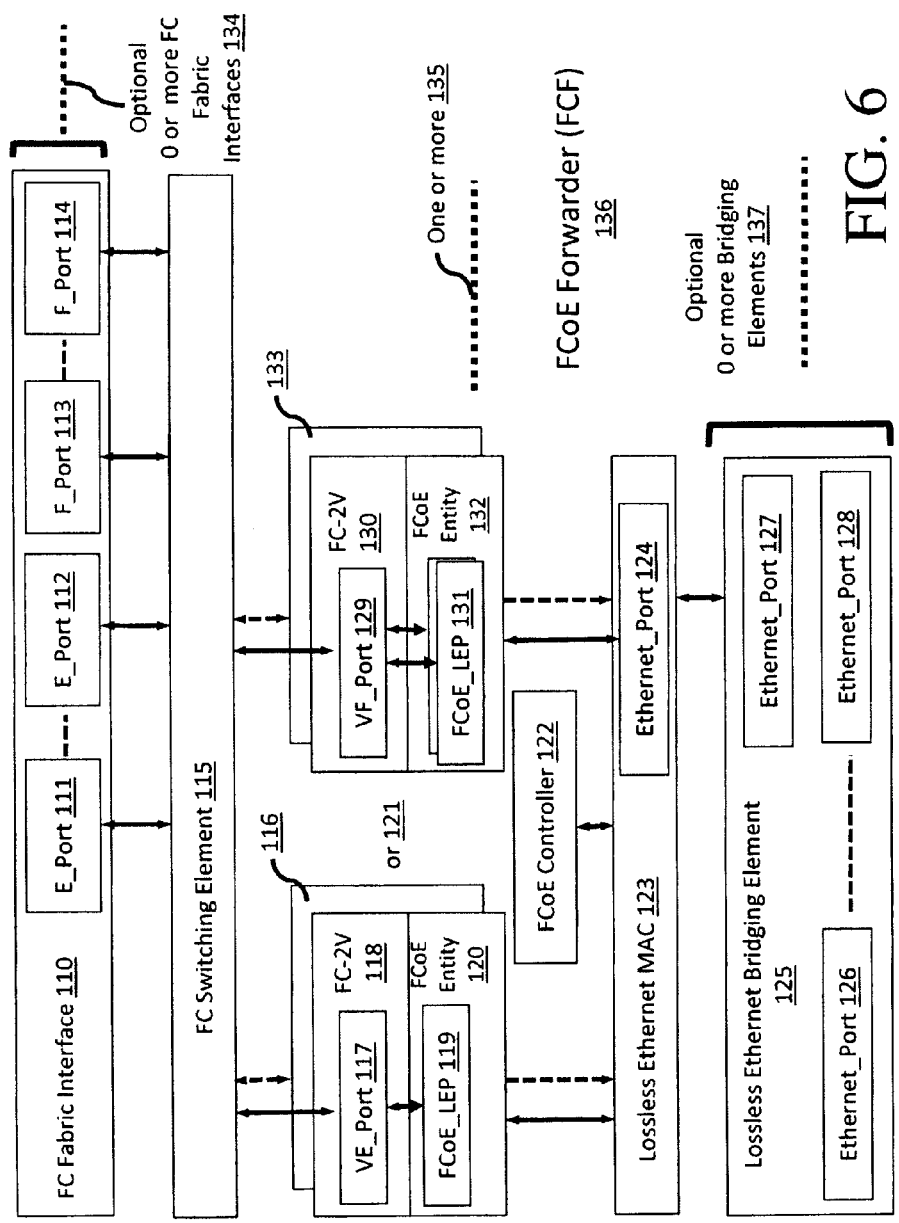
FIG. 6 is a diagram of a prior art FCF functional model.

FIG. 6 is a diagram of a FCF functional model. The bracketed function components 134 137, the Lossless Ethernet Bridging Element 125, and the FC Fabric interface 110 are optional. An FCF 136 is functionally composed of a Fibre Channel (FC) Switching Element 115 (see FC-SW-5) with at least one Lossless Ethernet MAC 123 (FCF-MAC address). The FC Switching Element 115 is composed of the following: Path Selector, Router, Switch Construct, Address Manager, and the Fabric Controller. The Router is a logical entity that performs the routing of Class F, Class 2, and Class 3 frames to their final destination. The Path Selector is a logical entity that establishes frame routing paths. Path Selection is the process by which a Switch determines the best path from a source domain to a destination domain using all or part of Fibre Channel address identifiers. The FC-SW-5 standard defines the Fabric Shortest Path First (FSPF) protocol for Path Selection. Each FCF-MAC 123 is coupled with an FCoE Controller 122 function. Each FCF-MAC may be optionally coupled with a Fibre Channel Fabric interface 110, providing native E_Port 111 112 or F_Port 113 114 connectivity. An FCF 136 forwards FCoE frames addressed to one of its FCF-MACs based on the D_ID of the encapsulated FC frames. When an FCF includes Lossless Ethernet bridging elements 125, an FCF-MAC address may be used by multiple Ethernet ports 126 128 of the FCF. The FCoE Controller 122 associated with an FCF-MAC shall support the instantiation of VE_Port/FCoE_LEP pairs 117 119 or VF_Port/FCoE_LEP pairs 129 131. An FCF-MAC supporting the instantiation of VF_Port/FCoE_LEP pairs is referred to as a VF_Port 129 capable FCF-MAC. A VE_Port 117 receives FC frames from the FC Switching Element 115 and sends them to its FCoE_LEP 119 for encapsulation and transmission over the Lossless Ethernet network. In a similar way, a VE_Port 117 sends FC frames received from its FCoE_LEP 119 to the FC Switching element 115. A VE_Port 117 is uniquely identified by an E_Port_Name Name_Identifier and is addressed by the Fabric Controller address identifier (i.e., FFFFFDh). The VE_Port 117 behavior is specified in FC-SW-5, with the exception that a VE_Port is instantiated on successful completion of a FIP ELP Exchange, ignoring the buffer-to-buffer flow control parameters, rather than on completion of a native ELP Exchange. Similarly, a VF_Port 129 is an instance of the FC-2V 130 sublevel of Fibre Channel that operates as an F_Port in accordance with PC-SW-5 and is dynamically instantiated together with its FCoE_LEP 131 on successful completion of a FIP FLOGI Exchange. A VF_Port 129 receives FC frames from the FC Switching Element 115 and sends them to the proper FCoE_LEP 131 for encapsulation and transmission over the Lossless Ethernet network. In a similar way, a VF_Port sends FC frames received from one of its FCoE_LEPs 131 to the Fibre Channel Switching element 115. A VF_Port 129 is uniquely identified by an F_Port_Name Name_Identifier and is addressed by the F_Port Controller address identifier (i.e., FFFFFEh). The VF_Port behavior is be specified in FC-LS-2 and FC-LS-3, with the exception that a VF_Port is instantiated on successful completion of a FIP FLOGI Exchange, ignoring the buffer-to-buffer flow control parameters, rather than on completion of a native FLOGI Exchange.

The FC/FCoE Data Forwarder (FDF) is in the process of being defined by the T11 standards committee. The FDF is fully controlled by a controlling FCF and operates according to the information that FCFs sends to FDFs. The controlling FCF assigns addresses, computes the routes, and distributes addresses and routes to its FDFs. A FDF does not need to compute routes. FDFs instantiate VF_Ports and VA_Ports, VA_Ports being the FCF to FDF or FDF to FCF links. FDFs have a similar architecture to FCFs, VF Ports and VE_Ports interconnected by a Fibre Channel switching element 115.

Figure 7:
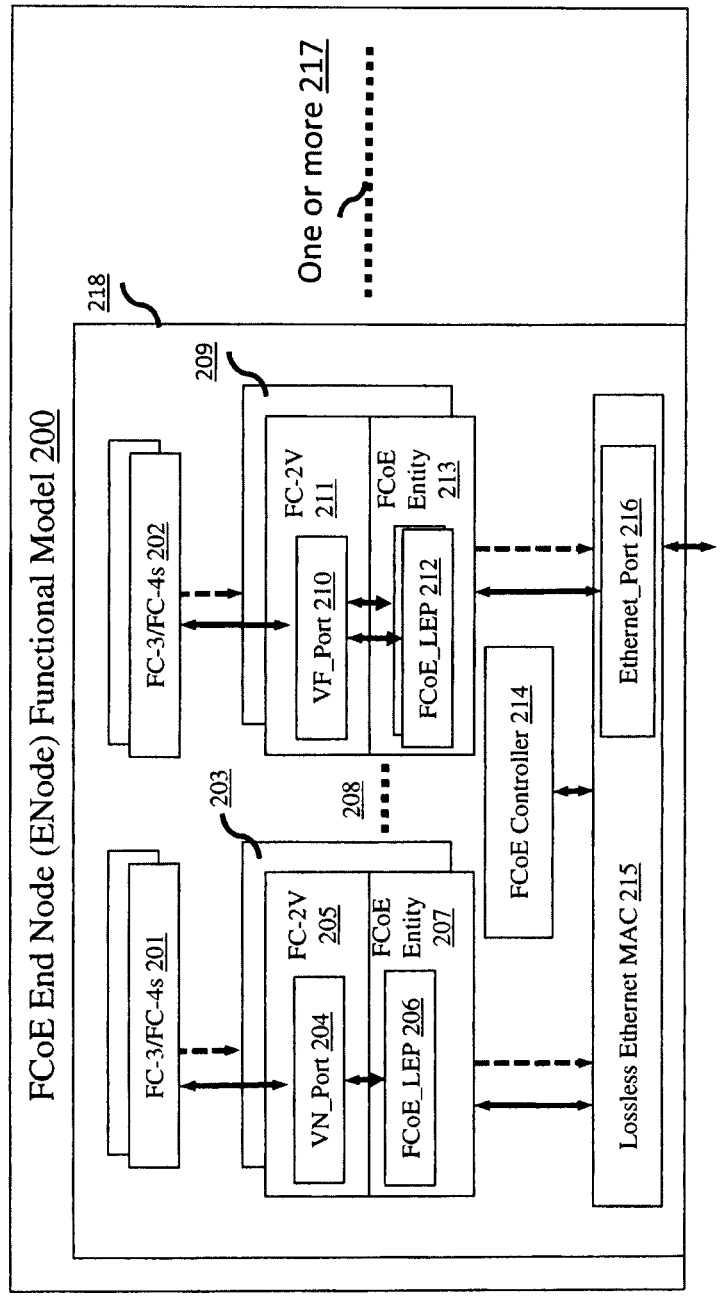
FIG. 7 is a diagram of a prior art ENode functional model.

FIG. 7 is a diagram of an ENode functional model 200. An ENode is functionally composed of at least one Lossless Ethernet MAC 215 (i.e., the ENode MAC), and an FCoE Controller function for each Enode MAC 214. The FCoE Controller 214 associated with an ENode MAC 215 supports the instantiation of VN_Port/FCoE_LEP pairs 204 206 210 212. The FCoE Controller 214 is the functional entity that performs the FCoE Initialization Protocol (FIP) and instantiates or de-instantiates VN_Port/FCoE_LEP 204 206 210 212 pairs as needed. The FCoE_LEP 206 212 is the functional entity performing the encapsulation of FC frames into FCoE frames in transmission and the decapsulation of FCoE frames into FC frames in reception. When encapsulating FC frames into FCoE frames, the MAC address of the local link end-point is used as source address and the MAC address of the remote link end-point is used as destination address of the generated FCoE frame. For an FCoE_LEP 206 212 of an ENode MAC, the MAC address of the local link end-point is the MAC address associated with its VN_Port and the remote link end-point address is the FCF-MAC address associated with the remote VF_Port. A VN_Port receives FC frames from the upper FC levels and sends them to its FCoE_LEP 206 212 for encapsulation and transmission over the Lossless Ethernet network. In a similar way, a VN_Port sends FC frames received from its FCoE_LEP to the upper FC levels. A VN_Port is uniquely identified by an N_Port_Name Name_Identifier and is addressed by the address identifier the Fabric assigned to it.

FIG. 8 is a diagram of a FCoE Device and Fibre Channel Node Interconnection Apparatus (FIA) and Controller (FIAC) Functional Model. The model shows a FIAC 251 comprising a modified FCoE Controller 253 coupled to a Lossless Ethernet MAC 254 which contains at least one Ethernet Port 255 coupled to an Ethernet link 257. The FIAC Ethernet_Port 255 contains a FCF-MAC. Other FIAC Modules 252 are represented by a single box. The other FIAC Modules 252 are described in FIG. 16. The Other FIAC Modules 252 may be coupled to the Lossless Ethernet MAC 254 and the modified FCoE Controller 253. There can be one or more FCoE device and Fibre Channel Node Interconnection Apparatus (FIA) 264 in a network all under the control of a single FIAC 251. The FIA 264 includes a plurality of Port logic 266 267 268 269 coupled to a Frame Forwarding Switch 265 and a Frame Processing Apparatus 285. The Frame Forwarding Switch is capable of forwarding frames between ports 266 267 268 269 by using several methods comprising one or more of the following: STP, RSTP, MSTP, TRILL, Shortest Path Bridging, MPLS, VPLS, OSPF, RIP, and BGP.

The Frame Processing Apparatus 285 includes but is not limited to one more 278 Frame Match entries (FME) 270 271, one or more 298 access control list entries (ACLE) 290 291, and one or more 287 Policy entries 284 286. Both FMEs and optionally ACLEs are sent from the FIAC 251 to the FIA 264 upon instantiation and de-instantiation of VN_Ports and N_Ports. Policy entries 284 are sent to the FIAs 264 by the FIAC 251 at any time as they are typically configured asynchronously with VN_Port and N_Port instantiation. Policy entries configure the flow metering capability in the Frame Processing Apparatus 285 to assign different flow quality of services to a specified VN_Port pair, N_Port pair, or VN_Port to N_Port pair. Each ACLE 290 291 preferably includes an ingress port, source and destination Ethernet MAC address fields, a Ethernet TYPE field, a action which permits the frame to be forwarded or deny, which discards the frame, and optionally a Fibre Channel address identifier field. When multiple ACLEs 290 291 describe the same incoming frame, the Frame Processing Apparatus 285 matches the first ACLE in it's Access Control List. Each FME 270 271 preferably includes an ingress port, a priority, frame match fields, counters, and actions. If two FMEs match an incoming frame, the highest priority FMEs actions are executed. The frame match fields are applied to incoming frames and comprise the ingress port, frame headers, and select encapsulated frame fields such as the Fibre Channel Destination Address Identifier (DID) field. The frame match fields can match exactly or utilize wild cards to mask certain subfields of the incoming frame. FME counters are updated for matched frames. FME counters may comprise the following: transmitted and received frames and bytes, transmitted and receive errors, and frame type transmitted and received. FME actions are instructions to perform upon frame matches comprising but not be limited to: forward the frame, flood the frame, replace certain frame fields or subfields, add certain frame fields, subfields, or headers such as the MAC header (MAC-in-MAC), a VLAN header (QinQ), and tag frames, the tags comprising a MPLS header and a VPLS header. The Ethernet_Ports contained in the Port Logic are connected to Ethernet Links 275 276. The FCF-MACs 272 contained in the FIA Port logic 266 267 268 269 in addition to the FCF-MACs contained in other FIAs and FIACs 256 may contain the same FCF-MAC address value. The FIA Port Logic 262 may be adapted to connect to a Fibre Channel node or fabric 263. A Fibre Channel adapted FIA Port Logic 262 includes Fibre Channel FC0 and FC1 layer support 261, a FCoE_LEP 2.59, a connection to the frame forwarding switch 2.58, and a connection to the Frame Processing Apparatus 285. The FCoE_LEP 259 encapsulates Fibre Channel frames received from the Fibre Channel link 263 and decapsulates FCoE and FIP frames received from the Frame Forwarding switch 258. Received FLOGI, NPIV FDISC, and LOGO frames are encapsulated 259 into FTP frames by the FIA with the destination Ethernet MAC address equal to the FCF_MAC address of the FIAC. A MAC address, a FME, and optionally a ACLE are assigned to each N_Port by the FIAC to identify that N_Port within the Lossless Ethernet network. The FIAC 251 receives and processes the FIP FLOGI, FIP NPIV FDISC, and FIP LOGO frames encapsulated by a FIA Fibre Channel adapted port 262 and responds with FTP responses. The FIP responses are decapsulated 259 by the FIA Fibre Channel adapted port 262 into Fibre Channel frames and transmitted out the link 263. The modified FCoE Controller 253 in a FIAC 251 sends commands to all FIAs, the commands comprising add, delete, or modify FMEs, get and clear counters, and add, delete, or modify ACLEs. The modified FCoE Controller 253 contained in the FIAC 251 preferably includes, but is not limited to, the following capabilities: (1) participates in the FIP VLAN discovery protocol initiated by an ENode MAC, (2) participates in the FIP discovery protocol initiated by an ENode MAC, (3) sends add FME commands and add ACLE commands to FIAs upon successful completion of each FTP FLOGI Exchange initiated by an ENode MAC, (4) sends add FME commands and add ACLE commands to on successful completion of each FLOGI initiated by a Fibre Channel Node, (5) sends add FME commands and add ACLE commands to FIAs on successful completion of each FIP NPIV FDISC Exchange initiated by an already logged in ENode MAC, (6) sends add FME commands and add ACLE commands on successful completion of each NPIV FDISC Exchange initiated by an already logged in Fibre Channel Node, (7) when a VN_Port is logged out, sends a delete FME command, the FME associated with that VN_Port and a delete ACLE command, the ACLE associated with that VN_Port, (8) when a N_Port is logged out, sends a delete FME command, the FME associated with that VN_Port and sends a delete ACLE command, the ACLE associated with that VN_Port, (9) initiates FIP Clear Virtual Link request as needed to terminate Virtual Links to VN_Ports, (10) monitors that status of the instantiated VN_Ports and N_Ports, (11) transmits periodic FIP Discovery Advertisements to the All-ENode-MACs address every FKA_ADV_PERIOD, (12) monitors that status of the logged in ENode MACs by verifying that periodic FIP Keep Alive frames are received within FKA_ADV_PERIOD, unless the D bit is set to one in received Discovery Advertisements, and (13) monitors that status of the logged in VN_Ports by maintaining timers and verifying that periodic FIP Keep Alive frames are received within FKA_VN_PERIOD, unless the D bit is set to one in received Discovery Advertisements. In addition to FMEs for VN_Ports and N_Ports, the FIAC sends add FME commands to all FIAs comprising the following: to match FIP frames with the destination Ethernet MAC address of All-ENode-MACs, All-FCF-MACs, and FCF-MAC of the FIAC, to match FIP frames with a source Ethernet MAC address of the FCF-MAC of the FIAC, to match FCoE frames with a source Ethernet MAC address of the FCF-MAC of the FIAC, and to match FCoE frames with a destination Ethernet MAC address of the FCF-MAC of the FIAC. In addition to ACLEs for VN_Ports and N_Ports, the FIAC may send add ACLE commands to all FIAs comprising the following: to match and permit FIP frames with the destination Ethernet MAC address of All-ENode-MACs, All-FCF-MACs, and FCF-MAC of the FIAC, to match and permit FIP frames with a source Ethernet MAC address of the FCF-MAC of the FIAC, to and permit FCoE frames with a source Ethernet MAC address of the FCF-MAC of the FIAC, and to match and permit FCoE frames with a destination Ethernet MAC address of the FCF-MAC of the FIAC, Frames with the well known Fabric services addresses in the Fibre Channel destination address identifier are forwarded to the FIAC 251 for processing. FMEs 270 271 may replace source and destination Ethernet MAC addresses in received FCoE frames when identifying and matching the embedded Fibre Channel destination address identifier (DID).

As will be appreciated by those skilled in the art, the functionality and structures of the inventions may be functionally and physically as described herein, or may be arranged and organized into multiple components or sub-components, and may be grouped differently into a more consolidated or more distributed grouping or groupings. For example, the processes may be implemented in software, firmware or hardware, or any combination thereof. By way of further example, the functionality or structure may be implemented in software and reside in a physical server, in a virtual machine in a virtual server, in a communication switch, or in a storage array. Each component may comprise one or more physical components. The components may be located at a single geographic location or may be distributed geographically. The flexibility in the nature of the invention applies to all of the inventions described and claimed, herein.

Figure 9:
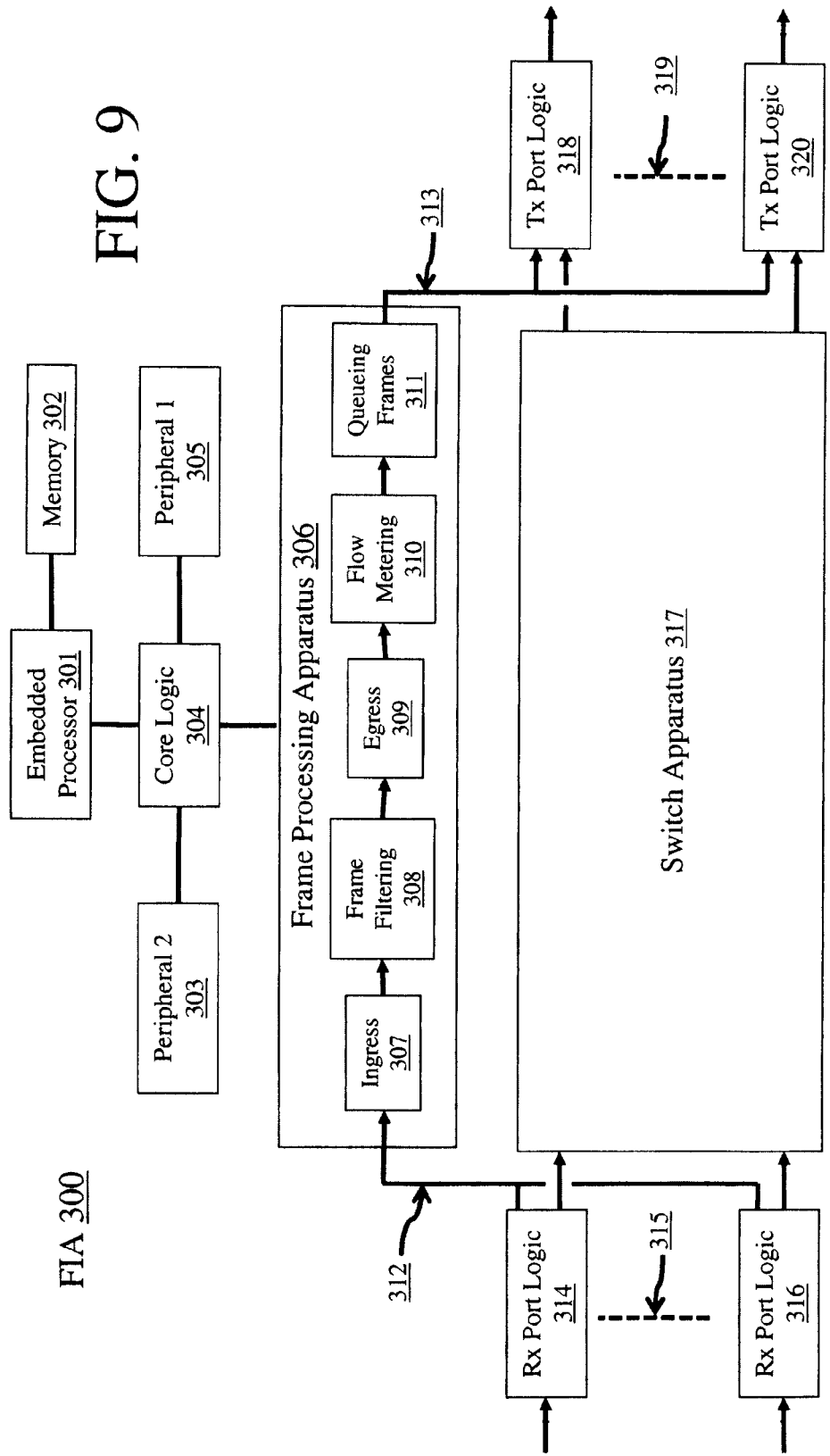
FIG. 9 is a diagram of a FIA.
Figure 46:
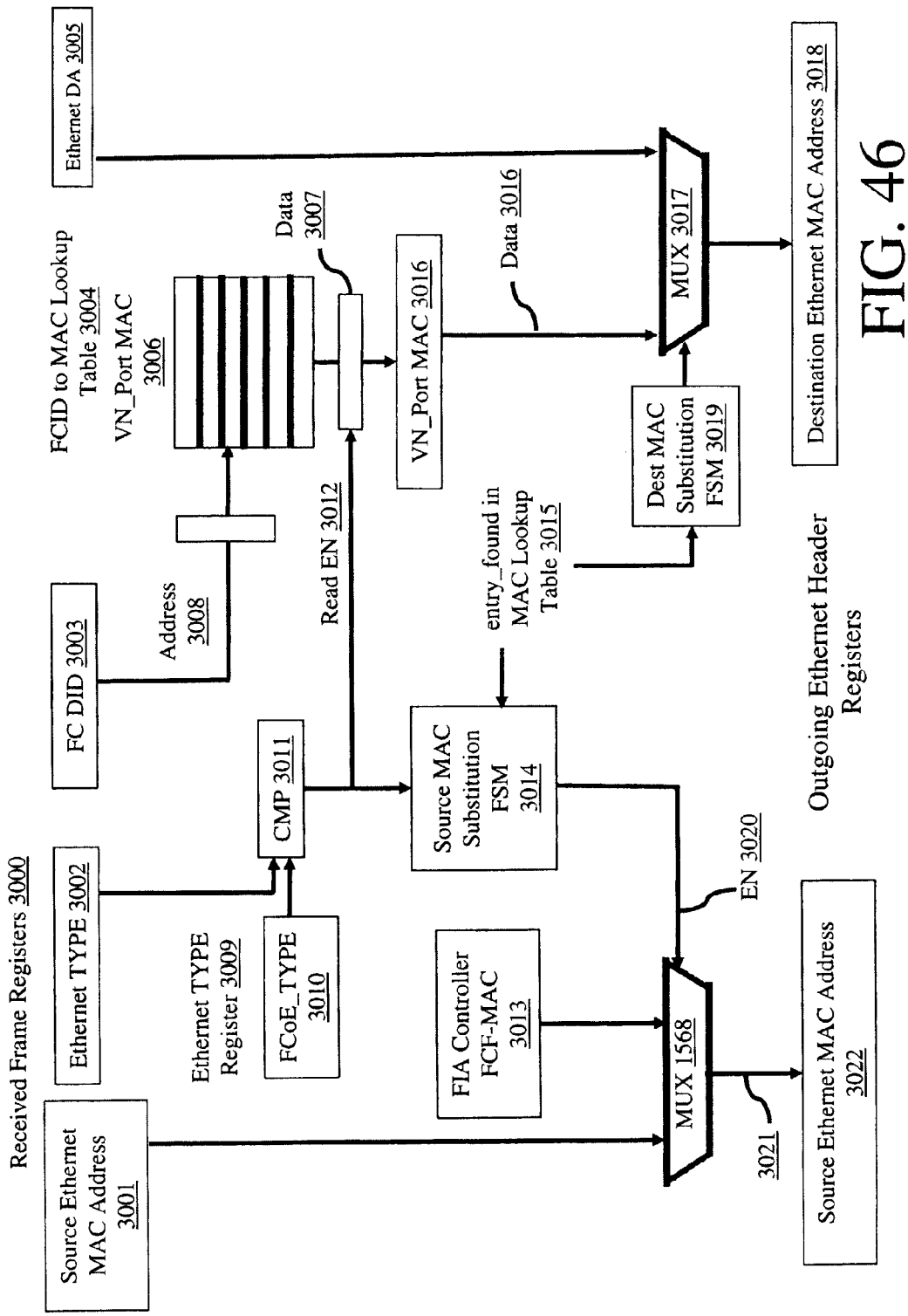
FIG. 46 is a diagram showing a source and destination Ethernet MAC address replacement logic.

FIG. 9 is a diagram of a FIA 300. The FIA may include but is not limited to one or more 315 Receive (Rx) Port Logic 314 316, one or more 319 Transmit (Tx) Port Logic 318 320, a Switch Apparatus 317, a Frame Processing Apparatus 306, Core Logic 304, an Embedded Processor 301, Memory 302, and several Peripherals 303 305. The Transmit and Receive Port Logic 314 316 318 320 may include but is not limited to the following frames, mappers, and or MACs: Ethernet, Lossless Ethernet, Fibre Channel, SONET/SDH, ATM, and Wave Division Multiplexing. The Switch Apparatus allows frames to be transferred between the Rx Port Logic 314 316 and the Tx Port Logic 318 320. The Frame Processing Apparatus 306 may inspect and operate on frame headers and body, and may forward frames to the Core Logic 304. Frames forwarded to the Core Logic 304 may be stored in the memory 302 and may be operated on by the Embedded Processor 301. The Ingress 307 apparatus may contain frame matching rules and actions that are applied to received frames. The frame matching rules may match fields from the incoming frames comprising but not be limited to: the source and destination Ethernet MAC addresses, the VLAN identifier, the VLAN priority, the IP source address, the IP destination address, the IP protocol, the TCP/UDP source and destination ports, the Fibre Channel source and destination address identifier, the Fibre Channel OXID/RXID, R_CTL, and TYPE fields. The frame actions may include replacing or substituting the source Ethernet MAC address, replacing or substituting the destination Ethernet MAC address, adding or removing a MAC header (MAC-in-MAC), adding or removing a VLAN field (QinQ), and adding or removing a TRILL header. An example Ethernet MAC address replacement apparatus is illustrated in FIG. 46. The frame matching rules may be configured by a FIAC. The Frame Filtering 308 apparatus may forward frames based on but not limited to the following frame fields: VLAN identifier, VLAN priority, destination Ethernet MAC address, and source Ethernet MAC address. The Frame Filtering 308 apparatus may implement a number of frame forwarding methods including but not limited to Rapid Spanning Tree Protocol (RSTP), Spanning Tree Protocol (STP), Multiple Spanning Tree Protocol (MSTP), Per-VLAN Spanning Tree (PVST), Rapid Per-VLAN Spanning Tree (R-PVST), Shortest Path Bridging (SPB), TRILL, Open Short Path First (OSPF), and Border Gateway Protocol (BGP). The Ingress 307 apparatus may act in parallel and independent from the Frame Filtering 308 apparatus. For example, an incoming frame is modified by the Ingress 307 apparatus and "forwarded" to the Frame Filtering 308 apparatus which applies a forwarding method based on the modified frame. The example illustrates the independent actions of the frame modification with frame forwarding. The Flow Metering 310 apparatus may apply flow classification and metering to frames received. Flow classification identifies a subset of traffic (frames) that may be subject to the same treatment in terms of metering and forwarding. Flow classification rules may be based on but not limited to the destination MAC address, the VID, and the frame class (see Priority Flow Control IEEE 802.1Qbb). The Queuing Frame 311 apparatus manages the transmission of frames and may implement Priority Flow Control (PFC), Enhanced Transmission Selection (ETS), and other priority frame transmission methods. Together the modules 307 308

309 310 311 comprising the Frame Processing Apparatus 306 allow fine-grained control of frame forwarding, which can support QoS, tunneling, and filter rules. Further, the Embedded Processor 301 is capable configuring the Frame Processing Apparatus 306, setting the fine-grain frame matching and field replacement modification actions. The Embedded Processor is also adapted to communicate with a FIAC to receive commands comprising but not limited to add, delete, modify FME and ACLEs, get and clear counters, heartbeat, and configure flow metering. The FME and ACLEs may be implemented in the Ingress apparatus 307. Some of the FME actions may also be implemented in the Frame Filtering apparatus 308, such as tunneling and tagging actions associated with forwarding methods such as Shortest Path Bridging (SPB). Many variations can be applied to FIG. 9 without changing the functions including distributing the Frame Processing Apparatus 306 over several ports and or physical chassis, adding additional Embedded processors 301 and core logic 304, and adding more functions to the Frame Processing Apparatus 306.

Figure 10:
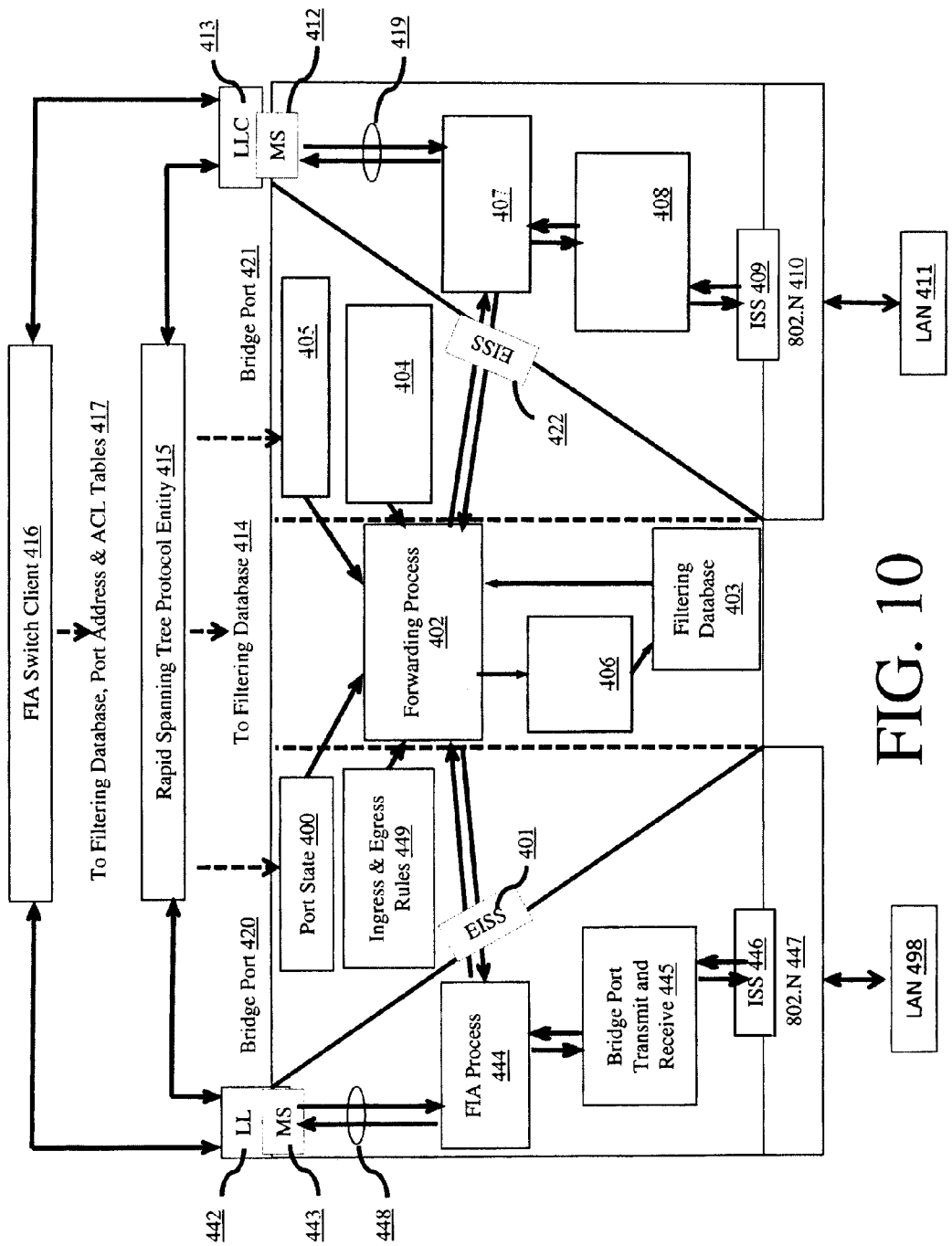
FIG. 10 is a detailed diagram of a bridge adapted to implement a FR with FCoE frame connectivity.

FIG. 10 is a detailed diagram of a bridge adapted to implement a FIA. Each port 420 421 coupled to an ENode may contain a FIA Process 444 407. The FIA Process 444 407 delivers and accepts frames to and from the Bridge Port Transmit and Receive Process 415 408, MAC Relay Entity or Forwarding Process 402 and LLC Entities 442 413 that may include but are not limited to Higher Layer Entities such as the FIA Switch Client 416, Rapid Spanning Tree Protocol Entity 415 (and/or other layer 2 forwarding methods), Bridge Management Entity, Generic Attribute Registration Protocol (GARP) Entity. The Rapid Spanning Tree Protocol Higher Layer Entity 415 is connected to all port LLCs 112 413 including connection to the Port State 400 405, the Filtering Database 403, and the FIA 444 407 processes. The FIA Switch Client 416 is also connected to each Port LLC 442 413 and can exchange information and frames with the FIA Process 114 407. The FIA Switch Client 416 manages communications from the FIA to a FIA Controller. The Filtering Database 403 supports the addition, modification, and deletion of static filtering information by the FIA Switch Client 416. Although the adapted bridge in FIG. 10 is shown with only two ports 420 421, a plurality of ports can be defined.

Figure 11:
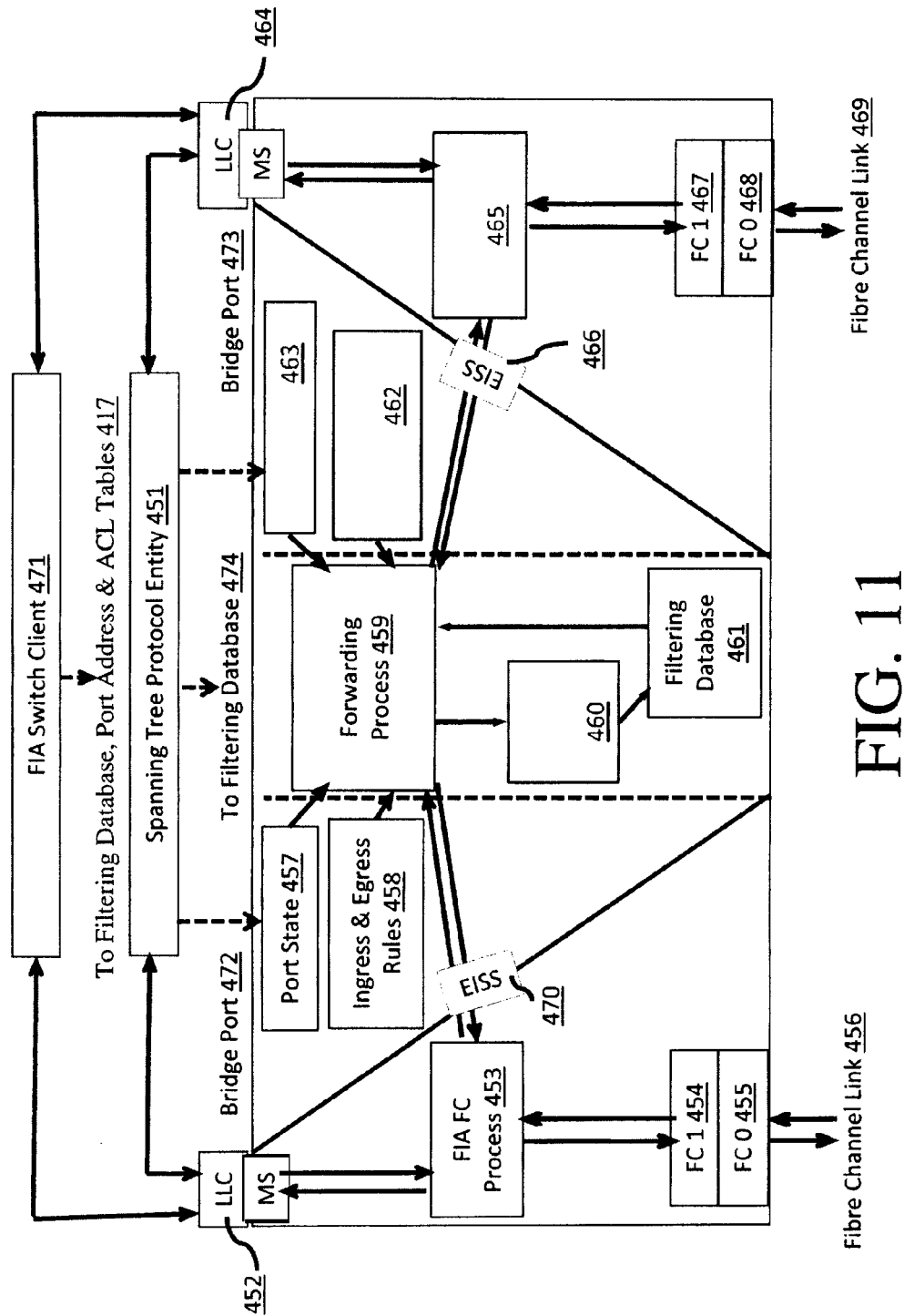
FIG. 11 is a detailed diagram of an FIA adapted to connect to Fibre Channel links and devices.

FIG. 11 is a detailed diagram of an FIA adapted to connect to Fibre Channel links and Fibre Channel devices. The apparatus of FIG. 11 is adapted 453 465 454 455 467 468 to communicate with Fibre Channel links 456 469. The FIA Process 453 465 is also modified to couple with the Fibre Channel Links 456 469. The FIA FC Process 453 465 receives and transmits frames from and to the FC 1 blocks 454 467, MAC Relay or Forwarding Process 459 and LLC Entities 452 464 that may support Higher Layer Entities which may include but not be limited to: an FIA Switch Client 471, a Rapid Spanning Tree Protocol Entity 451, a Bridge Management Entity, a Generic Attribute Registration Protocol (GARP) Entity. The Rapid Spanning Tree Protocol Higher Layer Entity 451 is connected to all port. LLCs 452 464 which may include but not be limited to connection to the Port State 457 463 and Filtering Database 461 processes. The FIA Switch Client 471 is also connected to each Port LLC 452 464 and can exchange information and frames with the FIA FC Process 453 465.

Figure 12:
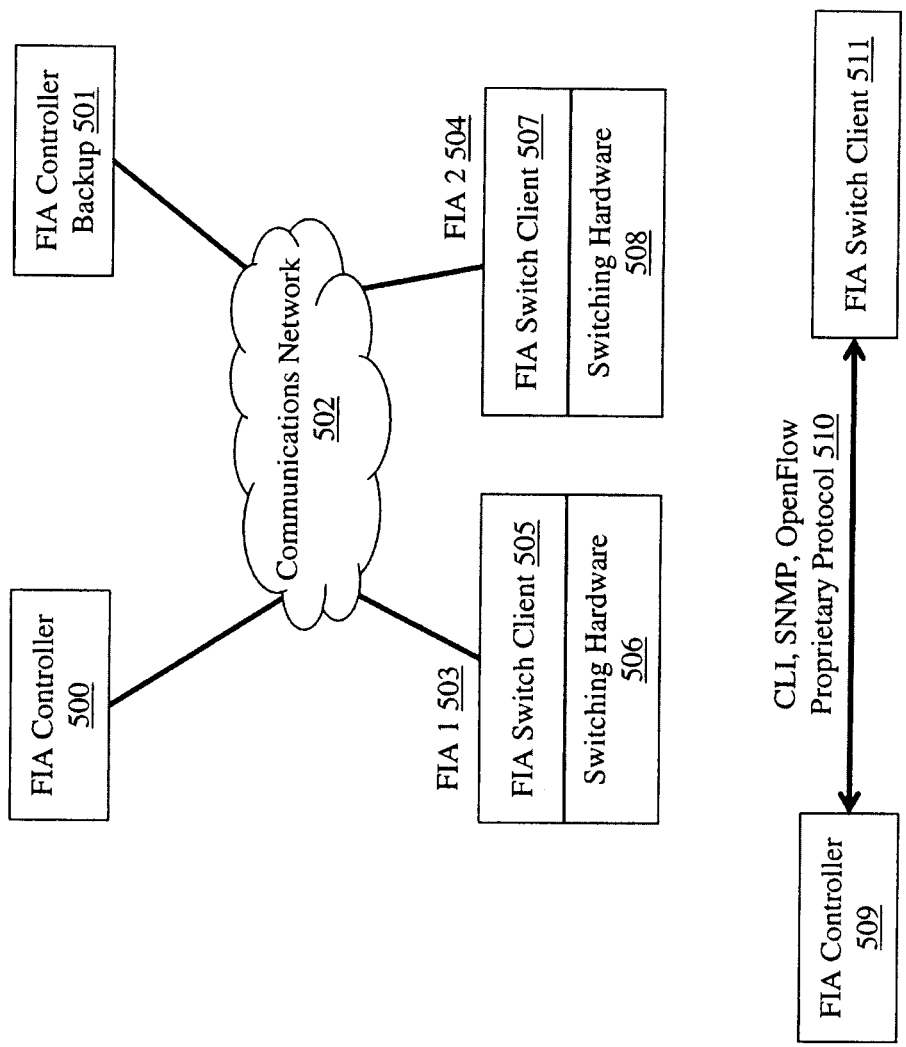
FIG. 12 is a diagram showing a network of FIA Controllers and FIAs.

FIG. 12 is a diagram showing a network of FIA Controllers and FIAs. The diagram shows a primary FIA Controller 500 and a backup FIA Controller 501. The FIA Controllers access FIA 1 503 and FIA 2 504 over a communications network 502, which may comprise but not be limited to an Ethernet network, a SONET network, a TRILL network, a Shortest Path Bridging network. The FIA Controller 500 501 can be located anywhere in the network and be coupled to the network over multiple paths. The FIA includes a FIA Switch Client 505 507 and Switching Hardware 506 508, The FIA Controller 509 sends and receives commands to the FIA Switch Client 511. The FIA Controller 509 commands may be send using but not limited to the following protocols: SNMP, Command Line Protocol (CLP), OpenFlow, and proprietary protocols 510. The FIA Controller 500 and FIA Controller Backup 501 may utilize a virtual FCF-MAC address. The virtual FCF-MAC address would be assigned to the FIA Controller 500 until the FIA Controller 500 fails, The FIA Controller Backup 501 would then claim the FCF-MAC address, receive frames destined to the FCF-MAC address, and transmit frames using the FCF-MAC address as the source Ethernet MAC address. FIA Controller failure may be detected by the exchange of a heartbeat message between the FIA Controllers. If the heartbeat message is not received within predetermined parameters such as time and retries, then the FIA Controller backup would assume communications using the virtual FCF-MAC address. Further, the FIA Controller and the FIA Controller backup may synchronize it's data structures, i.e., list of instantiated VN_Ports and N_Ports comprising their WWN's. MAC addresses, and Fibre Channel address identifiers.

Figure 13:
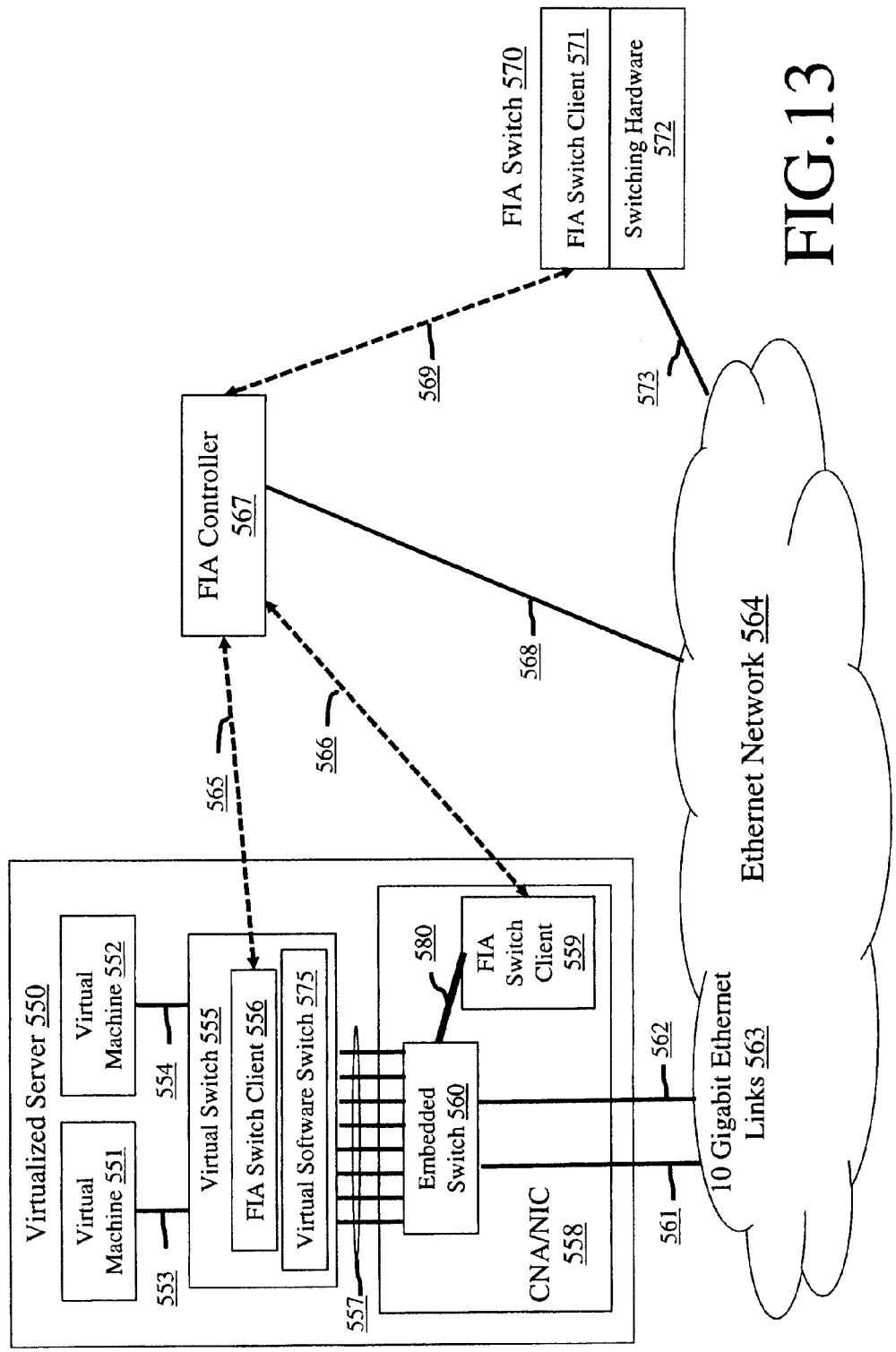
FIG. 13 is a diagram showing a FIA Controller controlling a number of FIAs.
Figure 14:
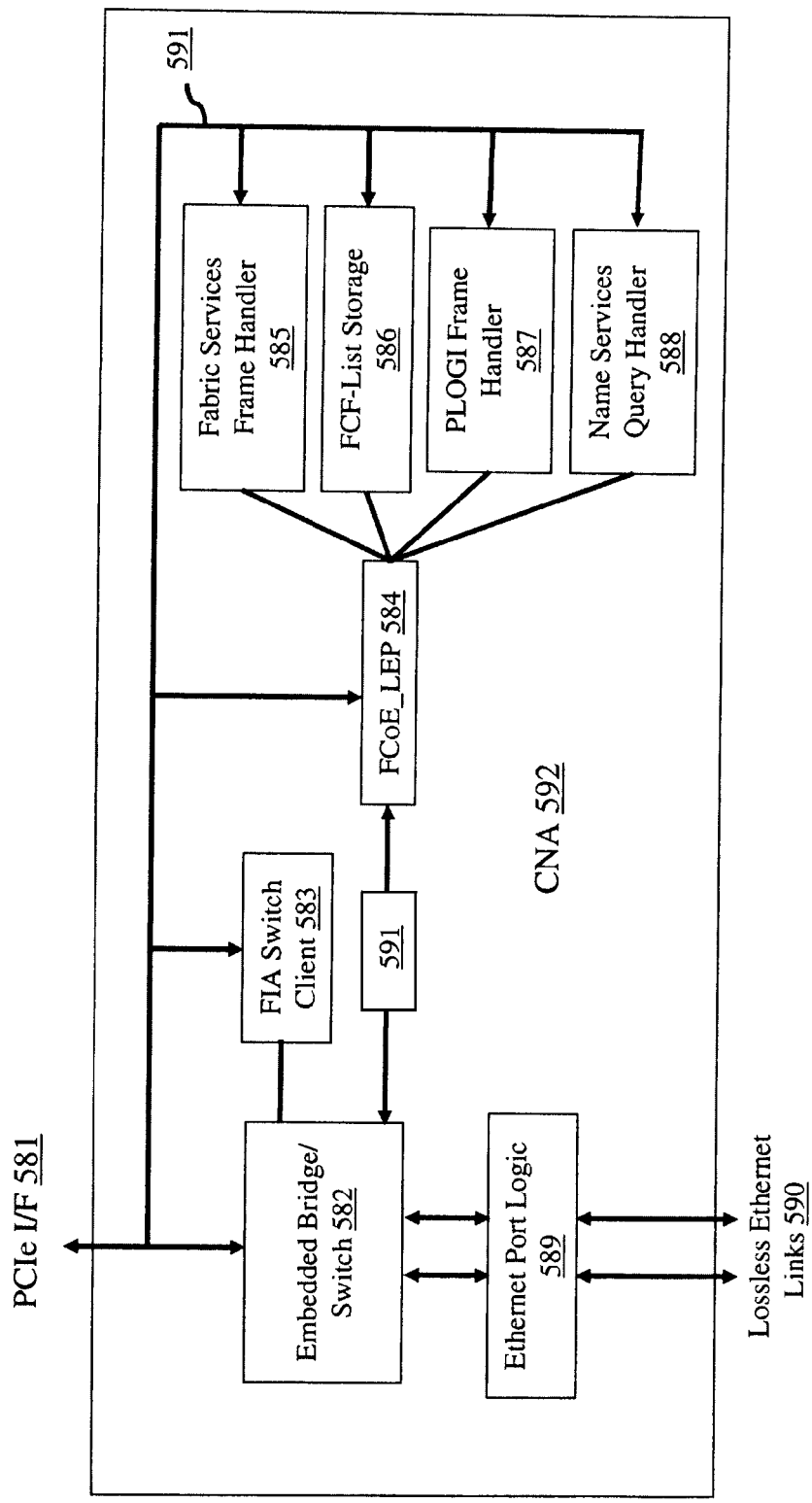
FIG. 14 is a diagram of a Converged Network Adapter.

FIG. 13 is a diagram showing a FIA Controller 567 controlling 565 566 569 a number of FIAs 555 558 570. FIA capabilities can be embedded in Hypervisor virtual switches 555 to control the virtual software switch 575 embedded in the virtual switch. FIA capabilities can be embedded in Converged Network Adapters 558, controlling the embedded switch 560 which switches frames between PCIe bus queues 557, between the PCIe bus queues 557 and the Ethernet links 561 562, and between the Ethernet links 561 562. FIA capabilities in a CNA 558 control 580 the embedded switch by adding, modifying, and removing switch entries upon commands from the FIA Controller 567. FIA capabilities can also be embedded in Ethernet Switches or Bridges 570, controlling the switching hardware or fabric 572. To embed FIA capabilities, a small FIA Switch Client, FIG. 14, is embedded in the target apparatus 556 559 571. The FIA Switch Client may configure the local device Frame Processing Apparatus or equivalent apparatus under the control of the FIA Controller 567. The FIA Controller 567 can control 565 566 569 the switching apparatus in the targeted apparatus 560 575 572 either through a direct connection or through a communications network 564.

FIG. 14 is a diagram of a Converged Network Adapter (CNA). FIG. 14 is simplified for clarity purposes. The CNA 592 interfaces with a server or storage subsystem over a PCIe interface 581. The PCIe Interface transmits both data and control frames to the CNA 592. The CNA 592 may comprise a Embedded bridge or switch 582 to forward frames between but not limited to the following: Ethernet Ports 589, PCIe functions or queues 581, FIA Switch Client 583, FCoE_LEP 584, Fabric Services Frame Handler 585, FCF-List Storage 586, PLOGI Frame Handler 587, Name Services and the Query Handler 588. Note that one or more of the aforementioned blocks 583 584 585 586 587 588 may be located in software external to the CNA 592. The FCoE_LEP 584 encapsulates and de-encapsulates Fibre Channel frames to either FIP or FCoE frames. The Fabric Services Frame Hander 585 processes frames from the fabric to the CNA 592. The FCF-list storage includes at least FCF-MAC addresses, VIDs, Priority attributes, and Fabric attributes. The PLOGI frame handler 587 may transmit PLOGI frames to Fabric Servers, VF_Ports, F_Ports, VN_Ports, and N_Ports. The Name Services Query Handler 588 signals the PLOGI Frame Handler 587 to send PLOGI frames.

Figure 15:
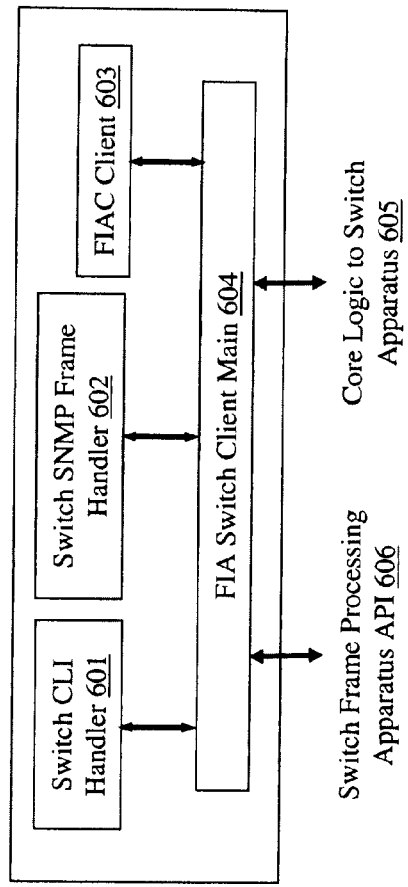
FIG. 15 is a diagram showing the FIA Switch Client in more detail.

FIG. 15 is a diagram showing the FIA Switch Client in more detail. The FIA Switch Client 600 is designed to interface with a host switch FIG. 13 555 558 570 utilizing a number of methods. Each FIA Switch Client 600 can utilize one or more concurrent methods. The FIA Switch Client 600 may be comprised but not limited to a Switch CLI Handler 601, a Switch SNMP Frame Handler 602, a FIA Controller Client 603, a FIA Switch Client Main apparatus 604. The FIA Switch Client Main apparatus 604 may interface with the Switch Core Logic FIG. 9 304 to transmit to and receive from the host switch communications ports. The FIA Switch Client Main 604 apparatus may also interface with the Switch Frame Processing Apparatus 606 to add, modify, or delete FMEs and ACLEs, get and clear statistics counters, and add, modify, or delete Policies upon receipt of commands from a FIAC. The Switch CLI Handler 601 translates control frames from the ETA Controller to the switch supported CLI. The Switch SNMP Frame Handler 602 translates SNMP frames from the FIA Controller to commands to and from the Switch Frame Processing Apparatus API 606. The FIA Controller Client 603 may implement different protocols from the FIA Controller to control the switch including but not limited to a vendor specific CLI over IP protocol, TCP/IP, OpenFlow Switch protocol, or a proprietary protocol. Further, the FIA Controller to Client protocols can be encrypted.

Figure 16:
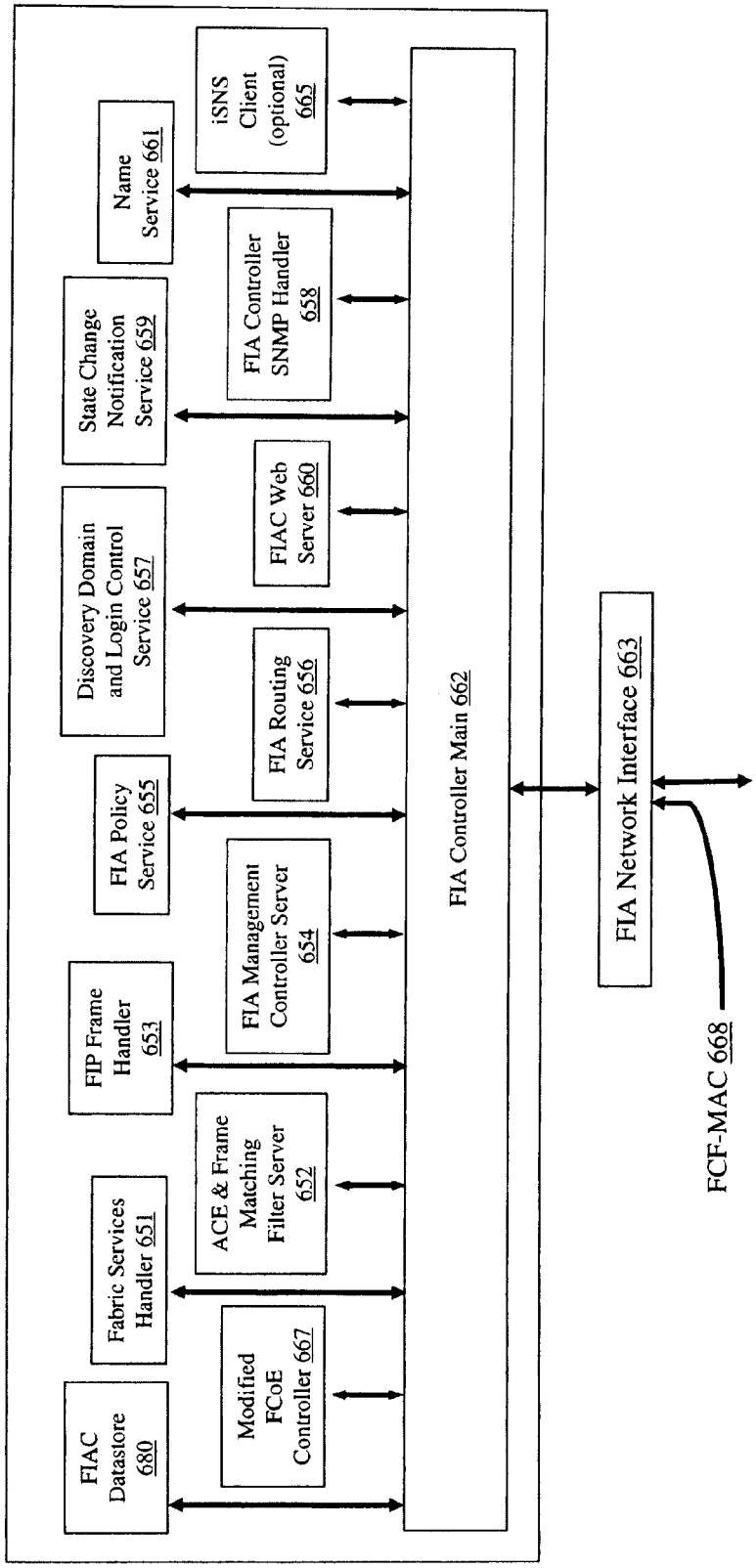
FIG. 16 is a diagram showing the FIA Controller in more detail.

FIG. 16 is a diagram showing the FIA Controller (FIAC) in more detail. The FIA Controller 650 may comprise the following modules: a Fabrics Services Handler 651, a ACE & Frame Matching Filter Server 652, a FTP Frame Handler 653, a FIA Management Control Server 654, a FIA Policy Service 655, a Discovery Domain and Login Control Service 657, a FIA Controller a SNMP Handler 658, a State Change Notification Service 659, a FIA Web Server 660, a Name Service 661, an optional iSNS Client 665, a modified FCoE Controller 667, a FIA Controller Main 662, a FIAC Datastore 680, and the FIA Network Interface 663. The FIA Controller 650 may be implemented in software and reside in a physical server, in a virtual machine in a virtual server, in a communications switch, or in a storage array. The FIA Controller 650 can also be distributed over a number of processors and servers. The FIA Network Interface 663 is the path to the network over which FIA communication takes place 664. The Fabric Services Handler 651 receives frames destined for the well known Fabric Services Fibre Channel address identifiers. The Fabric Services Handler 651 operates on and responds to Fabric Services directed commands which may include but not be limited to messages to the Name Service and messages to the State Change Notification Service. The FIA Controller ACE & Frame Matching Filter Server 652 communicates with FIAs to add, modify, and remove both FMEs and ACLEs. The FTP Frame Handler 653 operates on and responds to FIP frames in addition to originates transmission of FIP frames. The FIP frames may include but not be limited to FIP FLOGI Request, FIP FLOGI LS_ACC, FIP FLOGI LS_RJT, FTP NPIV FDISC Request, FTP NPIV FDISC LS_ACC, FIP NPIV FDISC LS_RJT, FIP Fabric LOGO, EP Fabric LOGO LS_ACC, FIP Fabric LOGO LS_RJT, FIP Keep Alive, FIP Clear Virtual Links, FIP VLAN Request, FIP VLAN Notification, and FIP Vendor Specific frames. The FIA Management Controller Server 654 may communicate with a FIA using a number of protocols, which may include but not be limited to encapsulated CLI, SNMP, or proprietary transport protocols. These protocols can further be encrypted. The FIA Policy Service 655 binds certain Quality of Service elements to a logical link between two FCoE endpoints, two Fibre Channel endpoints, or FCoE and Fibre Channel endpoints. Since the FIA Controller manages the Frame Matching Filter entries, the ETA Controller can identify specific FCoE and/or Fibre Channel logical links and assign special forwarding paths which contain specific flow priorities through PFC and ETS capabilities. The Discovery Domain and Login Control Service 657 implements a mechanism to expose selected views of the Name Server information to client devices or control frame delivery between devices. There are many methods to implement this capability, including Fibre Channel zoning, Discovery Domains, and iSNS based Discovery Domains. The FIA Controller SNMP Handler 658 operates on and responds to SNMP frames. These frames can be used to manage a FIA Controller or to communicate with and control a FTA from the FIA Controller. The State Change Notification Service 659 operates on, responds, and generates messages when a state affecting a FCoE, Fibre Channel device, or FIA occurs. The FIAC Web Server 660 provides external management capability to the ETA Controller 650. The Name Service 661 implements a Name Server that provides a way for FCoE and Fibre Channel device to register and discover Fibre Channel attributes. Once registered, the attributes are made available to other FCoE and Fibre Channel devices within their same Discovery Domain or zone. The FIAC Datastore 680 may store the Name Server table, the Discovery Domain tables, the FIA and FIAC configuration tables, and other information. The FIAC Datastore 680 may be local to the FIAC or resident on another external CPU reachable through TCP/IP, SSH or another communications protocol. The FIAC Datastore 680 may be comprised but not limited to a relational database, an object store database, in memory datastructures, or a flat file system. The FIAC Datastore 680 may be coupled to a directory-enabled entity that may store client attributes in a Lightweight Directory Access Protocol (LDAP) directory infrastructure, an Active Directory (AD) infrastructure, or in a distributed database. The iSNS Client 665 is optional and is only present when an iSNS Server is used. When present, the iSNS Client 665 implements the iSNS Protocol and communicates with the iSNS Server. The FIAC 650 contains storage comprising a FCF-MAC 668 used to receive FTP and certain FCoE frames from ENodes through FIAs.

Figure 17:
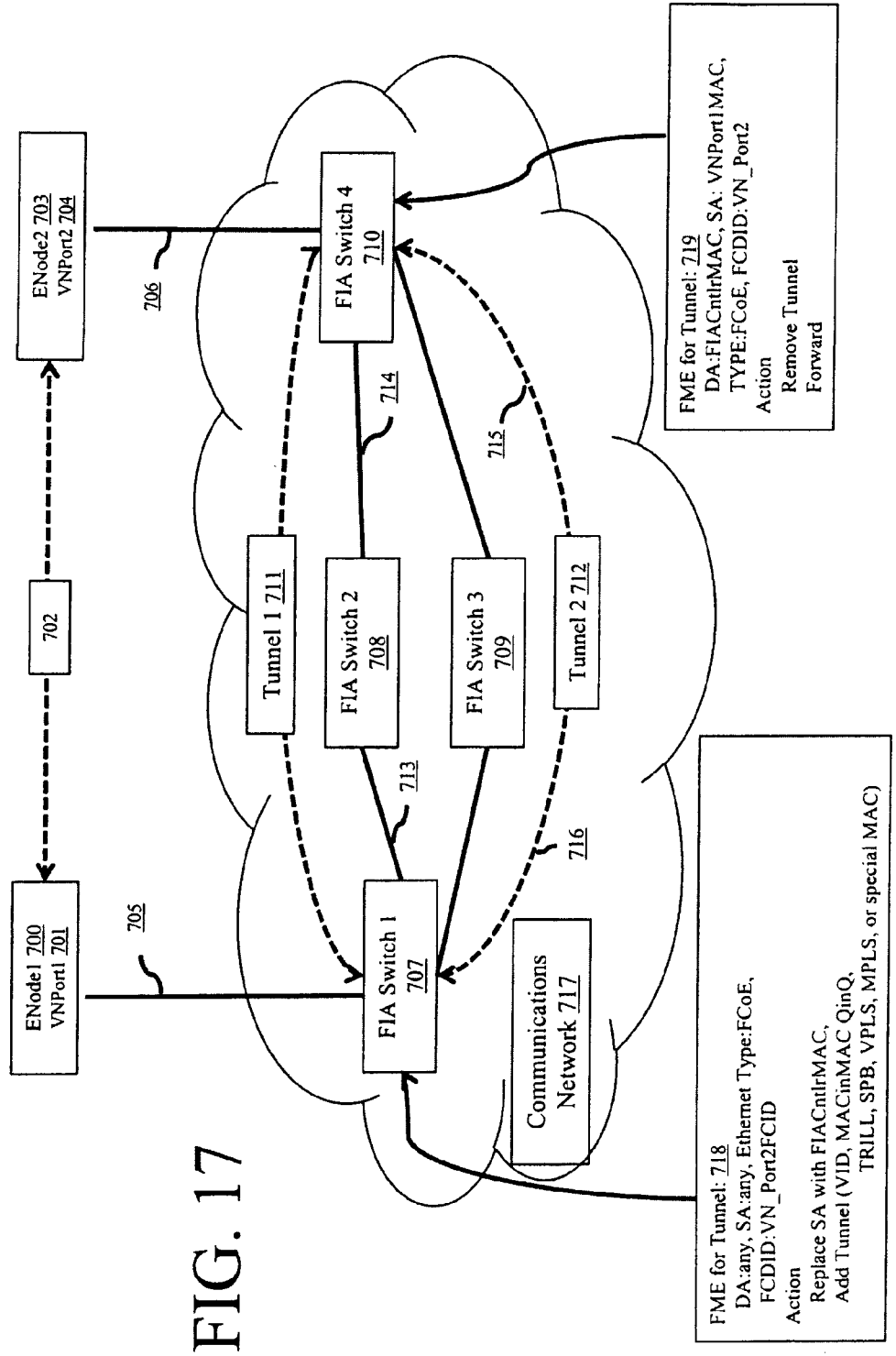
FIG. 17 is a diagram showing a policy applied to two FCoE devices.

FIG. 17 is a diagram showing a policy applied to two FCoE devices. A VN_Port, VN_Port1 701, instantiated in ENode1 700 is connected through the communications network 717 to VN_Port2 704, instantiated in ENode2 703. The FIA Controller can add a Frame Matching entry to FIA Switch 1 707 and FIA Switch 4 710 to tunnel 711 or 712 the communications between the VN_Port's 701 702 as identified by the source and destination Ethernet MAC addresses and optionally the Fibre Channel address identifiers. The tunnel can be assigned certain quality of service elements such as Enhance Transmission service groups, priorities within Per Flow Control, a TRILL or a SPB path. Tagging can be used in lieu of tunneling, tagging a frame comprising a VPLS, or a MPLS identifier. A sample Frame Matching Entry (FME) 718 added to FIA Switch 1 707 by a FIA Controller would match the incoming frame from ENode1 705 based on the Fibre Channel destination address identifier, in case the symbolic VN_Port2FCID. The resulting match action is to replace the source Ethernet MAC address with the FCF-MAC address, FIACntrlMAC, and add a tunnel that can be based on a number of methods which may comprise but not be limited to VID replacement, MAC header addition (MAC-in-MAC), VLAN addition (QinQ), TRILL, Shortest Path Bridging, VPLS, MPLS, or a special MAC replacement.

Figure 18:
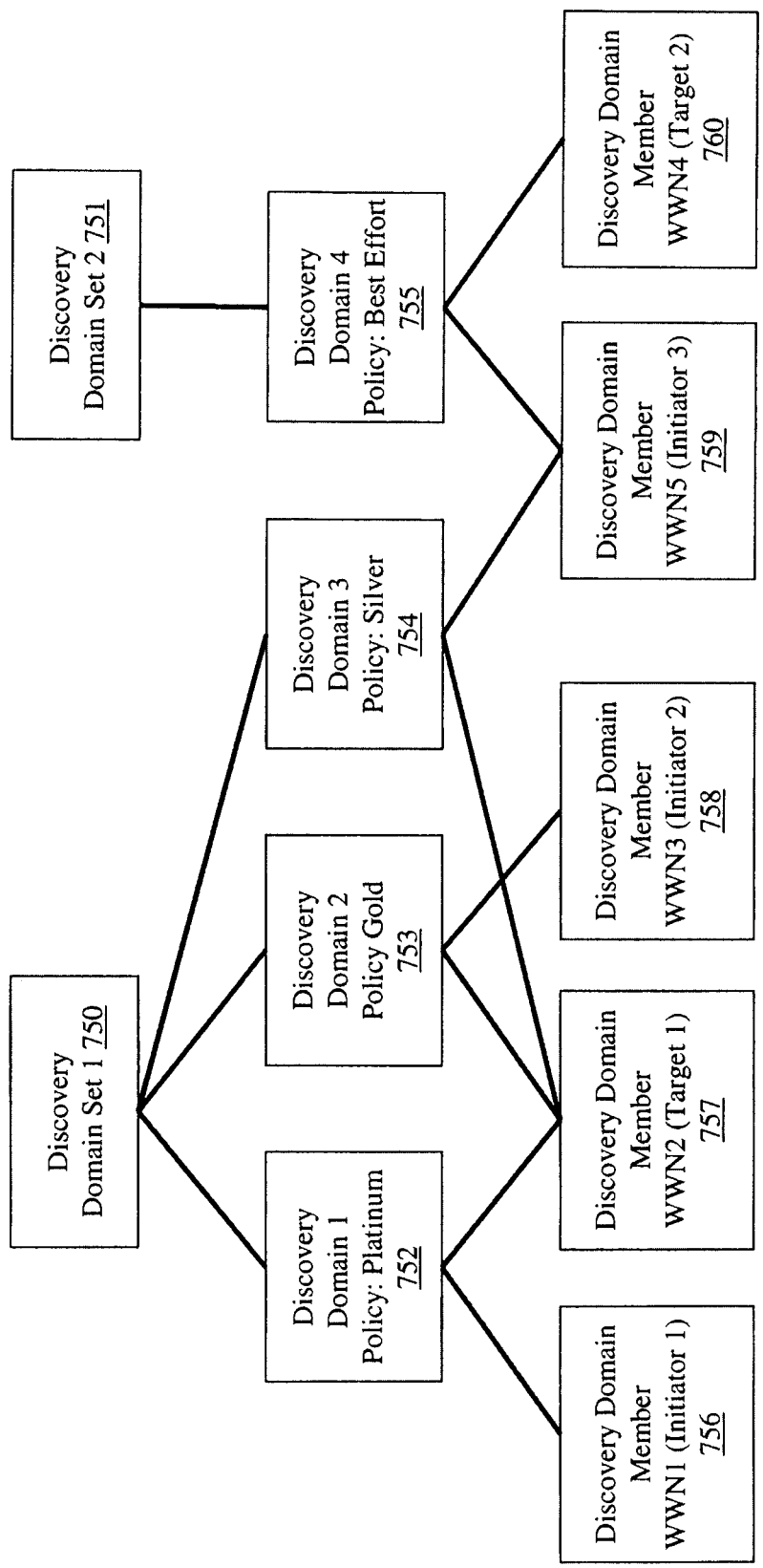
FIG. 18 is a diagram showing the Discovery Domain model.

FIG. 18 is a diagram showing the Discovery Domain model. At the highest level are Discovery Domain Sets 750 751. Discovery Domain Sets 750 751 are comprised of Discovery Domains 752 753 754 755. Discovery Domains are themselves comprised of Discovery Domain Members 756 757 758 759 760. Discovery Domain sets are uniquely identified, as are Discovery Domains. In the example in FIG. 18, Discovery Domain 1 752 is comprised of WWN1 (Initiator 1) 756 and WWN2 (Target 1) 757. Discovery Domain 2 753 is comprised of WWN3 (Initiator 2) 758 and WWN2 (Target 1) 757. Discovery Domain 3 754 is comprised of WWN2 (Target 2) 757 and WWN5 (initiator 3) 759. Discovery Domain 4 755 is comprised of WWN5 (Initiator 3) 759 and WWN4 (Target 2) 760. FIG. 18 illustrates a best practice of allocating a zone or group to each Initiator/Target pair, i.e., Initiator 1/Target 1, Initiator 2/Target 1, Initiator 3/Target 1, Initiator 3/Target 2 as each are in a separate Discovery Domain and each target is contained in a separate Discovery Domain Set. Further, Discovery Domains are assigned a Quality of Service metric, Platinum 752, Gold 753, Silver 754, Best Effort 755. The Quality of Service metric may be applied to Lossless Ethernet based PFC classes, ETS groups, network tunnels, network tags, or other methods. Configuring the Quality of Service metric may be done through the FIAC policy method. The Discovery Domain Sets 750 751 in FIG. 18 are each comprised of Discovery Domains comprising a specific target.

Figure 19:
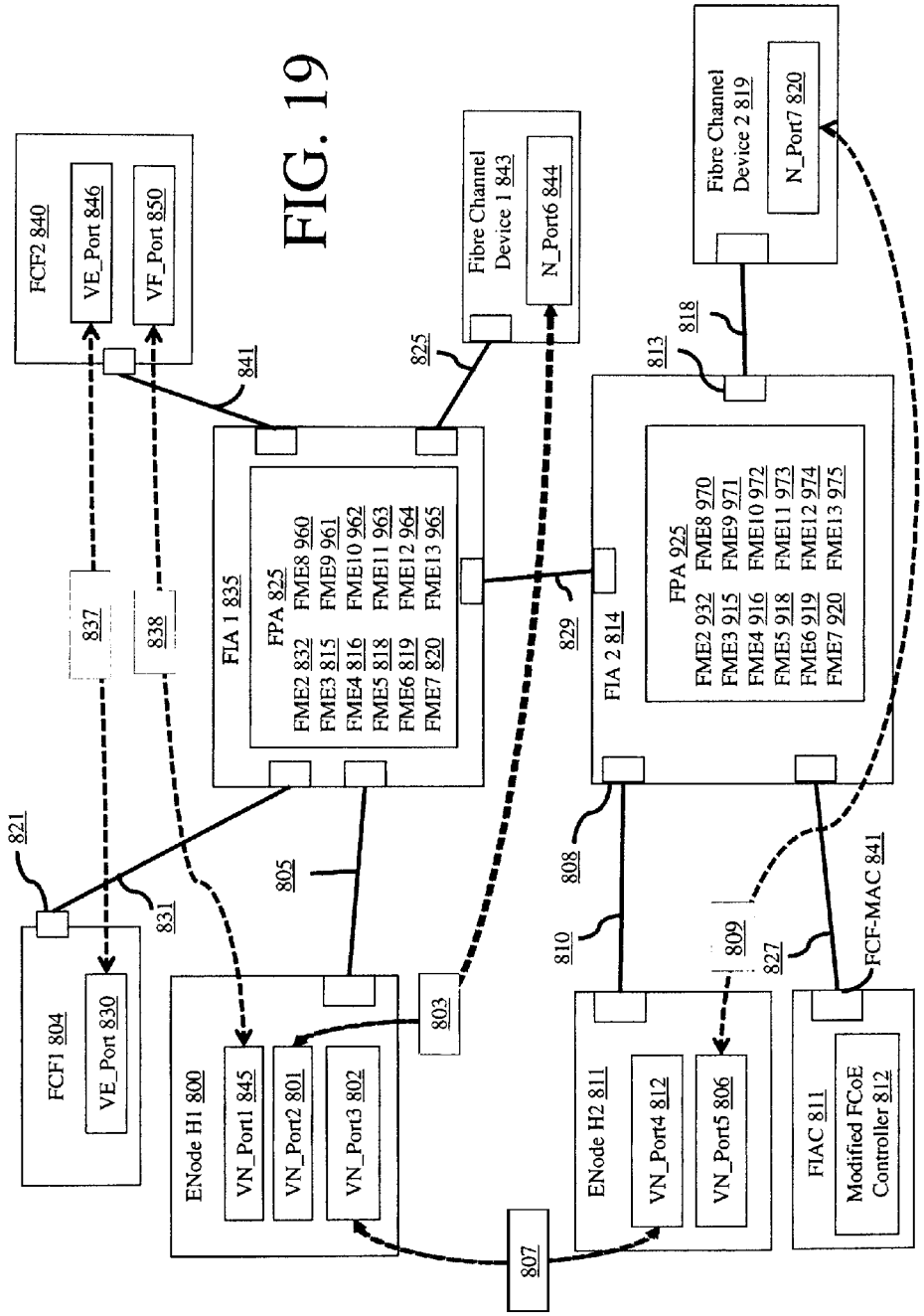
FIG. 19 is a diagram showing the FIA connection model.

FIG. 19 is a diagram showing the FIA connection model. The diagram shows the coupling of two FIA interconnection apparatus, FIA1 835 and FIA2 814 with two ENodes, ENode H1 800 and ENode H2 811, two Fibre Channel Devices, Fibre Channel Device 1 843 and Fibre Channel Device 2 819, two FCoE Forwarding Devices (FCF) 804 840, and a FIAC 811. Physical links 831 805 810 827 841 827 are Ethernet links and physical links 825 818 are Fibre Channel links. Note the FCF1 804 and FCF2 840 can also be FCoE Data Forwarder's (FDF) in this example. The Frame Processing Apparatus (FPA) in FIA 1 825 and FIA2 925 comprise a list of Frame Match Entries (FMEs) 832 815 816 818 819 820 960 961 962 963 964 965 932 915 916 918 919 920 970 971 972 973 974 975, all previously configured by an add FME command received from the FIAC 811 by the FIAs 835 814. Note that ACLE and Policy entries are not shown in FIG. 19 for simplicity purposes. FME2 832 932 matches the FCID of VN_Port2 801, FME3 815 915 matches the FCID of VN_Port3, FME4 816 916 matches the FCID of VN_Port4 812, FME5 818 918 matches the RID of VN_Port5, FME6 819 919 matches the FCID of N_Port6 844, and FME7 820 920 matches the FCID of N_Port7 820. FME8 960 970 matches FIP frames with a destination Ethernet MAC address of All-ENode-MACs MAC address. FME9 961 971 matches FIP frames with the destination Ethernet MAC address of All-FCF-MACs. FME10 962 972 matches FIP frames with the destination Ethernet MAC address of the FIAC 811 FCF-MAC address 841. FME11 963 973 matches FIP frames with a source Ethernet MAC address of the FIAC 811 FCF-MAC address 841. FME12 964 974 matches FCoE frames with a destination Ethernet MAC address of the FIAC 811 FCF-MAC address 841. FME12 964 974 match entry is of a lower priority than the rest of the FME's meaning if another higher priority match occurs, FME12's action(s) will not be executed. FME13 965 975 matches FCoE frames with a source Ethernet MAC address of the FIAC 811 FCF-MAC address 841. FME13 965 975 is of a higher priority than the other FMEs meaning that if this FME matches an incoming frame, it's actions will be executed in place of other lower priority FME matches. FME13 965 975 matches FCoE frames that have already had their source and destination Ethernet MAC addresses substituted by the ingress FIA, i.e., the rule matches frames in transit in intermediate and egress FIA's. For example for frames originating from VN_Port3 802 in ENode H1 800 destined to VN_Port4 812 in ENode H2 811 they will match the FME4 816 entry, i.e., the embedded Fibre Channel destination address identifier will be the Fibre Channel address identifier of VN_Port4 812. FME4 816 actions will replace the destination Ethernet MAC address by VN_Port4's 812 Ethernet MAC address and the source address with the FIAC 811 FCF-MAC address 841. The frame will be forwarded over the inter-FIA link 829 based on the forwarding method used by the FIA's which could comprise RSTP, MSTP, OSPF, BGP, or any other layer 2 or layer 3 forwarding method. The forwarding method may be independent of the FME actions. Upon receipt of the frame by FIA 2 814, the entry FME13 975 will match the frame, i.e., a high priority FME entry matching a FCoE frame with a source Ethernet MAC address of the FIAC 811 FCF-MAC address 841. The action is to forward the frame.

Since the logical link 838 from VN_Port1 845 to VF_Port 850 utilizes FIA1 835 as a Lossless Ethernet Bridge, a FME for VN_Port1 is not created, FIA1 835 uses the Frame Filtering FIG. 9 308 table created by it's current method of frame forwarding, for example by RSTP, MSTP, etc. to forward the frame. FIA1 835 further functions as a Lossless Ethernet bridge to the logical link 837 created by the VE_Port 846 in FCF2 840 and VE_Port 830 in FCF1 804. Fibre Channel N_Port7 820 in Fibre Channel Device 2 819 has a logical connection 809 with VN_Port5 806 in ENode H2 811. The logical connection includes a Lossless Ethernet Port 808 on FIA 2 814 and a Fibre Channel port 813 on FLU 814. FCoE frames transmitted from VN_Port 5 806 to N_Port7 820 are identified by FME7 920 in FIA 2 814. Fibre Channel frames transmitted from VN_Port 7 820 to VN_Port 5 806 are identified by FME5 918. FCoE frames transmitted from VN_Port3 802 to VN_Port 4 812 are identified by FME4 816. FCoE frames transmitted from VN_Port 4 812 to VN_Port 3 802 are identifier by FME3 915. FCoE frames transmitted from VN_Port2 801 to N_Port6 844 are identified by FME6 819 and Fibre Channel frames transmitted by N_Port6 844 to VN_Port2 801 are identified by FME2 832. FIAC 811 includes a modified FCoE Controller 812 and a FCF-MAC address 841. The modified FCoE Controller 812 is adapted to receive and process FIP frames from ENodes, transmit FIP frames to ENodes, received and process certain FCoE frames from ENodes, VN_Ports, and N_Ports destined for well known Fibre Channel Fabric Services, and receive and process and transmit State Change Notification FCoE frames. The link 829 between FIA1 835 and FIA2 814 is a Lossless Ethernet link in which frames are forwarded by the Frame Processing Apparatus in FIA 1 835 and FIA2 814 respectively. Frames transmitted and received between the FIAs 829 may be forwarded comprising but not limited to the following methods: RSTP, MSTP, TRILL, Shortest Path Bridging, OSPF, RIPng, and BGP. The virtual link 837 between FCF1 804 and FCF2 840 is a VE_Port 846 to VE_Port 830 interswitch link and connects through FIA1 835. The virtual link 838 between VN_Port 845 in ENode 1 800 and the VF_Port 850 in FCF2 840 is a VN_Port to VF_Port link. The VN_Port 845 to VF_Port 850 link 838 also connects through FIA1 835, FIA1 835 behaves as a Lossless Ethernet Bridge for those specific virtual links 837 838. Further note that there are no VE_Ports or E_Ports contained, in the FIAs 835 814. The FIA connection forwarding is based on a different method than the FC-SW required Fibre Channel FSPF routing method for FCF and FDF's.

Figure 20:
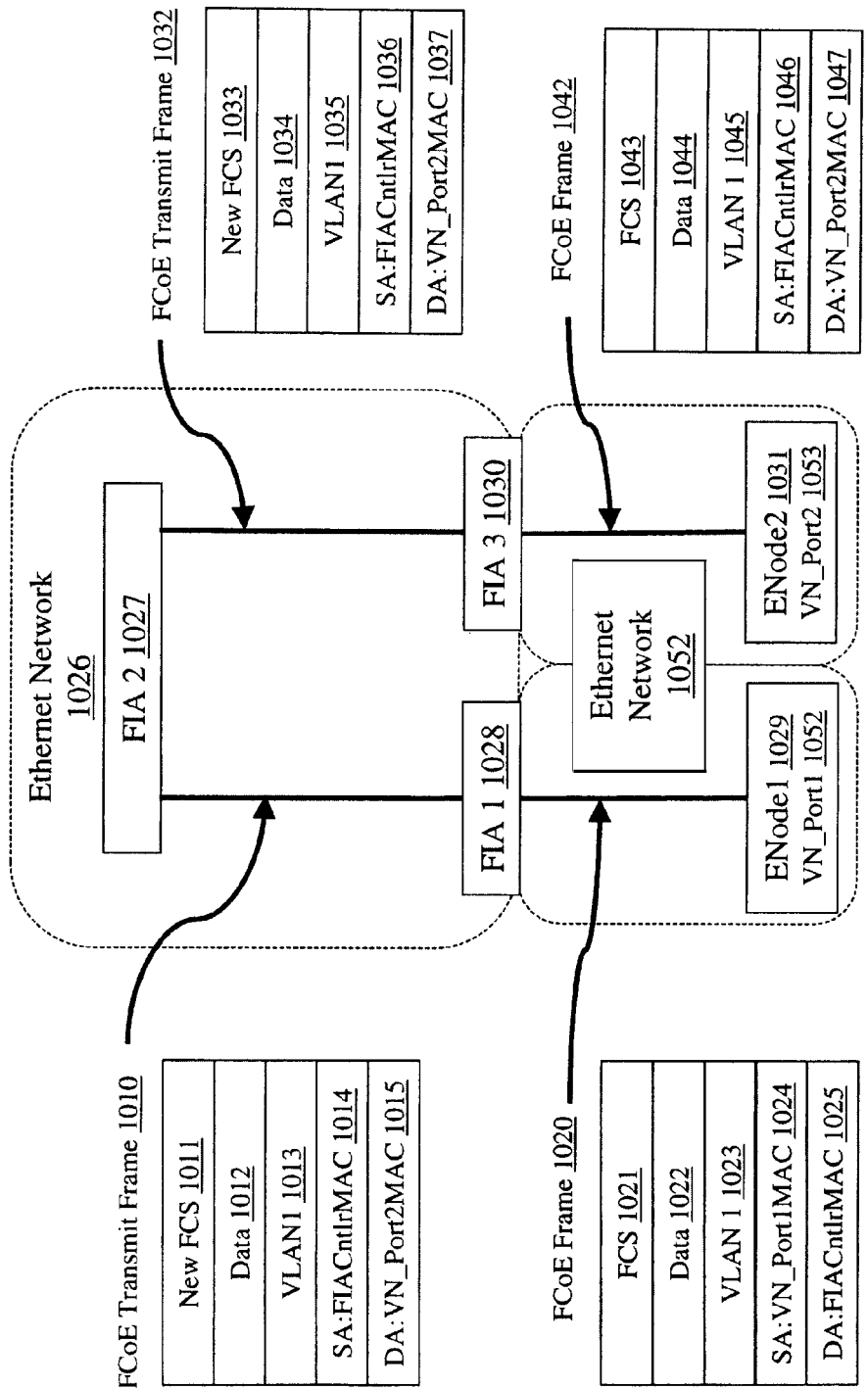
FIG. 20 is a diagram showing the interconnection of two ENodes through a network of FIAs.

FIG. 20 is a diagram showing the interconnection of two ENodes through a network of FIAs. FIG. 20 assumes the FIP Discovery and Login phases have occurred. Instantiated VN_Port1 1052 in ENode1 1029 transmits a FCoE frame 1020 to FIA 1 1028. The FCoE frame 1020 includes the destination Ethernet FCF-MAC address FIACntlrMAC 1025, the source Ethernet MAC address, VN_Port1MAC 1024, the VLAN identifier VLAN1 1023, Data 1022, and a Frame Checksum 1021. The FCoE frame is received by FIA 1 1028. FIA 1 1028 replaces the destination Ethernet MAC address with the MAC address of VN_Port2 1015, the source Ethernet MAC address with FCF-MAC address FIACntlrMAC 1014 and calculates a new FCS 1011. The modified FCoE frame 1010 is transmitted to FIA 2 1027. Upon receipt of the frame, FIA 2 1027 may forward the frame based on any number of forwarding methods to FIA 3 1030. FIA 3 1030 receives the frame and forwards the frame to the destination VN_Port, VN_Port2 1053 with the original source and destination Ethernet MAC addresses from the frame received from FIA 2 1027.

Figure 21:
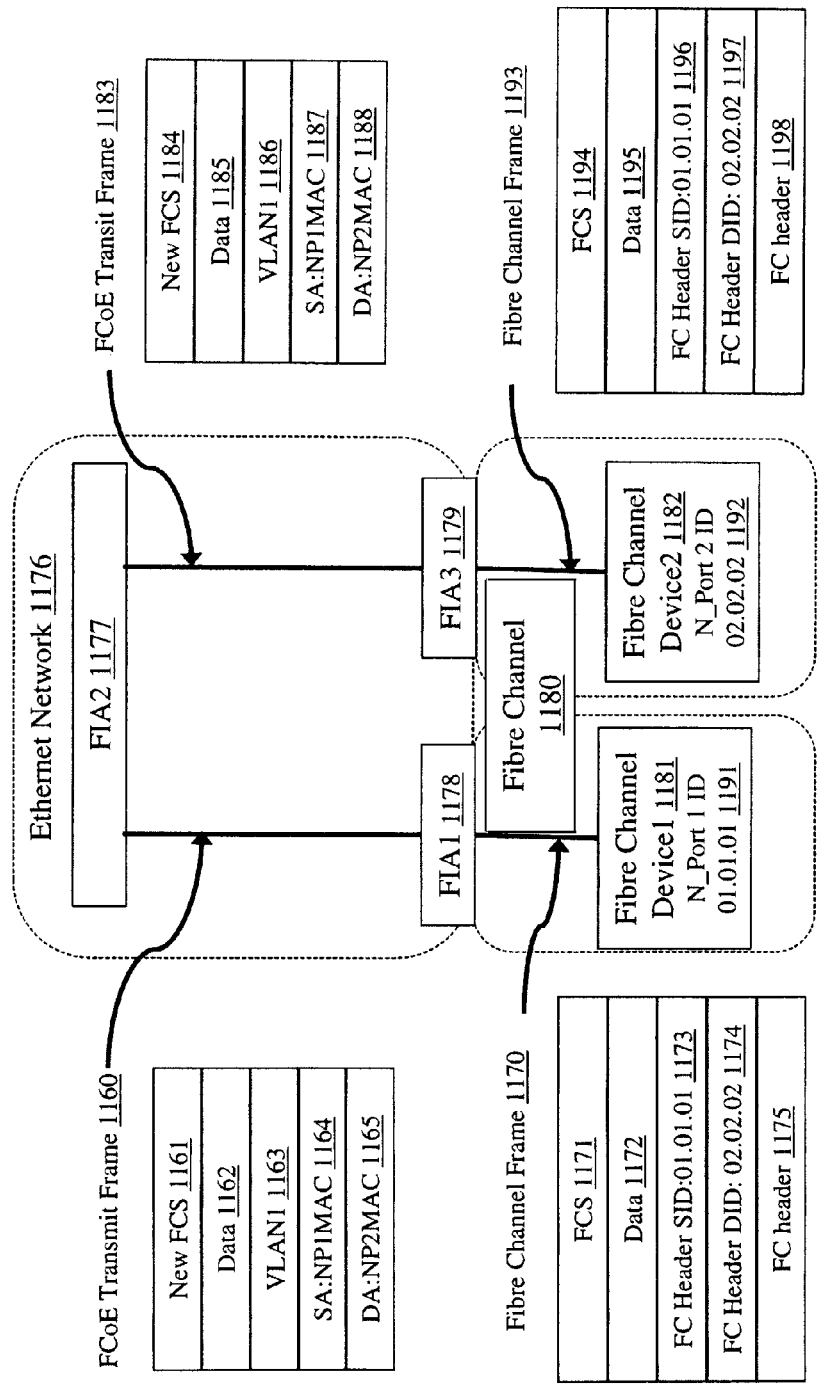
FIG. 21 is a diagram showing the interconnection of two Fibre Channel devices through a network of FIAs.

FIG. 21 is a diagram showing the interconnection of two Fibre Channel devices through a network of FIAs. Fibre Channel Device1 1181 is connected to FIA 1 1178 over a Fibre Channel connection 1180. Fibre Channel Device2 1182 is connected to FIA 3 1179 over a Fibre Channel connection 1180. FIA 1 is connected to FIA2 1177 over an Ethernet network 1176. FIA2 1177 is connected to FIA3 1179 over an Ethernet network 1176. FIG. 21 assumes the FLOGI request and response interchange has occurred. N_Port 1 1191 contained in Fibre Channel Device1 1181 transmits a Fibre Channel frame 1170 addressed 1174 to N_Port 2 1192 contained in Fibre Channel Device2 1182. FIA1 1178 receives the Fibre Channel frame, encapsulates it into a FCoE frame 1160, comprising a source Ethernet MAC address of the internal MAC address of N_Port 1 NP1MAC 1164 1187 previously assigned by the FIA Controller and comprising a destination Ethernet MAC address of the internal MAC address of N_Port 2 NP2MAC 1165 1188 previously assigned by the FIA Controller (not shown). FIA 1 1178 then forwards the FCoE frame 1160 to FIA2 1177. FIA2 1177 receives the frame and forwards the FCoE frame 1183 to FIA3 1179. FIA3 1179 receives the frame, decapsulates the frame into a Fibre Channel frame 1193 and transmits it to Fibre Channel Device2 1182.

Figure 22:
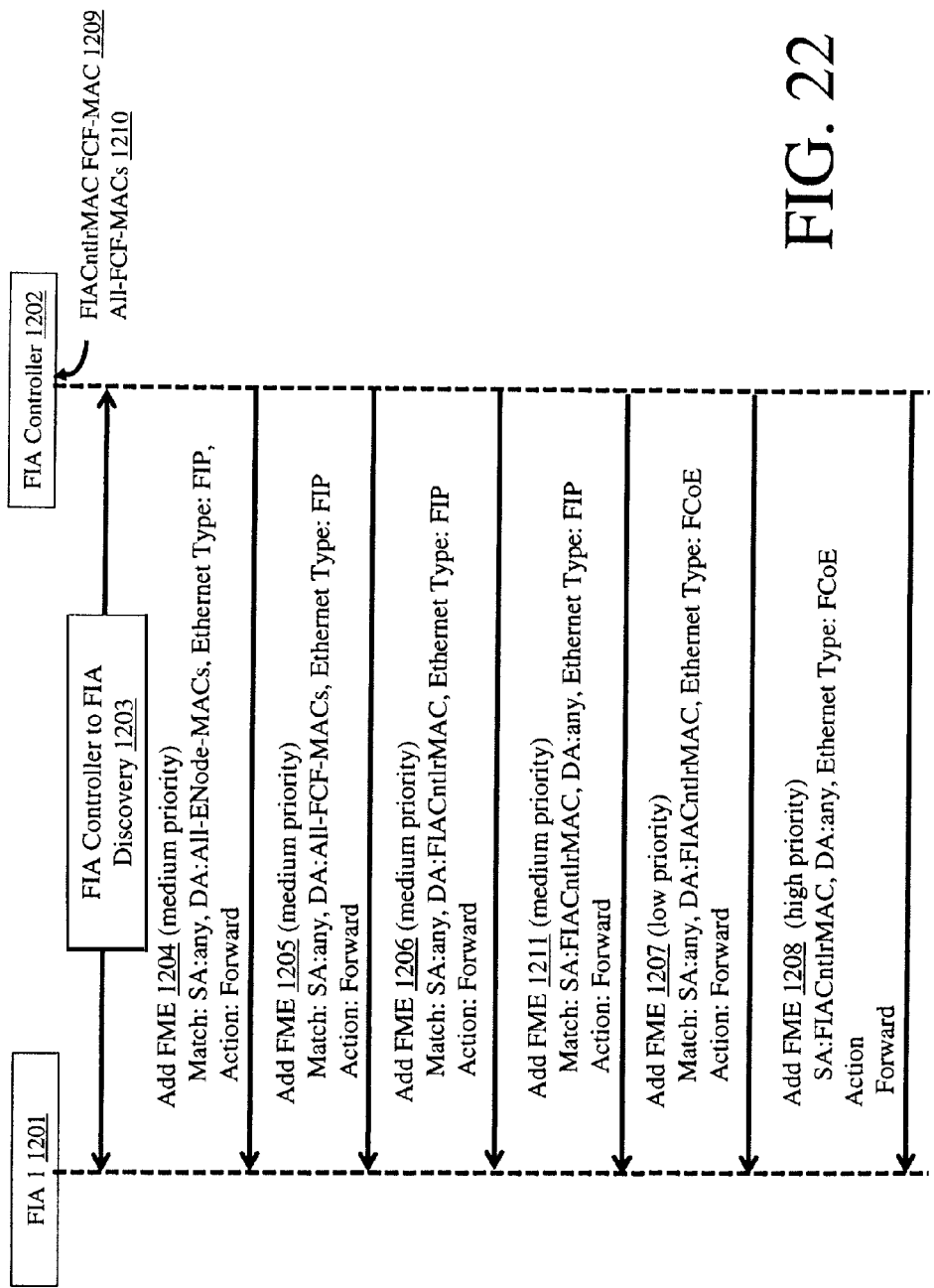
FIG. 22 is a ladder or sequence diagram showing a FIA Controller setting Frame Matching Entries (FMEs) in a FIA.

FIG. 22 is a ladder or sequence diagram showing a FR Controller sending Frame Matching Entries (FMEs) to a FIA. FIG. 22 assumes that the FIA Controller and FIA discovered and connected 1203. FIA and FIAC pair discovery can utilize any methods including but not limited to the Link Level Discovery Protocol, Service Level Protocol, DHCP, monitoring FIA Controller FIP Discovery Advertisements. The FR Controller sends FME's to FIA's to receive initialization and control frames from a network of FIAs. The FIA Controller 1202 sends a FME 1204 frame comprising the following match attributes: any source Ethernet MAC address, All-ENode-MACs destination Ethernet MAC address, Ethernet Type of FIP (FCoE Initialization Protocol). The action is to forward the frame. This FME allows FIP frames addressed to the address All-ENode-MACs to be forwarded to all connected ENodes. The FIA Controller 1202 sends a FME 1205 frame comprising the following match attributes: any source Ethernet MAC address, All-FCF-MACs destination Ethernet MAC address, Ethernet Type of FIP, with an action to forward the frame. This FME allows FIP frames addressed to the address All-FCF-MACs to be forwarded to all connected FCFs. The FIA Controller 1202 is configured to receive frames with the destination Ethernet MAC address of All-FCF-MACs 1210. The FR Controller 1202 sends a FME 1206 frame comprising the following matching attributes: any source Ethernet MAC address, a destination Ethernet MAC address of the FCF-MAC address FIACntlrMAC 1209 (FIA Controller MAC), Ethernet Type of FIP with an action to forward the frame. This FME allows frames addressed 1209 to the FIA Controller 1202 to be forwarded to the FIA Controller 1202. The FIA Controller 1202 then sends a FME to FIA 1 1201 comprising the following match attributes: source Ethernet. MAC address of any, destination Ethernet MAC address of FIA Controller FCF-MAC (FIACntlrMAC), an Ethernet Type of FCoE, a low priority and an action to forward the frame. This FME forwards FCoE frames from the FIA Controller if no other medium or high priority matches occur. The FIA Controller 1202 sends a FME to FIA 1 1201 comprising the following match attributes: source Ethernet MAC address of FIACntlrMAC FCF-MAC address, destination Ethernet MAC address of any, Ethernet Type of FIP, a medium priority for this FME with an action to forward the frame. This FME is for FIP frames sent by the FIA Controller 1202 to ENodes and Fibre Channel devices. The FIAC sends a FME 1208 to FIA 1 1201 includes the following match attributes: source Ethernet MAC address of FIACntlrMAC FCF-MAC address, destination Ethernet MAC address of any, Ethernet Type of FCoE, a higher priority for this FME with an action to forward the frame. This FME is for FCoE frames sent by the FIA Controller 1202 to attached ENodes and Fibre Channel devices.

Figure 23:
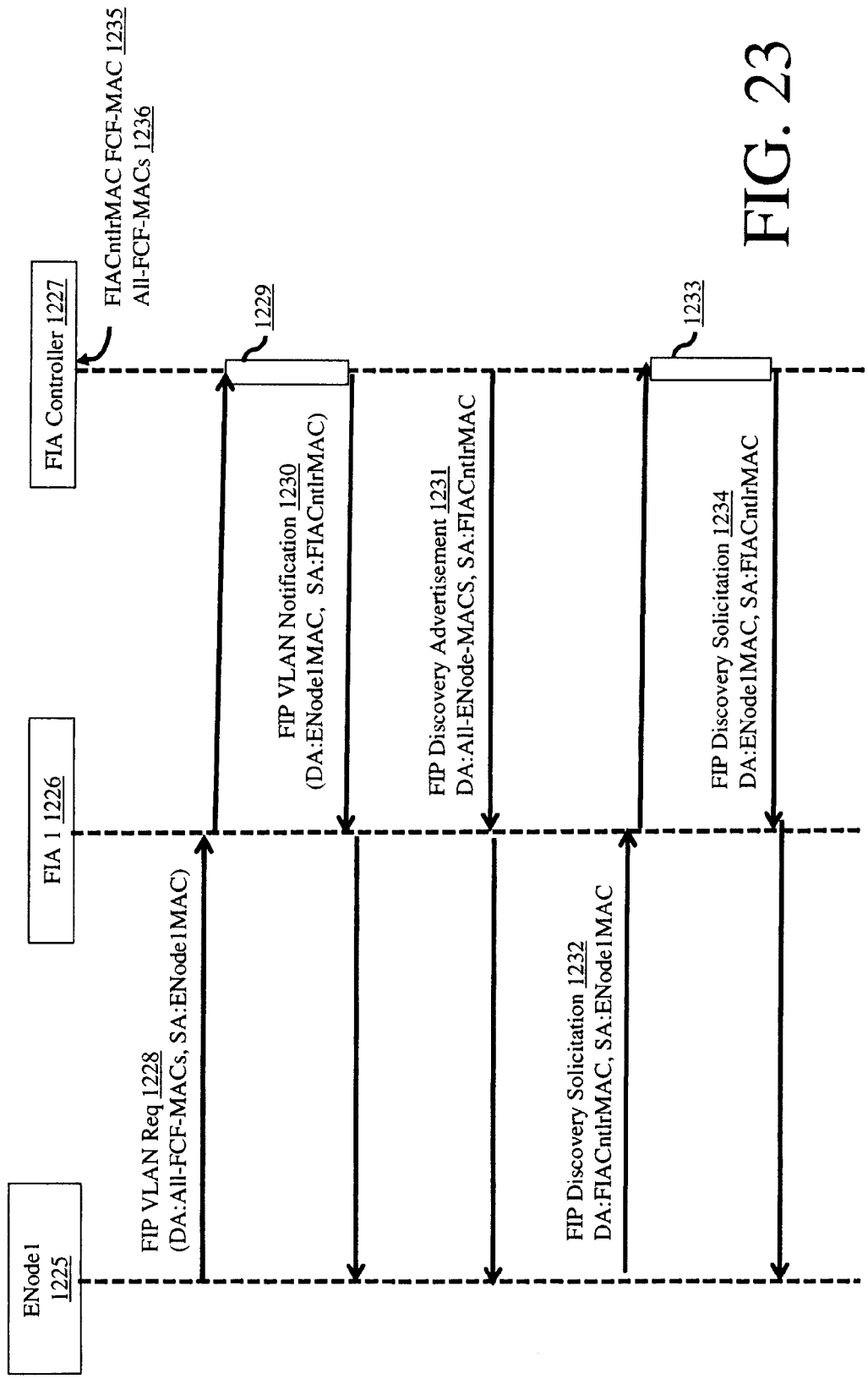
FIG. 23 is a ladder or sequence diagram of the FIP Discovery frame exchange protocol between a FIA Controller and a FIA.

FIG. 23 is a ladder or sequence diagram of the FIP Discovery frame exchange protocol between a FIA Controller and a FIA. ENode1 1225 sends a FIP VLAN Request 1228 with the destination Ethernet MAC address of All-FCF-MACs to the connected FIA 1226. FIA 1 1226 forwards the frame based on a FME entry FIG. 22 1205 that was previously received from the FIA Controller 122.7. The FIA Controller 1227 responds with a FIP VLAN Notification 1230 message with the destination MAC address of ENode1 1225 and a source Ethernet MAC address of the FIA Controller. The frame is forwarded by FIA 1 1226 using a previously set FME, FIG. 22 121.1, to the destination ENode1 1225. The FIA Controller 1227 transmits a FIP Discovery Advertisement frame 1231 with the destination Ethernet MAC address of All-ENode-MACs and the source Ethernet MAC address of the FIA Controller (FIACntrlMAC). The frame is forwarded by FIA 1 1226 to ENode1 1225. ENode1 1225 transmits a unicast FIP Discovery Solicitation frame 1232 with the destination Ethernet MAC address of the FIA Controller and the source Ethernet MAC address of the ENode 1 1225 (ENode1MAC). FIA 1 1226 forwards the frame to the FIA Controller 1227 which responds with a unicast FIP Discovery Solicitation frame 1234 with the destination Ethernet MAC address of ENode1 1225 (ENode1MAC) and the source Ethernet MAC address of the FIA Controller FCF-MAC address 1227 (FIACntlrMAC).

Figure 24:
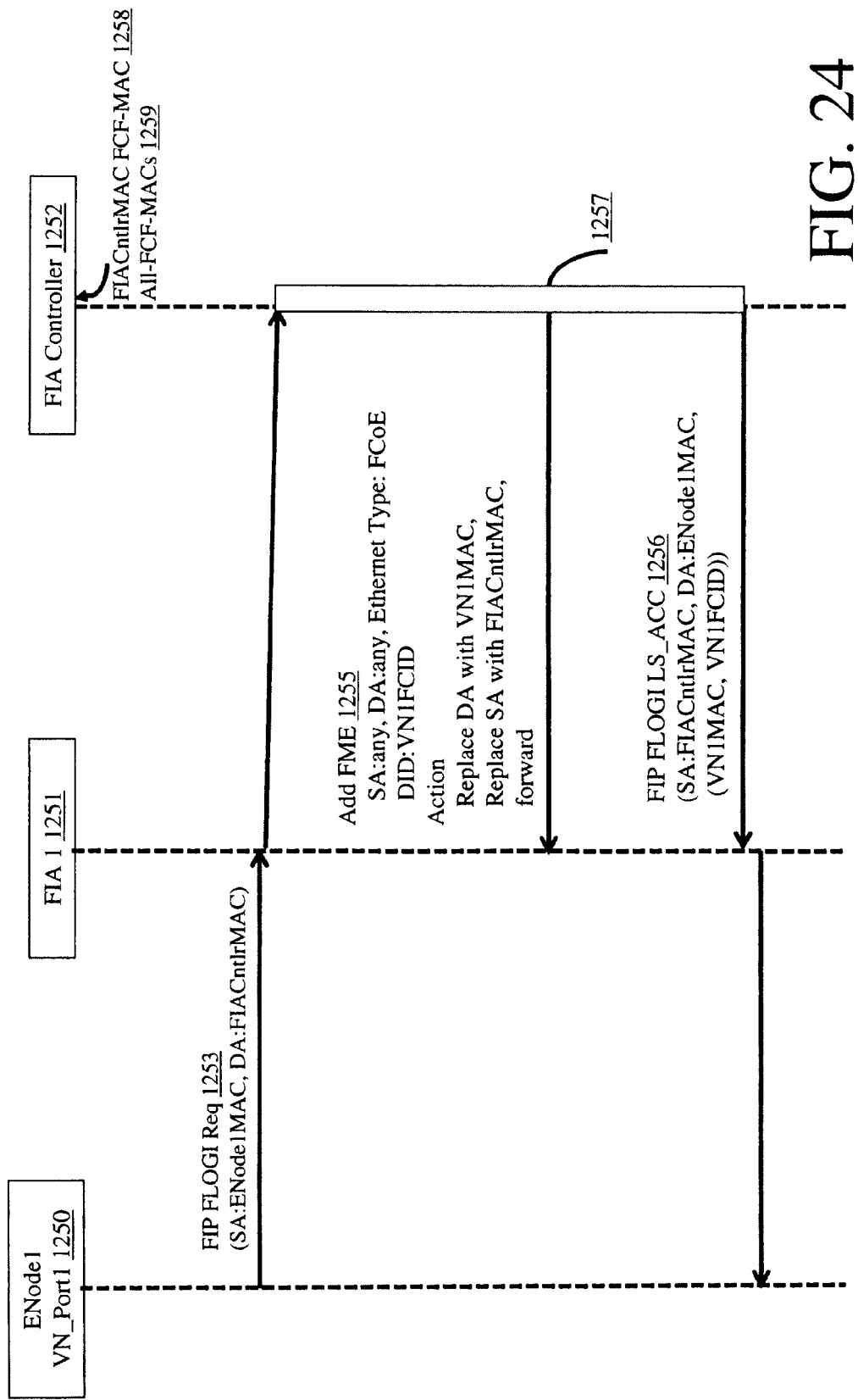
FIG. 24 is a ladder or sequence diagram showing a FIP FLOGI Request, FIP FLOGI LS_ACC frame exchange.

FIG. 24 is a ladder or sequence diagram showing a FTP FLOGI Request, FIP FLOGI LS_ACC frame exchange. ENode1 1250 transmits a FIP FLOGI Request frame 1253 comprising a destination Ethernet FCF-MAC address of the FIA Controller (FIACntrlMAC) and a source Ethernet MAC address of the ENode1 FCoE Controller (ENode1MAC), FIG. 7 214, FIA 1 1251 receives the FIP FLOGI Request and forwards the frame based on a previously assigned FME, FIG. 22 1206, that matches the frame destination Ethernet MAC address of the FIACntlrMAC FCF-MAC address and the Ethernet Type of FIP. The FIA Controller 1252 assigns a MAC address and a Fibre Channel address identifier for the newly instantiated VN_Port 1250. The FIA Controller 1252 adds a FME 1255 to all FIAs in the Discovery Domain of the VN_Port, including the local FIA switch 1251. The FME includes the following match fields: source Ethernet MAC address of any, destination Ethernet MAC address of any, Ethernet Type of FCoE, the Fibre Channel Destination Address Identifier (DID) in the embedded FCoE frame is the newly assigned Fibre Channel address identifier, in this case the symbolic VN1FCID, with an action to replace the destination Ethernet MAC address with the newly assigned VN_Port MAC, in this case the symbolic VN1MAC, replace the source Ethernet MAC address with the FIA Controller FCF-MAC address (FIACntlrMAC), and forward the frame.

Figure 25:
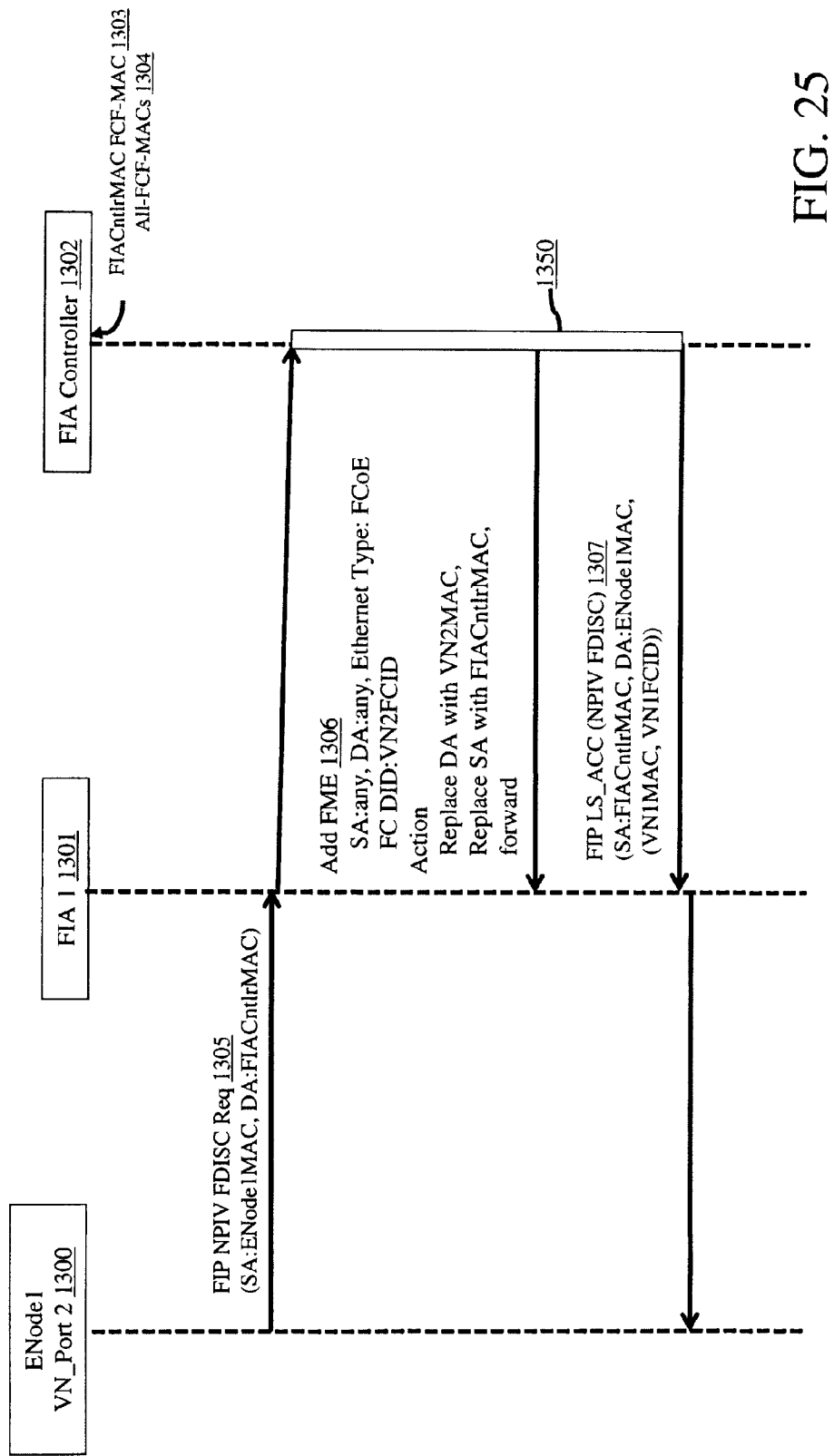
FIG. 25 is a ladder or sequence diagram showing the exchange of a FIP NPIV FDISC/FIP LS_ACC message exchange between an ENode and a FIA Controller.

FIG. 25 is a ladder or sequence diagram showing the exchange of a FIP NPIV FDISC/FIP LS_ACC message exchange between an ENode and a FIA Controller. The ENode 1300 transmits a FIP NPIV FDISC frame 1305 with the destination Ethernet MAC address of the FIA Controller FCF-MAC address (FIACntlrMAC) and a source Ethernet MAC address of the FCoE_Controller (ENode1MAC). FIA 1 1301 forwards the frame based on the previously assigned FME, FIG. 22 1206, that matches the frame destination Ethernet MAC address of the FIACntlrMAC FCF-MAC address and the Ethernet Type of FIP. The FIA Controller 1302 assigns a MAC address and a Fibre Channel address identifier for the newly instantiated VN_Port 1300. The FIA Controller 1302 adds a FME entry 1306 to all FIAs in the Discovery Domain of the VN_Port, including the local FIA switch 1301. The FME includes the following match fields: source Ethernet MAC address of any, destination Ethernet MAC address of any, Ethernet. Type of FCoE, the Fibre Channel Destination Address Identifier (DID) in the embedded FCoE frame is the newly assigned Fibre Channel address identifier, in this case the symbolic VN2FCID. The action upon frame match is to replace the destination Ethernet MAC address with the newly assigned VN_Port MAC, in this case the symbolic VN2MAC, replace the source Ethernet MAC address with the FIA Controller FCF-MAC address (FIACntlrMAC), and forward the frame.

Figure 26:
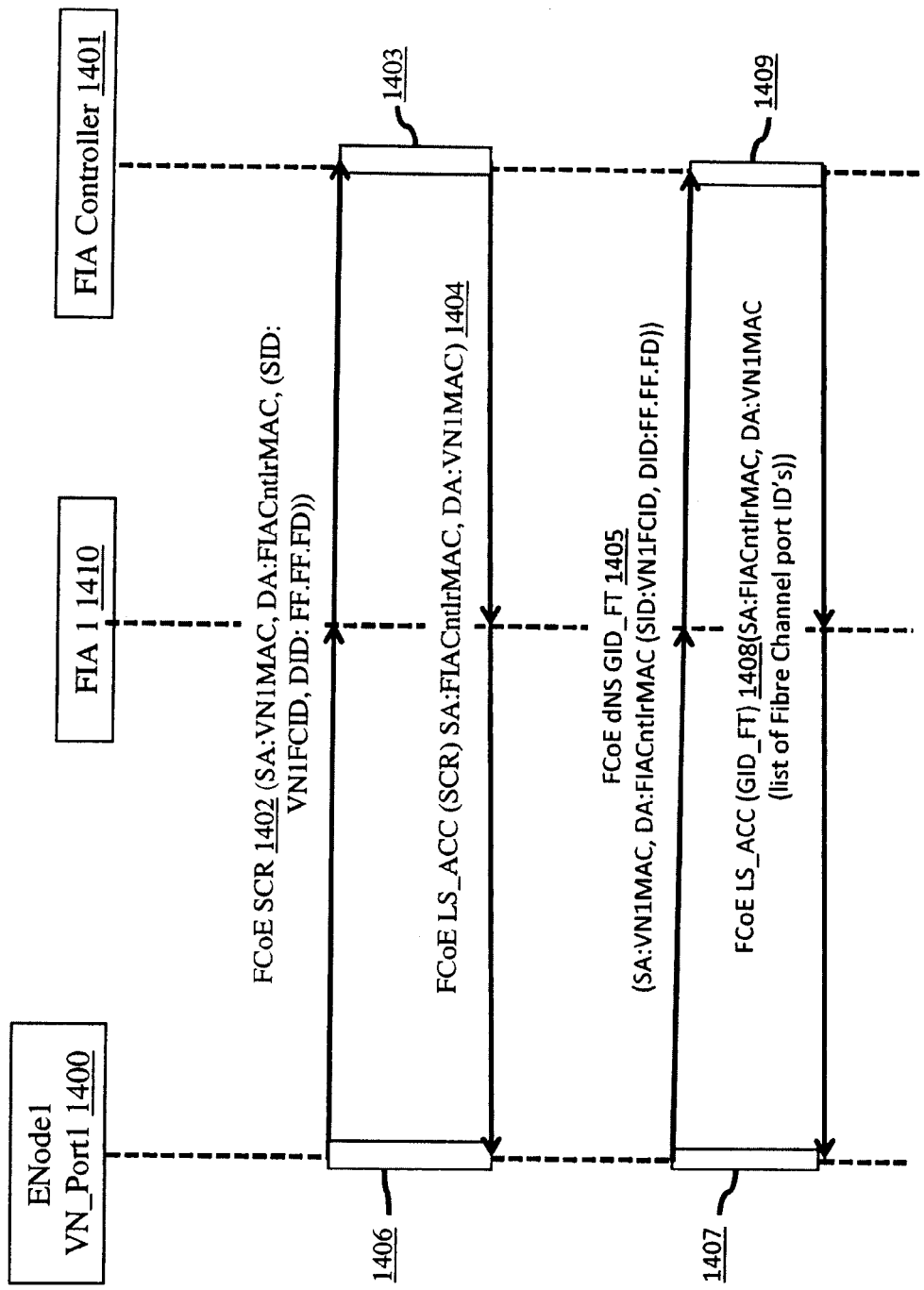
FIG. 26 is a ladder or sequence diagram showing the exchange of a FCoE State Change Registration request and LS_ACC response message exchange in addition to a Name Server query request and response message exchange.

FIG. 26 is a ladder or sequence diagram showing the exchange of a FCoE State Change Registration request and LS_ACC response message exchange in addition to a Name Server query request and response message exchange. VN_Port1 of ENode1 1400 transmits a FCoE SCR Request message 1402 with a destination Ethernet MAC address of the FIA Controller FCF-MAC address (FIACntlrMAC), a source Ethernet MAC address of the transmitting VN_Port (VN1MAC), a Fibre Channel destination address identifier (DID) of the well known Fabric Controller (FFFFFDh) and the Fibre Channel source address identifier (SID) of the VN_Port1 (VN1FCID). The State Change Registration ELS Request (SCR) requests the Fabric Controller to add the VN_Port that is sending the SCR Request to the list of VN_Port/Nx_Ports registered to receive the RSCN (Register State Change Notification) ELS frames. FIA 1 receives the FCoE SCR frame and forwards it to the FIA Controller 1401. The FIA Controller Fabric Services Frame Handler, FIG. 15 651, services the frame and transmits a FCoE LS_ACC Response 1404 comprising a destination Ethernet MAC address of the VN_Port (VN1MAC) and a source Ethernet MAC address of the FIA Controller FCF-MAC address 1401 (FIACntlrMAC). VN_Port1 of ENode1 1400 transmits a Name Server query, Get Port Identifiers (GID_FT) request 1405 to return all Port Identifiers having registered support for the specified FC-4 TYPE. The FIA Controller 1401 queries the internal Name Server for all registered FC-4 TYPEs visible, i.e., in the same Discovery Domains, as querying VN_Port1. The FIA Controller 1401 returns a FCoE LS_ACC 1408 to VN_Port1 1400 which may comprise a list of Fibre Channel Port Identifiers.

Figure 27:
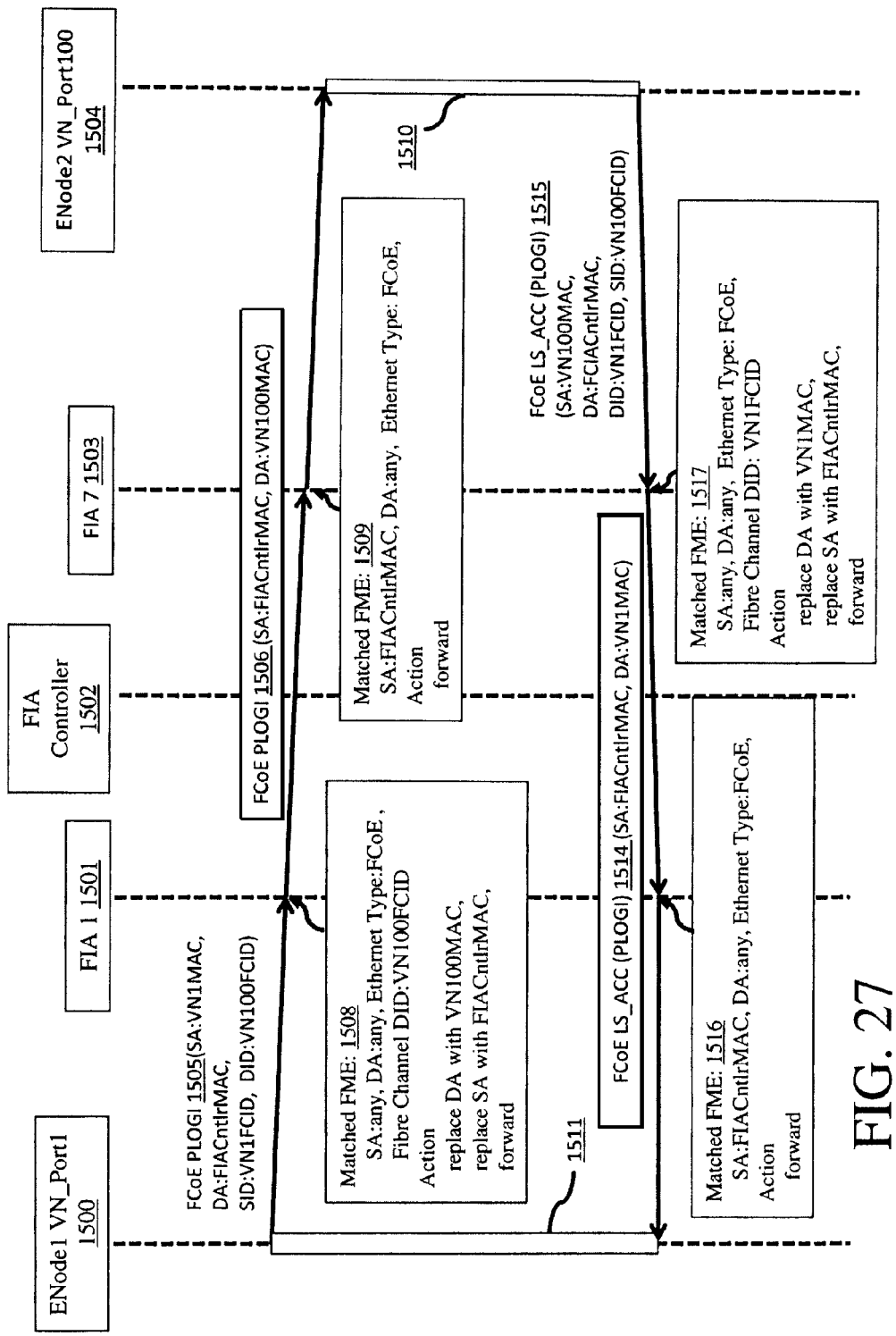
FIG. 27 is a ladder or sequence diagram showing a PLOGI exchange between ENodes.

FIG. 27 is a ladder or sequence diagram showing a PLOGI exchange between ENodes. VN_Port1 of ENode1 1500 transmits a FCoE PLOGI request 1505 with a source Ethernet MAC address of the VN_Port1 (VN1MAC), a destination Ethernet MAC address of the FIA Controller 1502, a Fibre Channel source address identifier (SID) of VN_Port1 (VN1FCID), and a Fibre Channel destination address identifier (DID) of VN_Port100 (VN100FCID) contained in ENode2 1504. FIA 1 1501 matches the frame with the FME 1508 match fields comprising the source and destination Ethernet MAC addresses of any, the Ethernet Type of FCoE, the Fibre Channel destination address identifier (DID) of VN_Port100 (VN100FCID). The action is to replace the destination Ethernet MAC address with VN_Port100's MAC address (VN100MAC), the source Ethernet MAC address with the FIA Controller FCF-MAC address (FIACntlrMAC), and to forward the frame. The frame is forwarded to FIA 7 1503, Note that once the FIP sequence is complete and the frames are not destined for Fabric Services well known addresses, the FIA Controller 1502 is not involved in processing the frames, i.e., receiving the frame and forwarding the frame. FIA 7 1503 receives the FCoE PLOGI frame and forwards the frame based on the previously assigned FME comprising the matching fields of source Ethernet MAC address of the FIA Controller FCF-MAC address 1502 (FIACntlrMAC), a destination Ethernet MAC address of any, an Ethernet Type of FCoE, and action is forward the frame. VN_Port100 of ENode2 1504 receives the FCoE PLOGI and responds with a FCoE LS_ACC to the PLOGI 1515. The FCoE LS_ACC includes a destination Ethernet MAC address of the FIA Controller FCF-MAC address (FIACntlrMAC), a source Ethernet MAC address of VN_Port100 (VN100MAC), a Fibre Channel destination address identifier (DID) of VN_Port1 (VN1FCID), and a Fibre Channel source address identifier if VN_Port100 (VN100FCID). FIA 7 1503 uses the previously assigned FME 1517 comprising the match fields of source and destination Ethernet MAC address of any, the destination Fibre Channel address identifier (DID) of VN_Port1 (VN1FCID), and the Ethernet Type of FCoE, and with an action to replace the destination Ethernet MAC address with VN_Port1's MAC address (VN1MAC), replace the source Ethernet MAC address with the FIA Controller 1502 FCF-MAC address (FIACntlrMAC), and forward the frame. The frame is forwarded 1514 to FIA 1 1501 which matches the frame with the FME 1516 comprising the match fields of the source Ethernet MAC address of the FIA Controller 1502 FCF-MAC address (FIACntlrMAC), the destination Ethernet MAC address of any, the Ethernet Type of FCoE, with an action to forward the frame to VN_Port1 in ENode1 1500.

Figure 28:
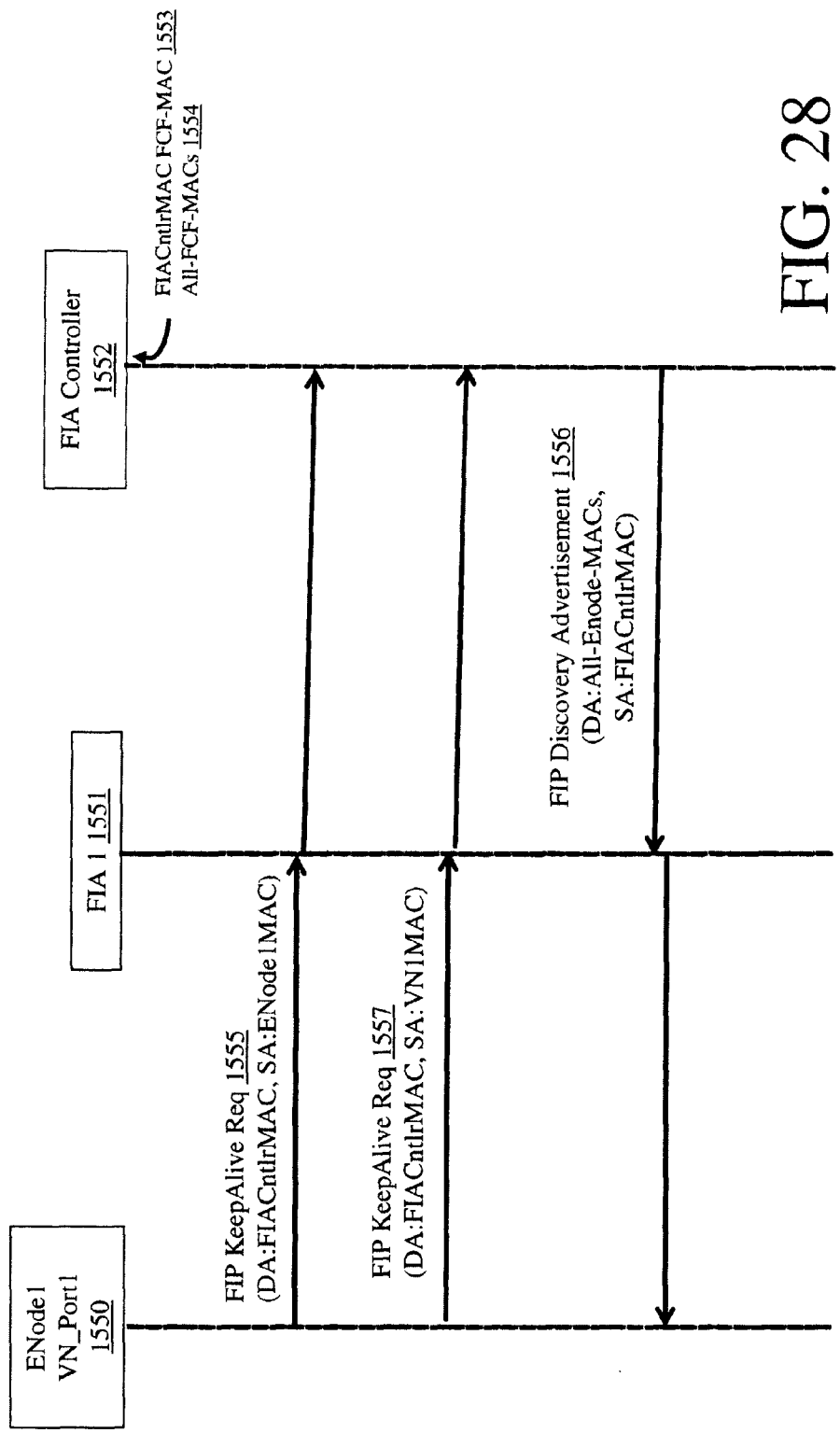
FIG. 28 is a ladder or sequence diagram showing an ENode and a VN_Port transmitting a FIP Keep Alive frames.

FIG. 28 is a ladder or sequence diagram showing an ENode and a VN_Port transmitting a FIP Keep Alive frames. FIG. 28 further shows the FIA Controller 1552 transmitting a FIP Discovery Advertisement frame 1556. ENodes and VN_Ports transmit FIP Keep Alive frames on specified intervals to signal the FCF, in this example the FIA Controller that they are still reachable. FIA 1 1551 forwards the frames based on a previously assigned FME to forward frames with the destination Ethernet MAC address of the FIA Controller FCF-MAC address (FIACntlrMAC) and the Ethernet Type of a FIP frame. The FIA Controller 1552 transmits FIP Discovery Advertisement frames 1556 addressed to All-ENode-MACs to advertise the MAC address and the reachability of the FIA Controller 1552. FIA 1 1551 forwards the FIP Discovery Advertisement frames based on a previously assigned FME forwarding based on the destination Ethernet MAC address of All-ENode-MACs and the Ethernet frame Type of FIP.

Figure 29:
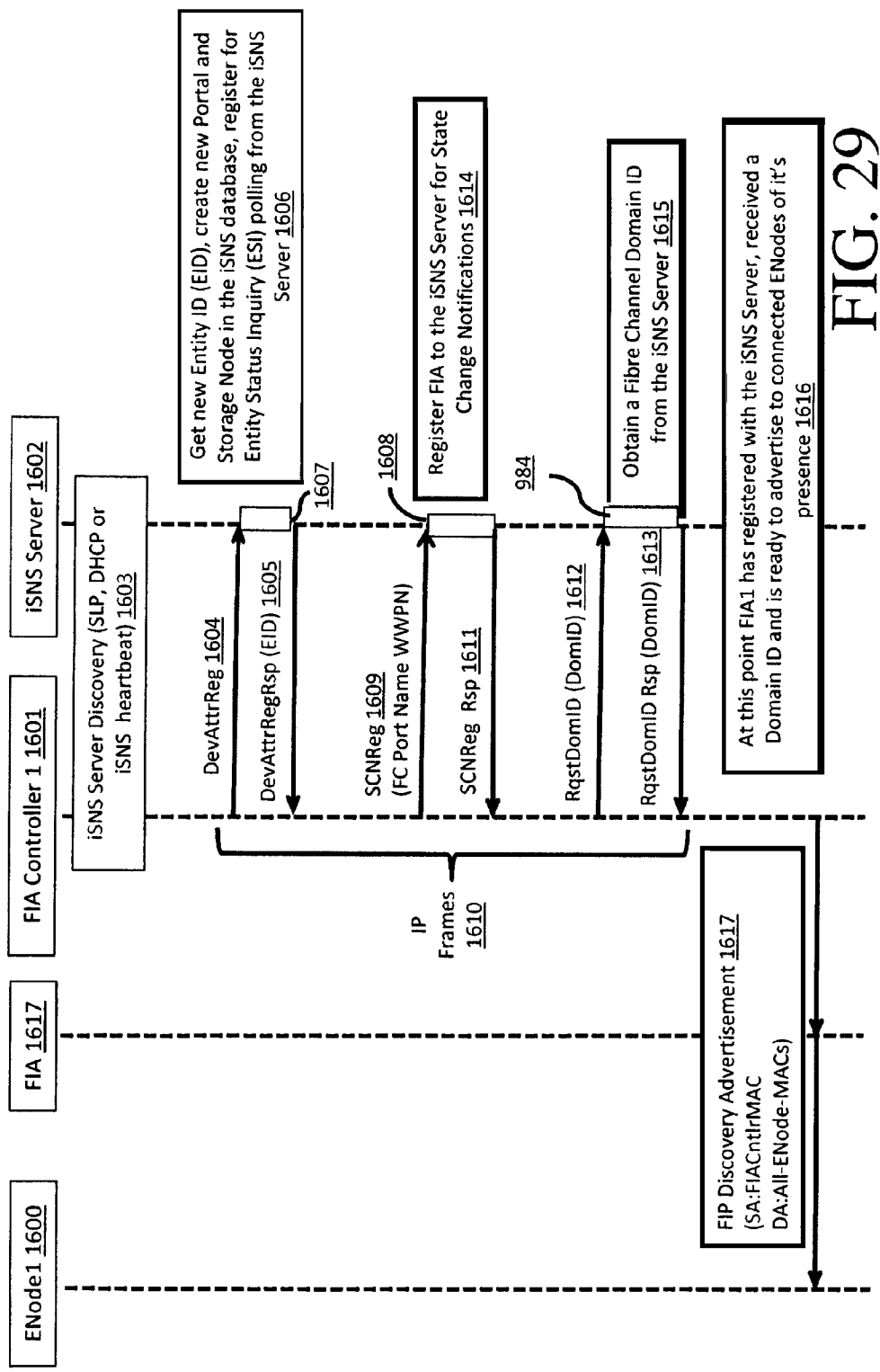
FIG. 29 is a sequence or ladder diagram showing the initialization of a FIA utilizing an iSNS Server for State Change Notification, Discovery Domain, and Name Services.

FIG. 29 is a sequence or ladder diagram showing the initialization of a FIA Controller utilizing an iSNS Server for State Change Notification, Discovery Domain, and Name Services. The Internet Storage Name Service (iSNS) Protocol (iSNSP) is used for interaction between iSNS Server 1602 and the FIA Controller 1601. In this exemplary invention, the iSNS Server 1602 has been adapted to facilitate automated discovery, management, and configuration of FCoE and Fibre Channel devices in a network of FIAs. An iSNS Server provides intelligent storage discovery and management services comparable to those found in Fibre Channel networks. Since an iSNS Server is currently adapted to only discovery and manage iSCSI and iFCP devices, in the current exemplary invention, the FIAC translates and adapts the messages to and from the iSNS Server to make it useful for a repository of currently active FCoE and Fibre Channel nodes and related attributes. The FCoE and Fibre Channel nodes communicate to a FIA Controller 1601 which in turn may communicate to the iSNS Server 1602. In the exemplary invention, the FIA may translate certain FIP, FCoE, and Fibre Channel commands that are directed to Fibre Channel Fabric Services into iSNS commands and responses, i.e., there is not direct communication between ENodes, Fibre Channel nodes, FIAs and the iSNS Server. By translating the commands and responses, this allows an iSNS Server to manage a dynamic database of the FCoE and Fibre Channel devices, through a FIA Controller, and related information that are currently available on the network. The database helps provide FCoE and Fibre Channel target discovery functionality for the FCoE and Fibre Channel initiators on the network, through a FIA and a FIAC. The database is kept dynamic by using the Registration Period and Entity Status Inquiry features of iSNS, Registration Period allows the server to automatically deregister stale entries, Entity Status Inquiry provides the server a capability similar to ping to determine whether registered clients, i.e., FIA and the ENodes they are connected to, are still present on the network, and allows the server to automatically deregister those clients which are no longer present. The iSNS Server also supports a State Change Notification Service, allowing registered clients to be made aware of changes to the database in the iSNS server. The iSNS Server database is the information repository for iSNS Servers. It maintains information about iSNS client attributes. A directory-enabled implementation of iSNS may store client attributes in a Lightweight Directory Access Protocol (LDAP) directory infrastructure. The iSNS Server provides a name registration service function to allow all entities through a FIA Controller in a storage network to register and query the iSNS database. Both targets and initiators can register, translated by a FIA Controller, in the iSNS database, as well as query for information about other initiators and targets. This allows, for example, a client initiator to obtain information about target devices from the iSNS server. This service is modeled on the Fibre Channel Generic Services Name Server described in Internet Engineering Task Force (IETF) request for comment (RFC) documents, with extensions, operating within the context of an IP network. The iSNS Server provides a Discovery Domain (DD) service, similar to zones in a Fibre Channel fabric, facilitating the partitioning of FCoE and Fibre Channel devices into manageable groupings for administrative and logon control purposes. It allows the administrator to limit the logon process of each FCoE and Fibre Channel host through a FIA Controller to the more appropriate subset of targets registered in the iSNS Server. Devices can be members of multiple DDs. Logon control allows targets to delegate their access control or authorization policy to the iSNS server. The target node or device downloads, through a FIA, the list of authorized initiators from iSNS. Each node or device is uniquely identified. Only initiators that match the required identification and authorization provided by the iSNS will be allowed access by that target node during session establishment. DDs can be managed offline by using a separate management computer that is using the iSNS Protocol or SNMP or communicates to a FIA Controller which in turn communicates with the iSNS Server. Valid and active discovery domains belong to at least one active DDS. Discovery domains that do not belong to an activated DDS are not enabled. The iSNS server maintains the state of DD membership for all FCoE and Fibre Channel devices, even for those devices that have been deregistered. DD membership is persistent regardless of whether a FCoE or Fibre Channel device is actively registered in the iSNS database. The State Change Notification (SCN) service allows the iSNS Server to issue notifications to FIA Controllers about network events that affect the operational state of storage nodes. FIA Controllers may translate the iSNS Server State Change Notification messages into FCoE and Fibre Channel based State Change Notification messages. A FCoE or Fibre Channel initiator sends name server queries to a FIA Controller, which may translate the messages and query the iSNS Server to discover FCoE and Fibre Channel target devices. A management station may use iSNS to monitor storage devices and enable or disable storage sessions by configuring discovery domains. A management station usually interacts with the iSNS Server as a control node with access to all iSNS database records and privileges to modify discovery domains. Through manipulation of discovery domains, the management station controls the scope of device discovery for FCoE and Fibre Channel devices that query the iSNS server through a FIA Controller.

Referring to FIG. 29, the FIA Controller 1601 discovers the presence 1603 of the iSNS Server 1602. There are several methods of discovery that the FIA Controller 1601 can utilize. They include using the Service Location Protocol (SLP, see RFC 2608) that provides a flexible and scalable framework for providing FIA Controllers with access to information about the existence, location, and configuration of networked services, including the iSNS Server. Another method of iSNS Server IP address discovery can be through the stored value in a DHCP server, where it can be downloaded by FIA Controller. A further method of iSNS Server discovery is to monitor by the FIA Controller for iSNS Server heartbeat broadcasts. This can also notify FIA Controllers of the existence of more than one iSNS Server, for example for backup iSNS Servers. Upon discovery of the iSNS Server, a FIA Controller transmits a Device Attribute Registration Request (DevAttrReg) 1604 to the iSNS Server which may register new objects which may include but not be limited to it's Portal IP address, TCP/UDP Port, Entity Status Inquiry (ESI) Interval and Port, Fibre Channel Port Name of the FIA Port, Fibre Channel address identifier. The iSNS Server 1602 receives the DevAttrReg Request 1604, updates the iSNS database for this FIA Controller and responds with a Device Attribute Registration Response (DevAttrRegRsp) 1605 message. One of the attributes of the DevAttrRegRsp 1605 message is the Entity Identifier (EID) that uniquely identifies each Network Entity registered in the iSNS Server. The FIA Controller 1601 transmits a SCN Register Request (SCNReg) 1609 message to the iSNS Server 1602 to allow the FIA Controller 1601 to register to receive State Change Notification (SCN) messages. The SCN message notifies a FIA of changes to any other remote FIA attached devices (i.e., ENodes or Fibre Channel Devices) within any Discovery Domain of which it is a member. The Discovery Domain (DD) facilitates the partitioning of FIA attached devices (ENodes and Fibre Channel Devices) into more manageable groupings for administrative and login control purposes. It allows the administrator to limit the login process of each ENode or Fibre Channel Device to the more appropriate subset of devices registered in the iSNS Server Database. The devices are usually storage targets. This service is similar to Fibre Channel zoning, where zones are created composed of related devices, such as initiator target pairs, providing security to exclude non-administratively configured devices. A Request FC_DOMAIN_ID (RqstDomId) message 1612 is sent from the FIA Controller 1601 to the iSNS Server 1602. The RqstDomId message 1612 is used to allocate non-overlapping FC_DOMAIN_ID values. The FC_DOMAIN ID value is stored FIA Controller 1601 resident storage. The iSNS Server 1602 becomes the address assignment authority for the entire FIA fabric. After receipt of the Request FC_DOMAIN_ID Response (RqstDomIdRsp) 1613 from the iSNS Server 1602, the FIA Controller 1601 then sends a FIP Discovery Advertisement frame 1617 to start the discovery protocol to find attached ENodes. The FIP Discovery Advertisement frame 1617 is received by the FIA 1617 which forwards the frame to ENode1 1600. Further in FIG. 28, The DevAttrReg 1604, DevAttrRegRsp 1605, SCN-Reg 1609, SCNReg Rsp 1611, RqstDomID 1612, and Rqst-DomID Rsp 1613 messages are all IP 1610 encapsulated iSNS messages.

Figure 30:
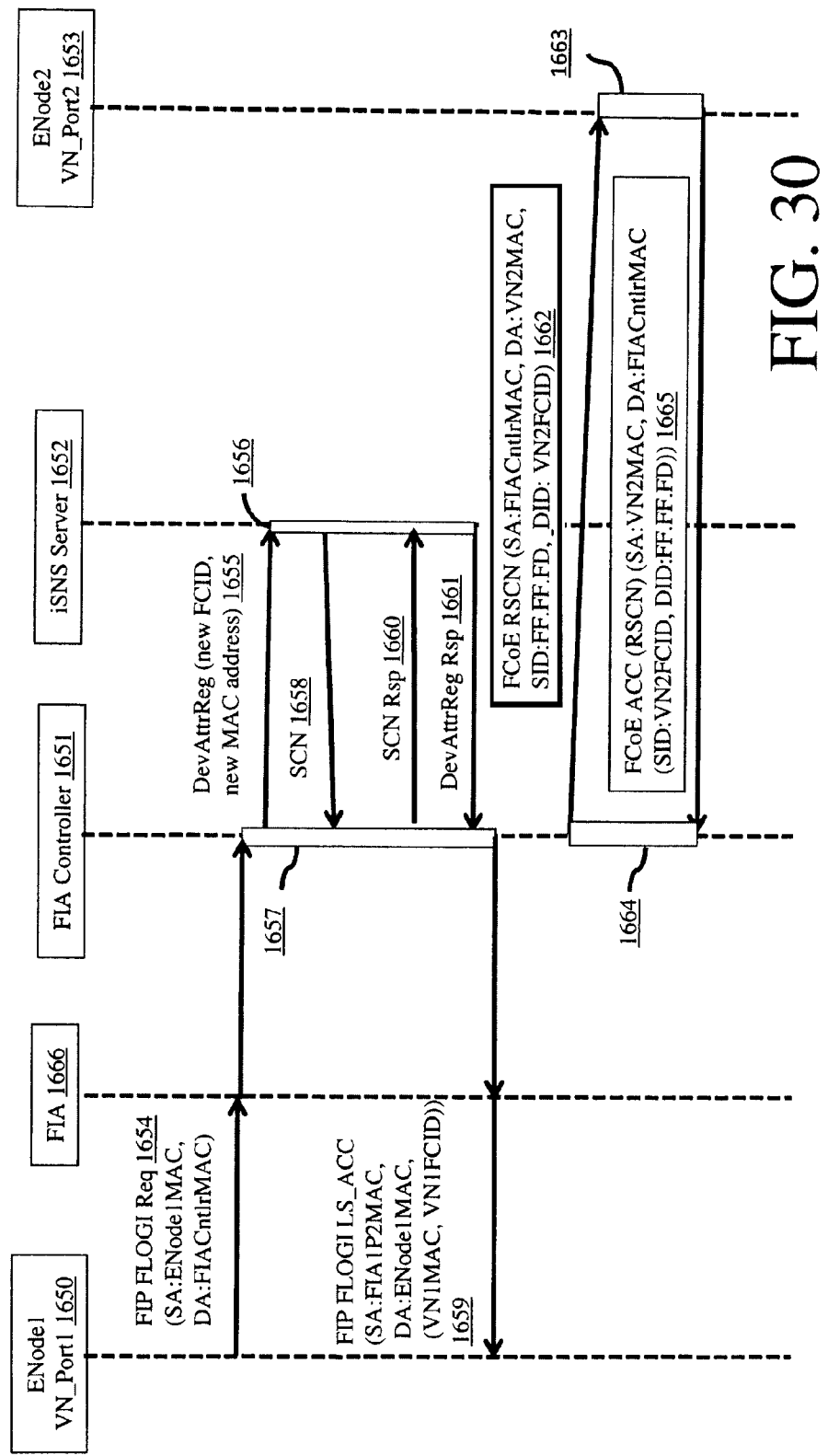
FIG. 30 is a ladder or sequence diagram showing the interaction between an ENode, a FIA Controller, an iSNS Server, and a remote ENode upon the exchange of FLOGI/LS_ACC FCoE frames.

FIG. 30 is a ladder or sequence diagram showing the interaction between an ENode, a FIA Controller, an iSNS Server, and a remote ENode upon the exchange of FLOGI/LS_ACC FCoE frames. ENode1 1650 transmits a FIP FLOGI Request frame 1654 to the FIA 1666. The FIA 1666 forwards the frame to the FIA Controller 1651. The FIA Controller 1651 allocates a new MAC address and a new Fibre Channel address identifier. The FIA Controller 1651 then transmits a DevAttrReg request 1655 comprising the new MAC address and the new Fibre Channel address identifier to the iSNS Server 1652. The iSNS Server 1652 updates its internal database with the new information. FIG. 30 assumes that VN_Port2 in ENode2 1653 has previously initialized, registered into the name server table, and is in the same Discovery Domain as VN_Port1 1650. The iSNS Server 1652 sends a State Change Notification message to the FIA Controller 1651 which in turn translates the message into a Fibre Channel State Change Notification message and transmits it to the FIA 1617 which forwards the frame to ENode2 1662, ENode2 1662 transmits the RSCN response message 1665 back to the FIA Controller 1651, The FIA Controller 1651 transmits a LS_ACC FIP frame 1659 to the FIA 1666 in response to the FIP FLOGI request frame, which in turn forwards the frame to the ENode1 1650, completing the FIP FLOGI/LS_ACC frame exchange.

Figure 31:
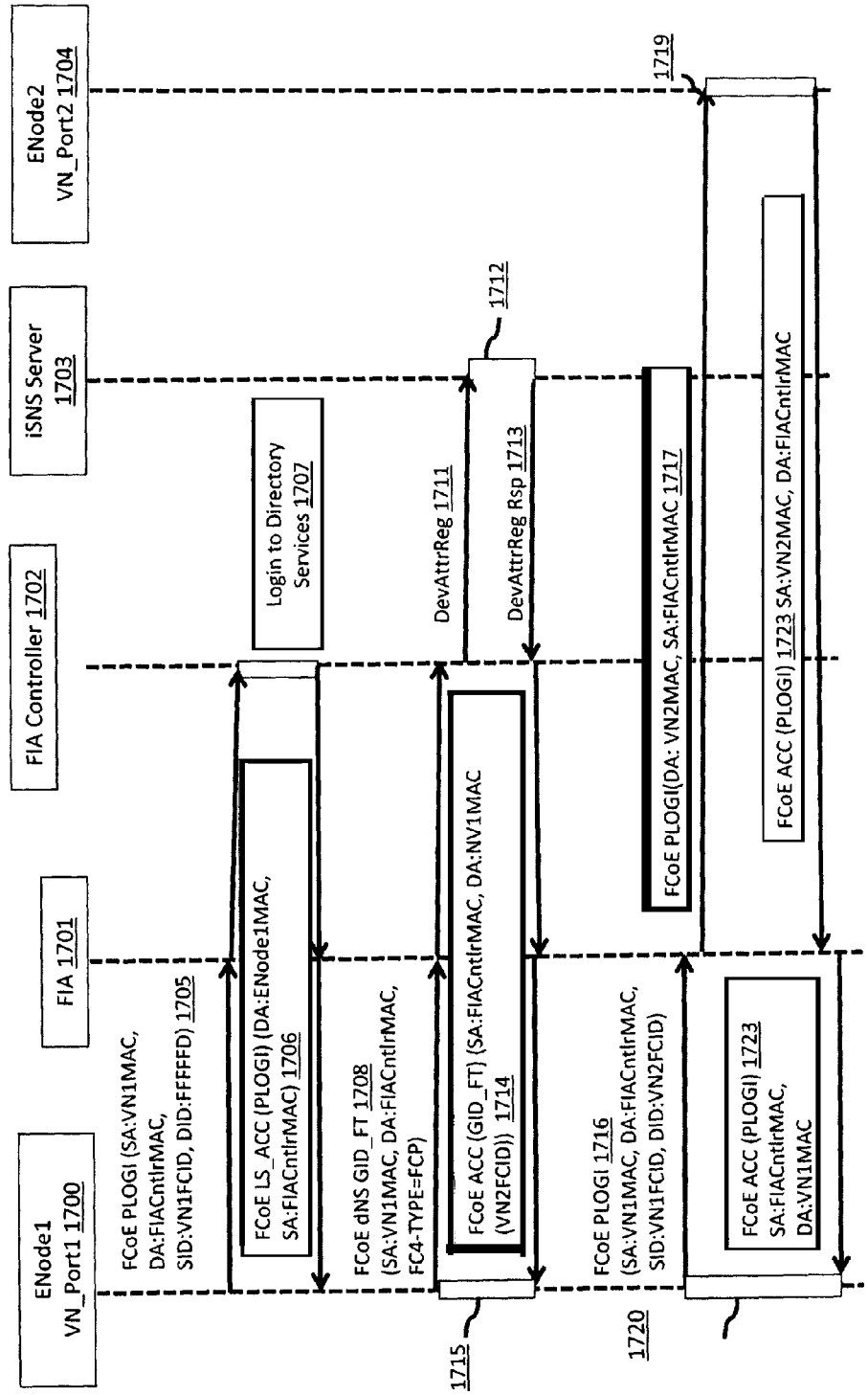
FIG. 31 is a ladder or sequence diagram showing the initialization and discovery between two ENodes using the FIA Controller and iSNS Server.

FIG. 31 is a ladder or sequence diagram showing the initialization and discovery between two ENodes using the FIA Controller and iSNS Server, VN_Port1 1700 transmits a FCoE PLOGI frame 1705 to login to the Fabric Directory Servicer, FIA 1701 forwards the frame to the FIA Controller 1702. The FIA Controller 1702 transmits a FCoE LS_ACC response 1706. VN_Port1 1700 transmits a FCoE GID_FT name services query 1708 to the Name Server. FIA 1701 receives the frame and forwards it to the FIA Controller 1702 based on a previously assigned FME. The FIA Controller 1702 transmits a DevAttrReg request 1711 to the iSNS Server 1703 requesting information about a FC4-TYPEs of FCP which are in the Discovery Domain of VN_Port1 1700. The iSNS Server 1703 returns a DevAttrReg response with a list of Fibre Channel port or address identifiers identifying which VN_Ports with the same FCP-TYPE are visible to VN_Port1 1700. The FIA Controller 1702 translates the DevAttrReg response message 1713 into a FCoE LS_ACC message 1714 and transmits the message to the FIA 1701. The FIA 1701 receives the message and forwards it to the VN_Port1 1700. In this example, the FCoE LS_ACC response message 17 14 contains the Fibre Channel address identifier for VN_Port2 1704, VN_Port1 1700 transmits a FCoE PLOGI request message 1716 comprising the source Ethernet MAC address of VN_Port1 (VN1MAC) 1716, the destination Ethernet MAC address of the FIA Controller FCF-MAC address (FIACntlr-MAC) 1702, a destination Fibre Channel address identifier (DID) of VN_Port2 (VN2FCID), and a source Fibre Channel address identifier (SID) of VN_Port1 (VN1FCID) 1700. FIA 1701 receives the FCoE PLOGI, substitutes the destination Ethernet. MAC address of VN_Port2 (VN2MAC) 1704 and substitutes the source Ethernet MAC address of the FIA Controller FCF-MAC address (FIACntlrMAC) 1702 and forwards the frame to VN_Port2 1704.

Figure 32:
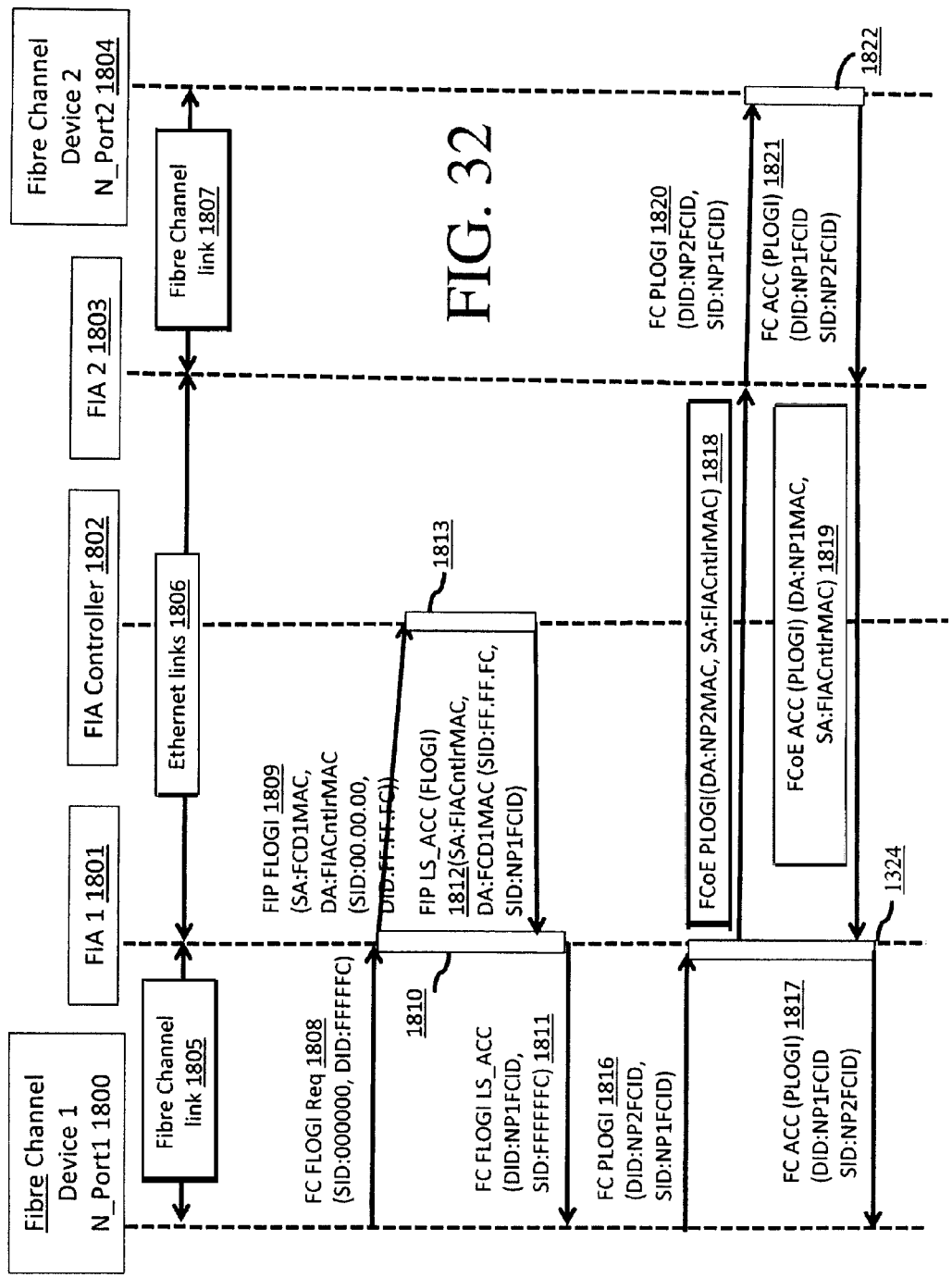
FIG. 32 is a ladder or sequence diagram showing the interconnection of two native Fibre Channel devices through FIAs with ports adapted to connect to Fibre Channel devices.

FIG. 32 is a ladder or sequence diagram showing the interconnection of two native Fibre Channel devices through FIAs with ports adapted to connect to Fibre Channel devices. FIA 1 1801 and FIA 2 1803 comprise ports adapted to connect to Fibre Channel devices 1805 1807. FIA 1 1801 and FIA 2 1803 also comprise ports adapted to connect to Ethernet 1806. Fibre Channel Device 1 1800 transmits a Fibre Channel FLOGI request frame 1808 to FIA1 1801. The Fibre Channel FLOGI frame includes a destination Fibre Channel address identifier of the Directory Service (FFFFFCh), which is implemented within the FIA Controller 1802. FIA 1 1801 receives the Fibre Channel FLOGI frame, encapsulates it into a FCoE frame comprising a source Ethernet MAC address of the Fibre Channel Device (FCD1MAC) and destination Ethernet MAC address of the FIA Controller FCF-MAC address (FIACntlrMAC) 1802. The Fibre Channel Device MAC address is assigned to the Fibre Channel Device 1800 and represents a virtual FCoE_Controller MAC address. This MAC address is only used internally for frames between FIAs and between FIA and FIA Controllers and is not used for FIA to Fibre Channel Device communications over a Fibre Channel link 1805 1807. FIA 1 1801 forwards the FCoE encapsulated Fibre Channel FLOGI frame to the FIA Controller 1802. The FIA Controller 1802 services the frame and returns a FIP LS_ACC response frame 1812 comprising the source Ethernet FCF-MAC address of the FIA Controller (FIACntrlMAC) 1802, the destination Ethernet MAC address of the Fibre Channel Device (FCD1MAC), the source Fibre Channel address identifier of the Directory Service (FFFFFCh), and the newly assigned destination Fibre Channel address identifier of the Fibre Channel Device N_Port1 (VN1FCID). FIA 1 1801 receives the LS_ACC FCoE frame, decapsulates the frame into a Fibre Channel frame and transmits the Fibre Channel frame 1811 to Fibre Channel Device 1 1800. NPort1 in Fibre Channel Device 1 1800 transmits a Fibre Channel PLOGI request frame 1816, addressed to N_Port2 (FCD2FCID) 1804. FIA 1 1801 receives the Fibre Channel PLOGI frame, encapsulates the frame into a FCoE PLOGI frame 1818 comprising a source Ethernet MAC address of N_Port1 (NP1MAC) 1800 and a destination Ethernet MAC address of N_Port2 (NP2MAC) 1804. FIA 1 1801 then forwards the frame 1818 to FIA 2 1803. FIA 2 1803 receives the frame, decapsulates the frame into a Fibre Channel frame and transmits the resulting frame 1820 to N_Port2 in Fibre Channel Device 2 1804. N_Port2 in Fibre Channel Device 2 1804 transmits a Fibre Channel LS_ACC response frame 1821 to the Fibre Channel PLOGI frame. FIA 2 1803 receives the frame, encapsulates the frame into a FCoE frame, comprising a source Ethernet MAC address of N_Port2 (NP2MAC), a destination Ethernet MAC address of N_Port1 (NP1MAC). FIA 2 1803 transmits the frame to FIA 1 1801. FIA 1 1801 decapsulates the FCoE frame into a Fibre Channel frame and transmits the Fibre Channel frame 1817 to N Port1 in Fibre Channel Device 1 1800.

Figure 33:
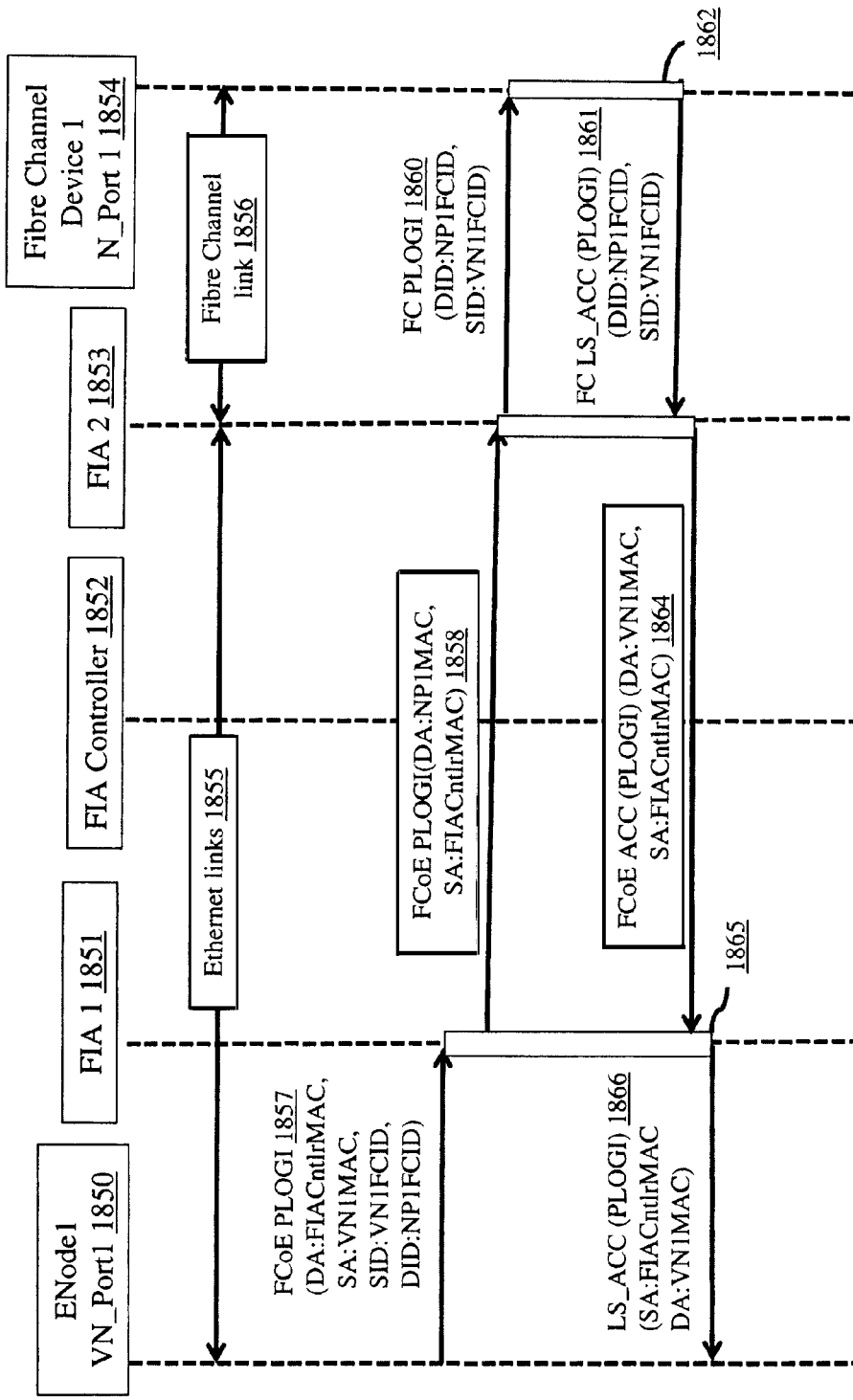
FIG. 33 is a ladder or sequence diagram showing the communication between a ENode and a Fibre Channel Device through FIAs.

FIG. 33 is a ladder or sequence diagram showing the communication between a ENode and a Fibre Channel Device through FIAs. The connections between the ENode1 1850, the FIA 1 1851, the FIA Controller 1852, and at least one port in FIA 2 1853 are Ethernet connections 1855. The connection between FIA 2 1853 and the Fibre Channel Device 1854 is a Fibre Channel connection 1856, VN_Port1 in ENode1 1850 transmits a FCoE PLOGI request 1857 frame comprising the source Ethernet MAC address of VN_Port1 (VN1MAC) 1850, destination Ethernet MAC address of N_Port1 (NP1MAC, not used over Fibre Channel links), a destination Fibre Channel address identifier (DID) of N_Port1 (NP1FCID), and a source Fibre Channel address identifier (SID) of VN_Port1 (VN1FCID). FIA 1 1851 receives the frame, replaces the source Ethernet MAC address with the FIA Controller FCF-MAC address (FIACntlrMAC) 1852 and replaces the destination Ethernet MAC address with N_Port1's MAC address (NP1MAC), then transmits the frame 1858 to FIA 2 1852. FIA 2 1852 receives the frame, decapsulates the frame into a Fibre Channel frame 1860 and transmits the Fibre Channel PLOGI frame to N_Port1 in Fibre Channel Device 1 1854. N_Port1 1854 transmits a Fibre Channel LS_ACC frame to the PLOGI frame 1861. FIA 2 1852 receives the frame and encapsulates it into a FCoE LS_ACC frame, then transmits the frame 1864 to FIA 1 1851. FIA 1 1851 receives the frame from FIA 2 1852, then forwards the frame to VN_Port1 in ENode1 1850.

Figure 34:
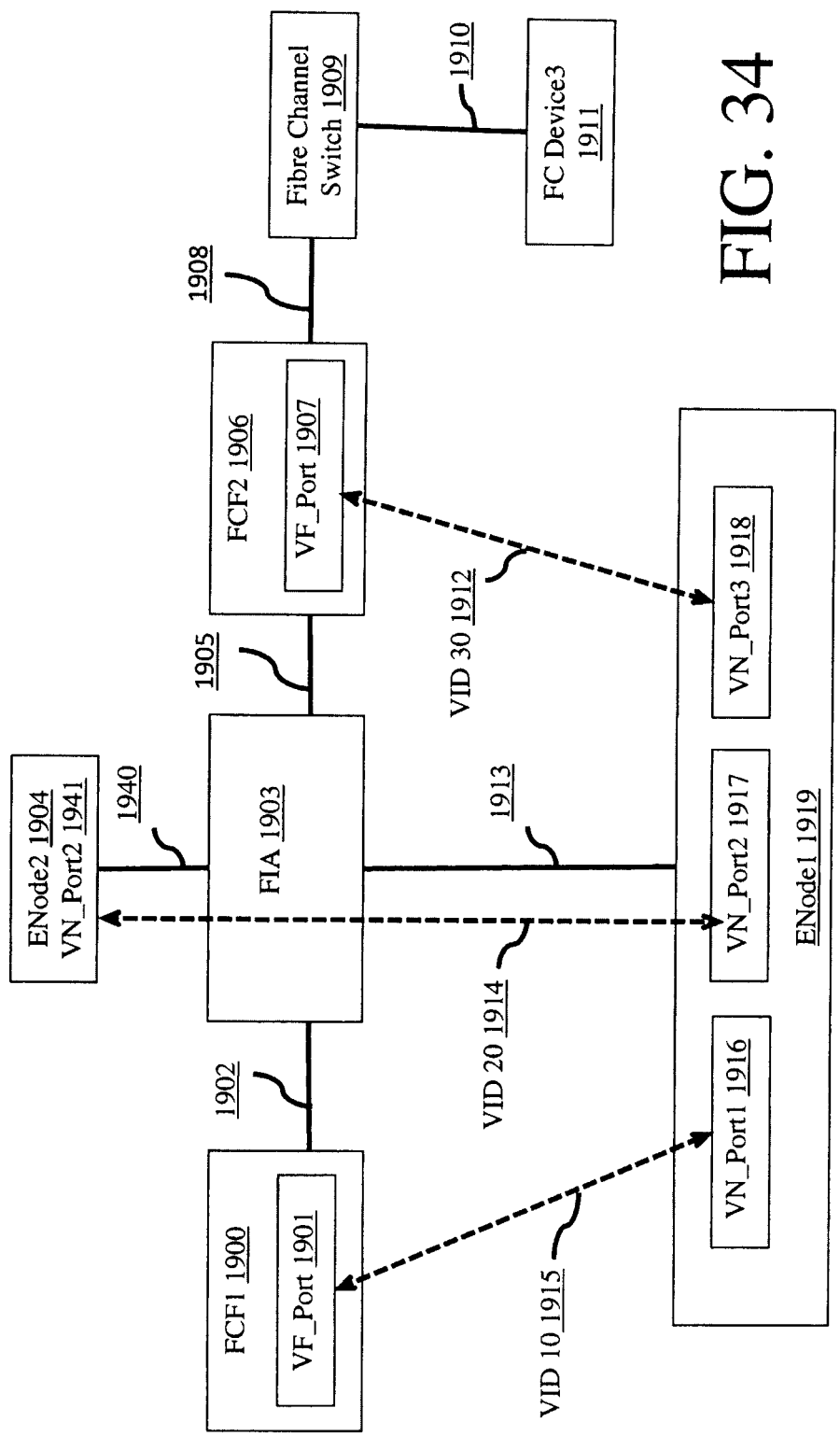
FIG. 34 is a diagram showing multiple virtual connections between ENodes, FIA, and FCFs.

FIG. 34 is a diagram showing multiple virtual connections between a ENodes, FIA, and FCFs. ENode1 1919 includes three VN_Ports, VN_Port1 1916, VN_Port2 1917, and VN_Port3 1918. ENode2 1904 includes VN_Port2 1941. VN_Port2 1917 is in a virtual connection over VID 20 1914 with VN_Port2 1941 in ENode2 1904 connected through FIA 1903. VN_Port1 1916 is in a virtual connection over VID 10 1915 with VF_Port 1901 in FCF1 1900. VN_Port3 1918 is in a virtual connection over VID 30 1912 with VF_Port 1907 in FCF2 1906. FCF2 1906 is connected to a Fibre Channel Switch 1908 which is in turn connected to 1910 FC Device3 1911. VN_Port3 1918 communicates with FC Device3 1911 through the VF_Port 1907 in FCF2 1096. Both VN_Port1 1916 and VN_Port3 1918 in ENode1 1919 communicate to FCF1 1900 and FCF2 1906 through the FIA 1903. FIG. 34 illustrates the capability of an FIA to forward FIP and FCoE frames in separate VID's between ENodes and FCF/FDFs. Further FIA 1903 can also restrict FIP discovery from select FCF/FDFs and from ENodes by a number of methods comprising but not limited to: filtering FIP Discovery Advertisements and FIP Discovery Solicitations by the source Ethernet MAC address or specific descriptors within the frame comprising: the priority, MAC address. Name_Identifier, and Fabric descriptors. FIA 1903 can also restrict FIP discovery to and from ENodes by selectively filtering FIP Discovery Advertisements and FIP Discovery Solicitations transmitted to and received from ENodes by a FIA.

Figure 35:
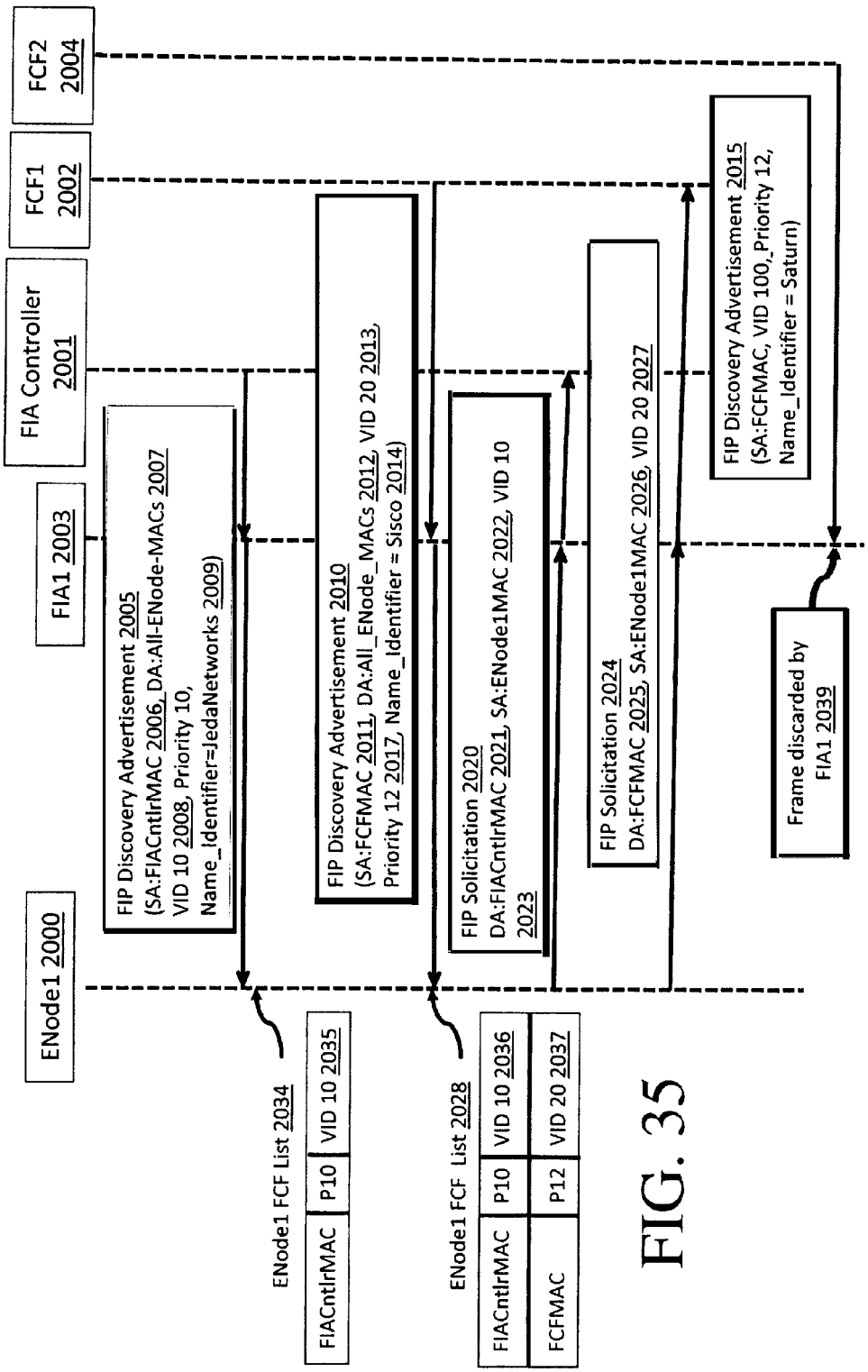
FIG. 35 is a ladder or sequence diagram showing the FIP Discovery protocol exchange between an ENode, a FIA Controller, and a FCF.

FIG. 35 is a ladder or sequence diagram showing the FIP Discovery protocol exchange between an ENode, a FIA Controller, and a FCF. FIA Controller 2001 transmits a FIP Discovery Advertisement frame 2005 comprising the source Ethernet MAC address of the FIA Controller FCF-MAC address (FIACntlrMAC) 2006, the destination Ethernet MAC address of All-ENode-MACs 2007, a VID of 10 2008, a priority of 10 2015 and a symbolic Name_Identifier of JedaNetworks. FIA 1 2003 receives the frame and forwards it to ENode1 2000. Enode1 2000 uses the information from the FIP Discovery Advertisement frame 2005 to build a list of available FCF-MACs 2034. The list includes but is not limited to the FIA Controller FCF-MAC address (FIACntlrMAC), the priority, the VID 2035. FCF1 2002 transmits a FIP Discovery Advertisement frame 2010 comprising the source Ethernet MAC address of the FCF (FCFMAC) 2011, the destination Ethernet MAC address of All-ENode-MACs 2012, a VID of 20 2013, a symbolic Name_Identifier of Sisco 2014 and a priority value of 12 2017. FIA 1 2003 receives the frame and forwards it to ENode1 2000. FIA 1 may also be configured to not forward the frame. Not forwarding the frame will isolate FCF1 2002 with ENode1 2000 which may be desirable. ENode1 2000 receives the forwarded FIP Discovery Advertisement frame 2010 and adds another entry into the ENode1 FCF List 2028. The entry 2037 includes but is not limited to the FCF MAC (FCFMAC), the priority 12, and the VID 20. ENode 1 2000 responds to the first FIP Discovery Advertisement frame 2005 with a unicast FIP Solicitation frame 2020 comprising a destination Ethernet MAC address of the FIA Controller FCF-MAC address (FIACntlrMAC), a source Ethernet MAC address of the ENode1 FCF-Controller MAC (ENode1MAC), and a VID of 10. The frame is received by FIA 1 2003 and forwarded to the FIA Controller 2001. ENode 1 2000 responds to the second FIP Discovery Advertisement frame 2010 with a unicast FIP Solicitation frame 2024 comprising a destination Ethernet MAC address of the FCF-MAC (FCFMAC), a source Ethernet. MAC address of the ENode1 FCF Controller MAC (ENode1 MAC), and a VID of 10. The frame is received by FIA 1 2003 and forwarded to the FIA Controller 2001. A FIP Discover Advertisement frame 2015 with a VID 100 and a Name_Identifier of Saturn is transmitted from FCF2 2 2004. The FIP Discovery Advertisement is discarded 2039 by FIA1 2003 by a FME that identifies the specific FIP Discovery Advertisement frame. Discarding the FIP Discovery Advertisement will prevent the frame from reaching ENode1 2000 thereby isolating FCF2 2004 from ENode1 2000. The resulting ENode1 FCF List 2028 includes entries for all 2036 2037 of the FCF-MACs, including the FCF1 2002 and FIA Controller 2001. ENode1 2000 may login to all FCF-MACs including the FR Controller 2001 and the FCF 2002 and query the Name Servers. It is possible that the same device (ENode or Fibre Channel device) is in multiple Name Server tables in multiple Fabrics. ENode1 2000 may choose to login (PLOGI) to the device through the FCF or FIA Controller with the highest priority. This method allows for a single connection to a device that's resident in multiple Name Server tables. ENode1 2000 may also choose to login (PLOGI) to the device through lower priority FCF or FIA Controllers if the primary connection fails.

Figure 36:
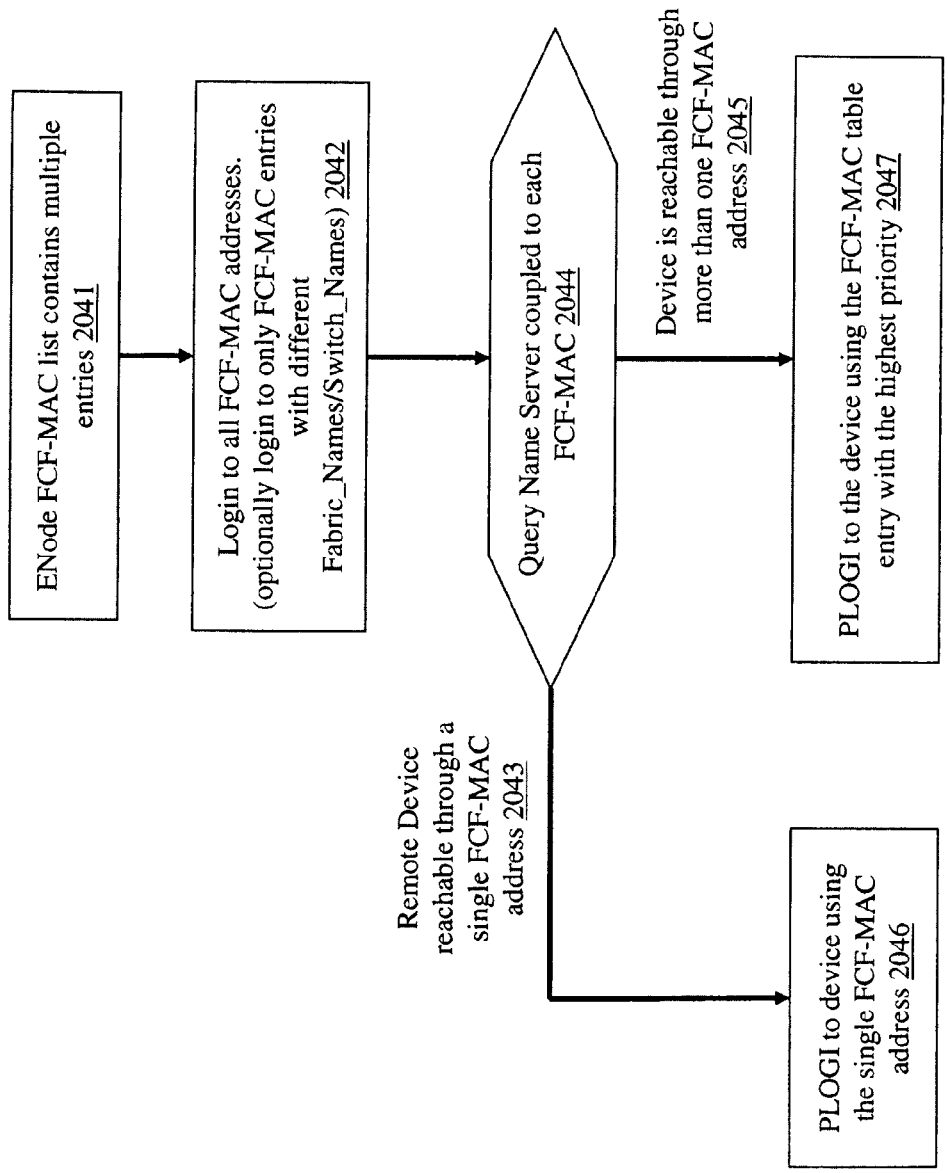
FIG. 36 is a diagram showing an ENode determining the path to a remote device.

FIG. 36 is a diagram showing an ENode determining the path to a remote device. The ENode discovers that multiple FCF and/or FIA Controller's are reachable 2041. The ENode logs into and queries all Name Servers 2042 coupled to the FCF-MACs. If a remove device (ENode) is reachable through a single FCF-MAC the ENode transmits a PLOGI to the remote device through the single FCF-MAC 2046. If the target is reachable through more than one FCF-MAC the ENode sends a PLOGI to the FCF-MAC having the highest priority 2047 attribute from the previously received FIP Discovery Advertisement frame.

Figure 37:
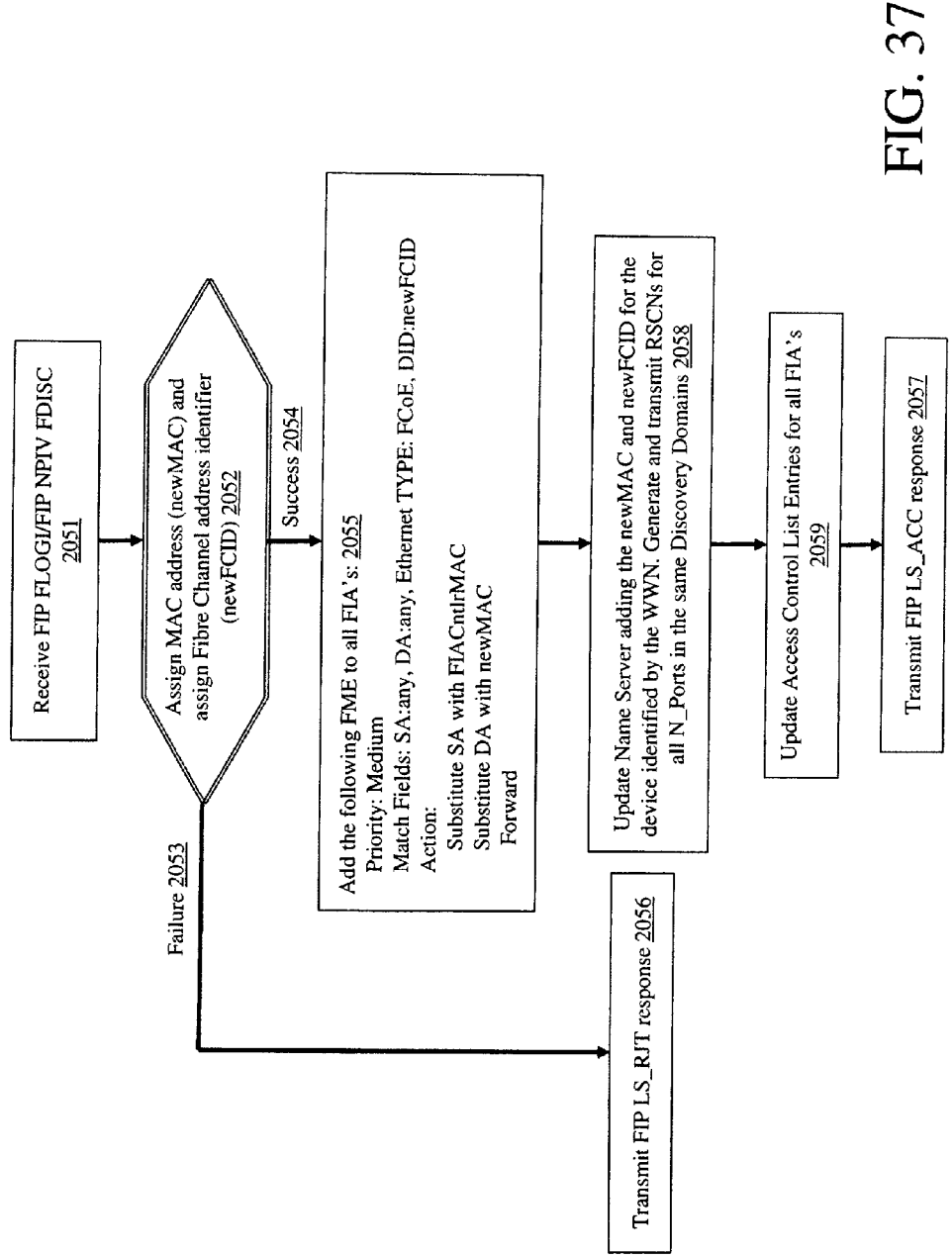
FIG. 37 is a diagram showing the generation of FMEs upon the receipt of a FIP FLOGI or FIP NPIV FDISC frame.

FIG. 37 is a diagram showing the generation of FMEs upon the receipt of a FIP FLOGI or FTP NPIV FDISC frame. The FIA Controller receives a FIP FLOGI or a FIP NPIV FDISC frame 2051. The FIA Controller assigns a new MAC address and a new Fibre Channel address identifier 2052. If the address assignment is not successful 2053, a FIP LS_RJT response frame is transmitted 2056. If the address assignment is successful 2054, the FIA Controller sends a Frame Match Entry (FME) to all connected FIAs with a medium priority, the match fields comprising a source and destination Ethernet MAC address of any, a Ethernet Type of FCoE, a Fibre Channel destination address identifier (DID) of the newly assigned Fibre Channel address identifier (newFCID), and with an action comprising, substitute the source Ethernet MAC address with the FIA Controller FCF-MAC address (FIACntlrMAC), substitute the destination Ethernet MAC address with the newly assigned Fibre Channel MAC address (newMAC), and forward the frame. The Name Server is updated with the newly assigned addresses and any devices within the same Discovery Domains are notified of a change by transmitting a RSCN 2058. The Access Control List Entries for the FIAs are updated 2059 and a FIP LS_ACC response frame is then transmitted 2057.

Figure 38:
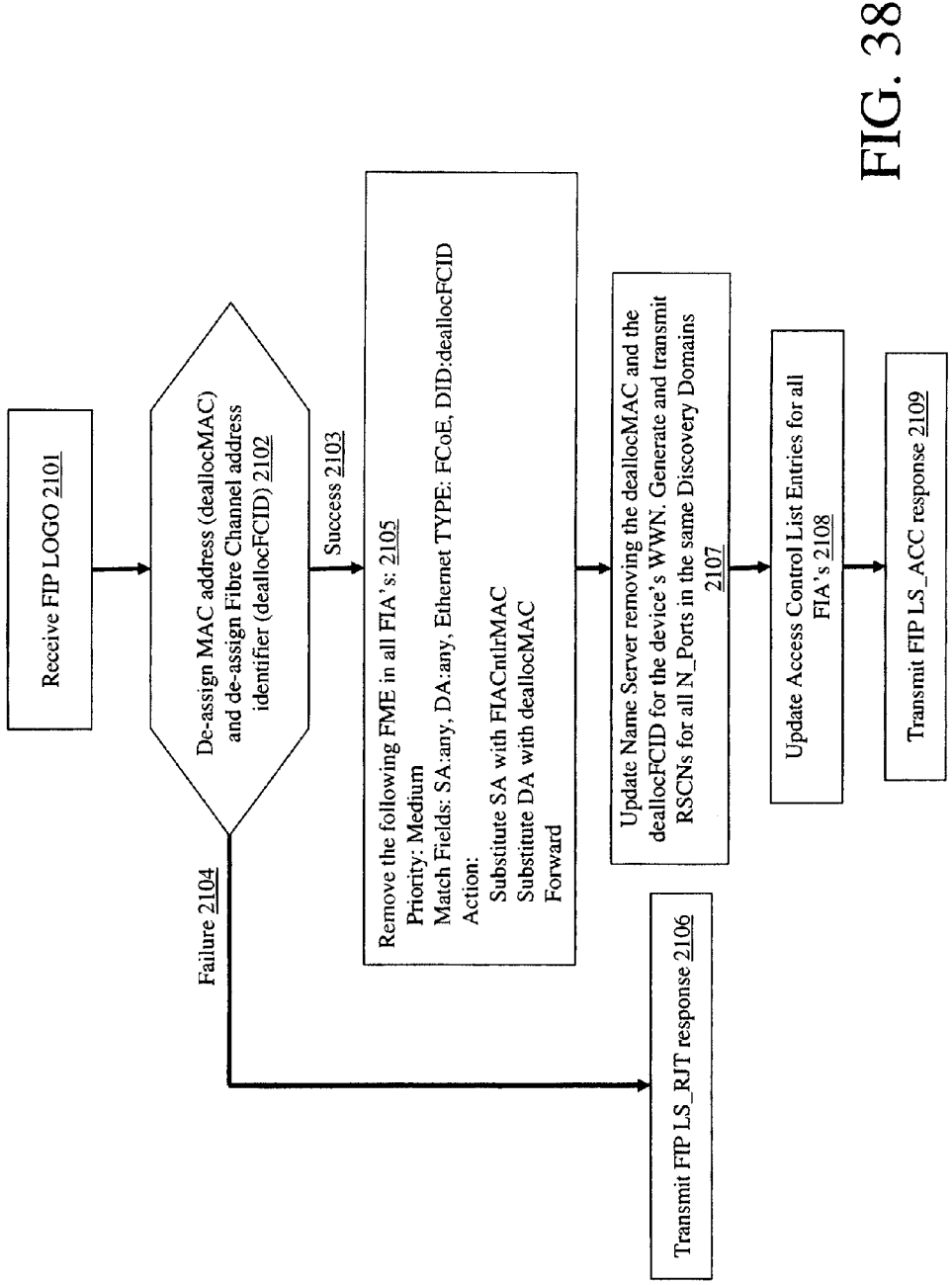
FIG. 38 is a diagram showing the removal of FMEs upon the receipt of a FIP FLOGO frame.

FIG. 38 is a diagram showing the removal of FMEs upon the receipt of a FIP FLOGO frame. The FIA Controller receives a FIP FLOGO frame 2076. The FIA Controller deassigns the specified MAC address and specified Fibre Channel address identifier 2077. If the address de-assignment is not successful 2078, a FIP LS_RJT response frame is transmitted 2081. If the address de-assignment is successful 2078, the FIA Controller sends a message to remove the Frame Match Entry (FME) to all connected FIAs that matches the priority, match fields, and actions of the specified FME 2080. The Name Server is updated and RSCNs are transmitted for all devices in the same Discovery Domain 2107. The access control list entries for all FIAs are updated 2108. A FIP LS_ACC response frame is then transmitted 2082.

A myriad of frame forwarding methods can be used within FIAs. Since the forwarding function is separated from other FIA Controller functions any network available forwarding method can be used. This is different from FCF routing which uses the FSPF routing method. The forwarding and/or routing methods that a FIA can utilize includes but is not limited to STP, RSTP, MSTP, Shortest Path Bridging, MPLS, VPLS, TRILL, OSPF, BGP, RIP. IEEE 802.1aq Shortest Path Bridging and the IETF effort called Transparent Interconnection of Lots of Links (TRILL) have been created that mitigate the disadvantages of the Spanning Tree Protocol based forwarding methods.

Figure 39:
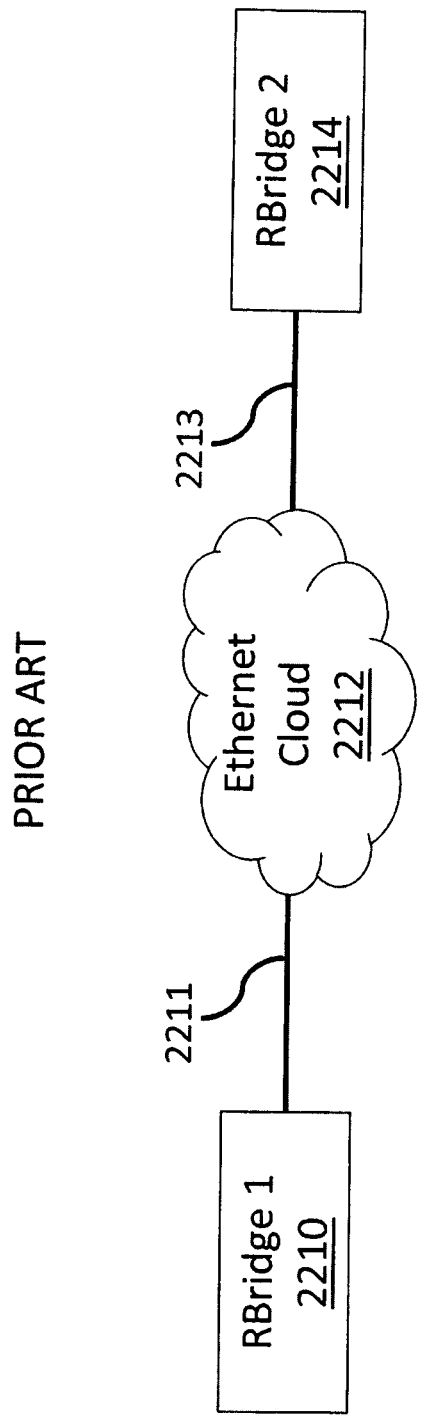
FIG. 39 is a prior art network diagram showing the interconnection of Router Bridges (RBridges).
Figure 40:
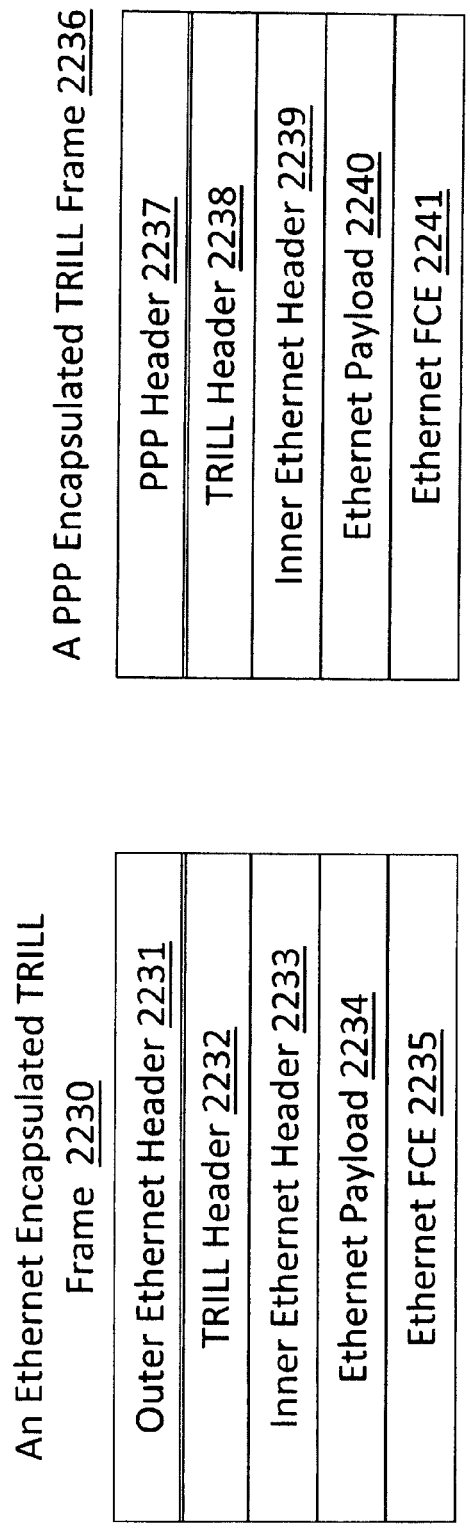
FIG. 40 is a diagram showing the prior art frame format for an Ethernet and PPP encapsulated Transparent Interconnection of Lots of Links (TRILL) frame.

Routing Bridges or RBridges, have been created to implement the TRILL protocol. FIG. 39 is a network diagram showing the interconnection of Router Bridges (RBridges) 2210 2214. The diagram shows a first RBridge, RBridge 1 2210 connected 2211 to an Ethernet Cloud or network 2212 that is connected 2213 to a second RBridge, RBridge 2 2214. RBridges can be interconnected using any layer 2 technology such as IEEE 802.3, shown in FIG. 40 or some other link technology such as PPP, see RFC1661. The Ethernet Cloud or network 2212 may include but not be limited to hubs, point-to-point or shared media, IEEE 802.1D bridges, 802.1Q bridges, or metropolitan area networks such as those described by the Provider Backbone Bridge Traffic Engineering (PBB-TE) networking standard, IEEE 802.1Qay-2009 or Provider Backbone Bridges (PBB), IEEE 802.1ah, RBridge ports make use of IEEE 802.1Q port VLAN and priority processing. In addition, the Ethernet Cloud 2212 may implement other lower level 802.1 protocols as well as protocols for the link in use, such as PAUSE, Priority Based Flow control, port based access control (802.1X), MAC security (802.1AE), or link aggregation (802.1AX), FIG. 40 is a diagram showing the frame format for an Ethernet 2230 and PPP 2236 encapsulated Transparent Interconnection of Lots of Links (TRILL) frame. Although description and examples provided here will describe the Ethernet encapsulation 2230, those in the art will easily see the implementation over PPP 2236 and other communications protocols. The Inner Ethernet Header 2233 and the Ethernet Payload 2234 come from the original frame and are encapsulated with a TRILL Header 2232 and an outer Ethernet header 2231 they travel between RBridges. Use of the TRILL header 2232 addresses many disadvantages of spanning tree and other forwarding methods by mitigating loops through the use of a hop count field, eliminates the need for end station VLAN and MAC address learning in transit RBridges, directs unicast frames towards the egress RBridge which enables unicast forwarding tables of transit RBridges to be sized with the number of RBridges rather than the total number of end nodes, and finally provides a separate VLAN tag for forwarding traffic between Midges, independent of the VLAN of the native frame. When forwarding unicast frames between RBridges, the outer header 2231 has the MAC destination address of the next hop RBridge, to avoid frame duplication if the inter-RBridge link is multi-access. This also enables multipathing of unicast frames since the transmitting RBridge can specify the next hop. Having the outer Ethernet header 2231 specify the transmitting RBridge as the source address ensures that any bridges inside the Ethernet cloud will not get confused, as they might be if multipathing is in use and they were to see the original source or ingress RBridge in the outer header.

Figure 41:
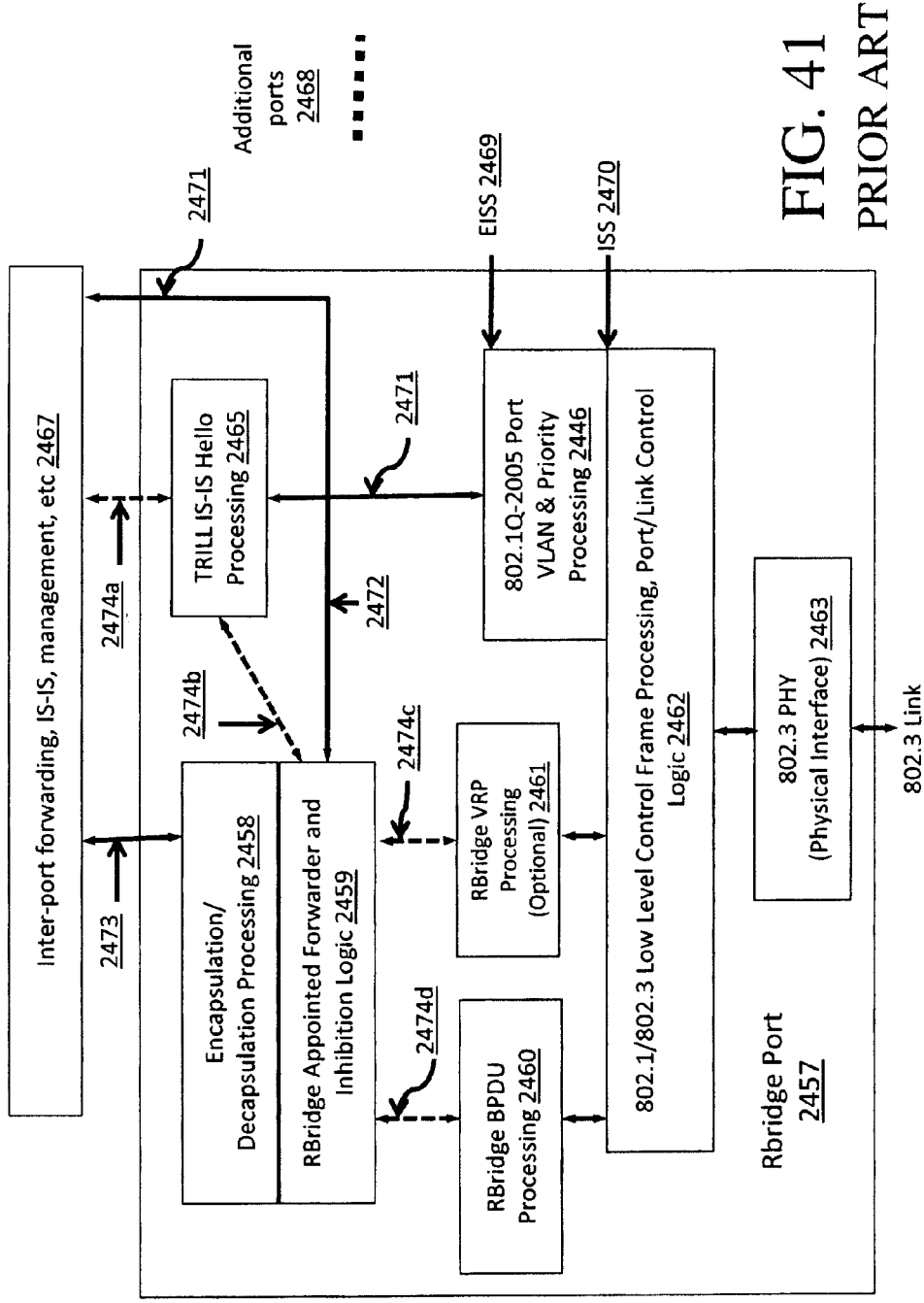
FIG. 41 shows a representative prior art RBridge Port Model in more detail.

FIG. 41 shows a representative RBridge Port Model 2457 in more detail. The RBridge Port Model 2457 assumes connection to an IEEE 802.3 Link 2464. An RBridge port can be modeled as having a lower level structure similar to that of an IEEE 802.1Q-2005 bridge port. An actual RBridge port implementation may be structured in any way that provides the correct behavior. Low level control frames are handled in the lower level port/link control logic 2462 in the same way as in an 802.1Q-2005 bridge port. This may include but not be limited to a variety of 802.1 or link specific protocols such as PAUSE (Annex 31B of 802.3), FTC (802.1Qbb, 802.3bd), link layer discovery (802.1AB), link aggregation (802.1AX), MAC security (802.1AE), or port based access control (802.1X). While handled at a low level, these frames may affect higher level processing. Higher-level control frames such as BPDUs and, if supported, VRP frames are not VLAN tagged and are handled by the RBridge BPDU Processing 2460 and RBridge VRP Processing 2461 blocks. The upper interface 2470 to the 802.1/802.3 Low Level Control Frame Processing, Port/Link Control Logic block 2462 corresponds to the Internal Sublayer Service (ISS) in IEEE 802.1Q. The upper interface 2469 to the 802.1Q-2005 Port VLAN & Priority Processing block 2466 corresponds to the Extended Internal Sublayer Service (EISS) in IEEE 802.1Q. The dotted lines indicate control only traffic 2474a 2474b 2474c 2474d. The Higher Layer Entities 2467 may include but not be limited to the inter-port forwarding process, the IS-IS link state protocol, the RBridge manager.

Figure 42:
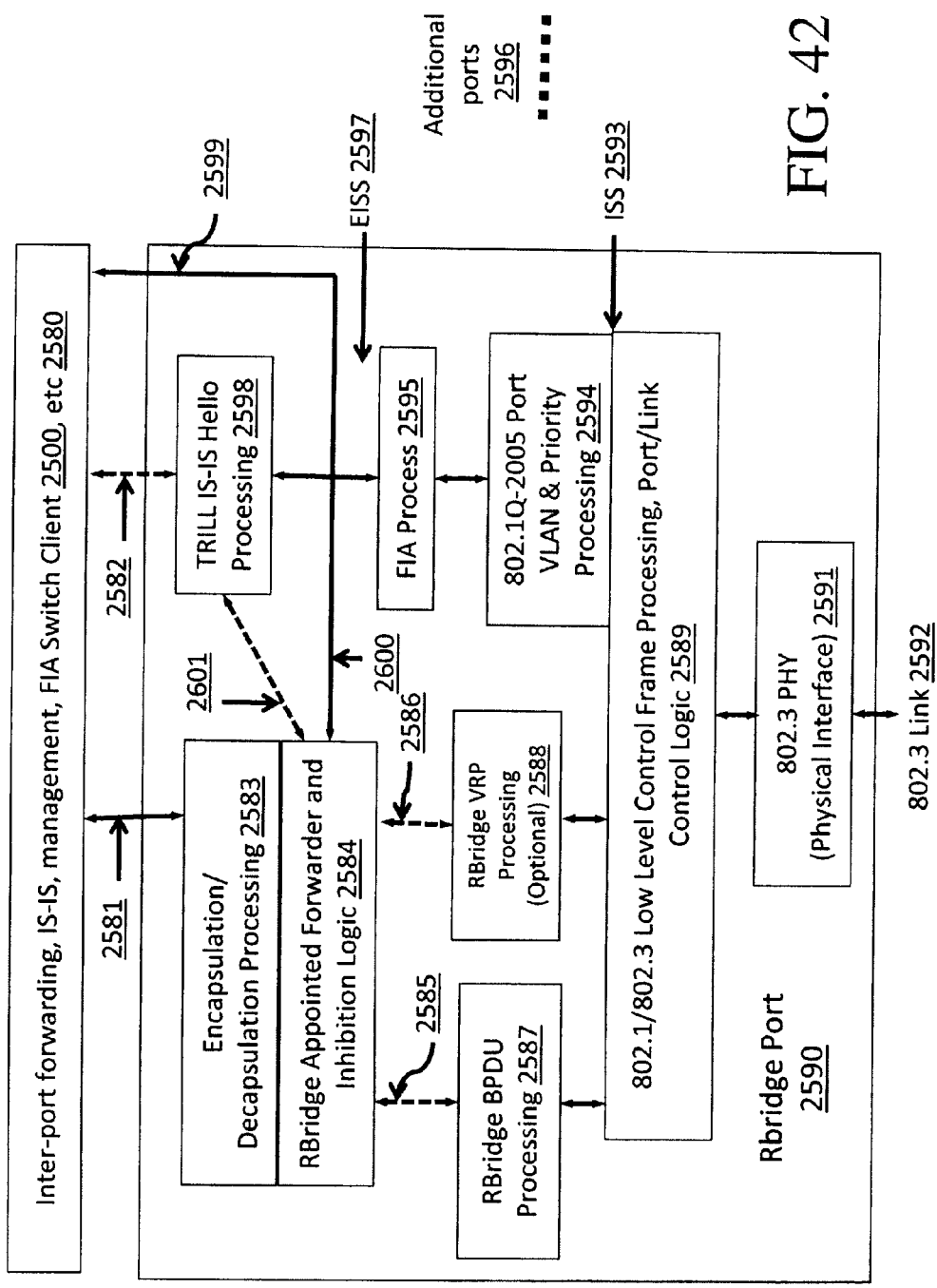
FIG. 42 is a diagram of a TRILL RBridge with the addition of FIA Process and FIA Switch Client capability.

FIG. 42 is a diagram of a TRILL RBridge with the addition of FIA Process and FIA Switch Client capability. The RBridge Model in FIG. 41 has been modified 2595 2500 to result in a FIA RBridge Port 2590, which combines the advantages of bridges and routers and is the application of link state routing to the VLAN-aware customer-bridging problem. Each RBridge port 2592 can be coupled to one or more ENodes. The FIA Process delivers and accepts frames to and from the 802.1Q Port VLAN & Priority Processing block 3194, the RBridge Appointed Forwarder and Inhibition Logic 2584, the RBridge Relay Entity and Higher Layer Entities which may include but be limited to the FIA Manager 3202, the System manager, link state protocol, RBridge manager 2580. Further, FIG. 42 is only one example of an implementation.

Figure 43:
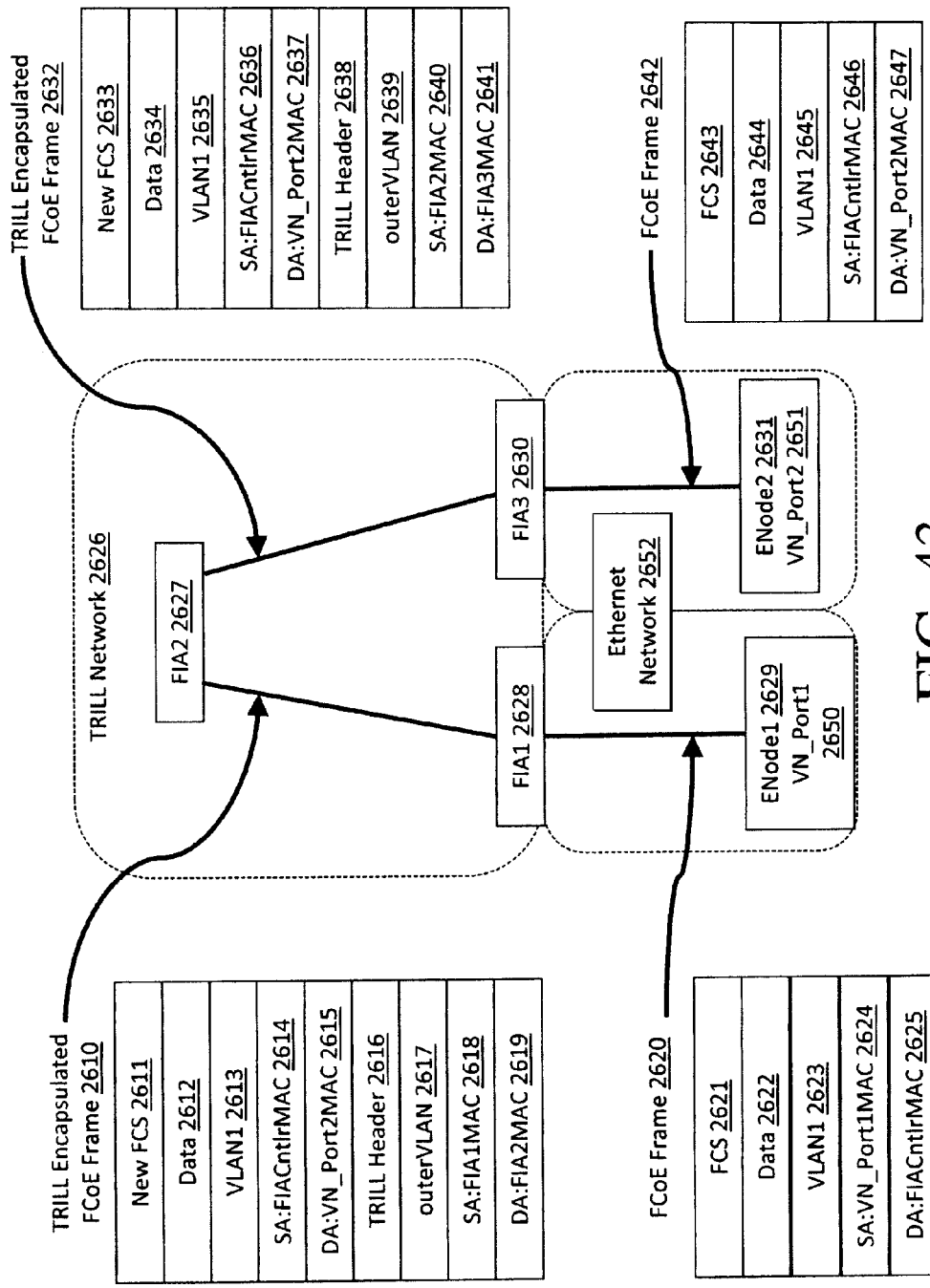
FIG. 43 is a diagram showing the interconnection of ENodes over a TRILL Ethernet network.

FIG. 43 is a diagram showing a FCoE frame 2620 sent from an Ethernet connected ENode 2629 through a network of RBridge FIAs 2628 2627 2630 to a destination Ethernet connected ENode 2631 over a TRILL Ethernet network 2626. FIA1 2628, FIA2 2627, and FIA3 2630 form an Ethernet TRILL network 2626. The links from FIA1 2628 to ENode 1 2629 and from FIA3 to ENode2 2631 are Ethernet links 2652. The FCoE frame transmitted 2620 from VN_Port1 2650 in ENode1 2629 includes the following values: Ethernet destination MAC address of the FIA Controller FCF_MAC address (FIACntlrMAC) 2625, Ethernet source MAC address of VN_Port1 (VN_Port1MAC) 2650, a VID 2623, data 2622, and an FCS 2621. FIA1 2628 substitutes the destination MAC address with VN_Port2s MAC address (VN_Port2MAC) 2615 and substitutes the source MAC address with the FIA Controller FCF-MAC address (FIACntlrMAC) 2614. After substituting the destination Ethernet address 2615, FIA1 2628 encapsulates the frame in a TRILL frame. The outer destination Ethernet MAC 2619 address contains the value of the next hop FIA MAC address, in this case the symbolic MAC address FIA2MAC 2619. The outer source Ethernet MAC address 2618 contains the value of the current FIA MAC address, in this case the symbolic MAC address FIA1MAC. The frame is received by FIA2 2627 and the outer destination Ethernet MAC address 2641 is changed to be the next hop, in this case FIA3 2630 and its symbolic Ethernet MAC address FIA3MAC 2641. The outer source Ethernet MAC address 2640 is changed to be FIA2s MAC address, in this case FIA2MAC 2640. The frame 2632 is then received by FIA3 2630, the TRILL header is removed and transmitted to VN_Port2 2651 in ENode2 2631.

Figure 44:
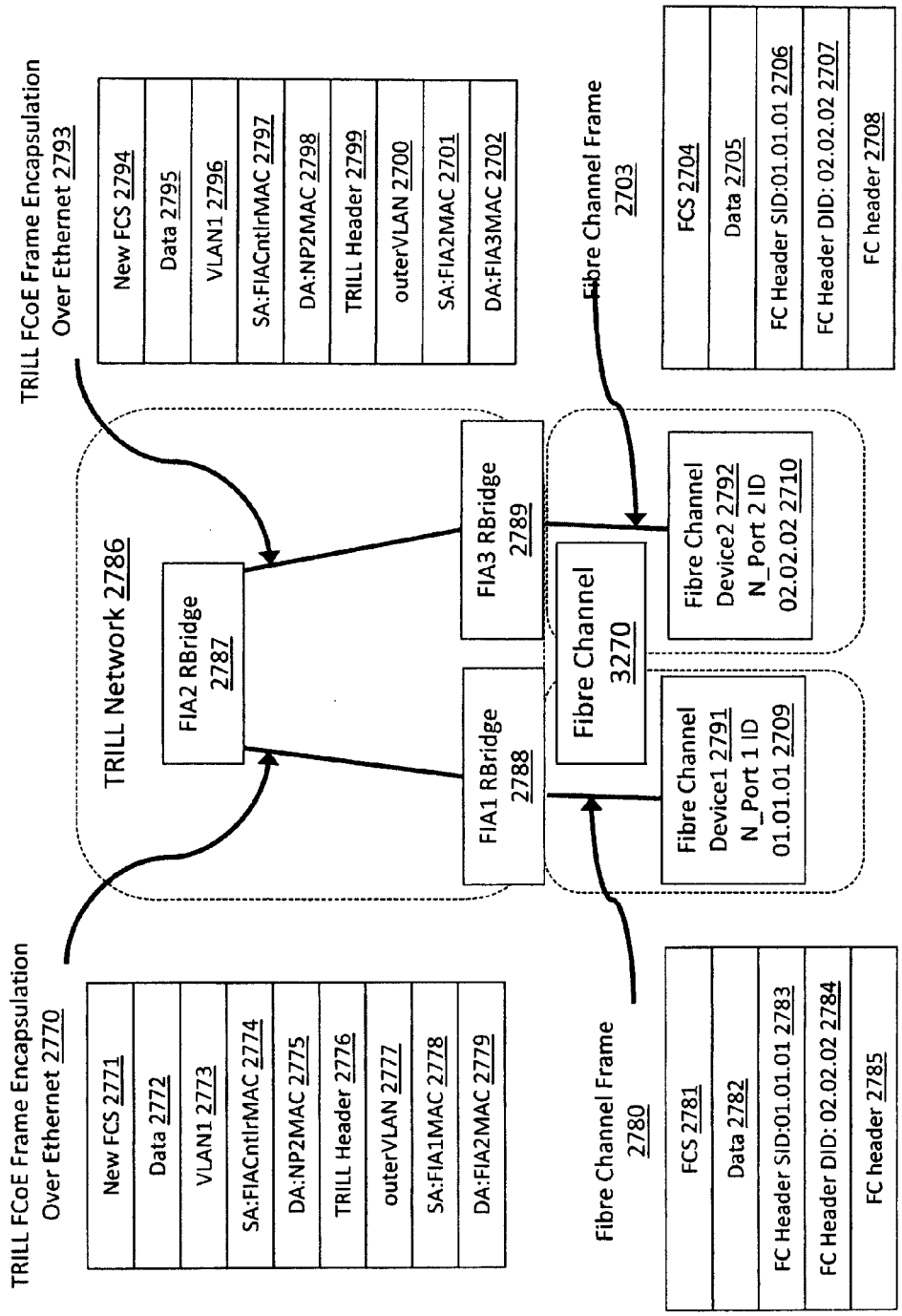

FIG. 44 is a diagram showing a Fibre Channel frame sent from a Fibre Channel connected device through a network of FIAs to a destination Fibre Channel connected device. FIA1 2788, FIA2 2787, and FIA3 2789 form a TRILL Ethernet network. The links between FIA1 2788 and Fibre Channel Device1 2791 and between FIA3 2789 and Fibre Channel Device2 2792 are Fibre Channel links, The Fibre Channel frame transmitted 2780 from Fibre Channel Device1 2791 to FIA1 2788 contains Fibre Channel Device2's 2792 address identifier 2710 of 02.02.02 as the destination address identifier 2784 and as the source address identifier 01.01.01 2783 that of Fibre Channel Device1's 2791 N_Port1 ID 2709. FIA1 2788 encapsulates the frame 2780 in a FCoE header and a TRILL encapsulation over Ethernet frame 2779 2778 2777 2776. The resulting frame 2770 includes an inner destination Ethernet MAC address 2775 that is the MAC address of given by the FIA Controller to N_Port2 2710 in Fibre Channel Device2 2792. Note that this MAC address is only valid internally to the FIAs. The inner source Ethernet MAC address 2774 is the Ethernet MAC address of the FIA Controller FCF-MAC address (FIACntlrMAC). The outer destination Ethernet MAC address 2779 is the Ethernet MAC address of FIA2 2787, the outer source Ethernet MAC address 2778 is the Ethernet MAC address of FIA1 2788. The outer Ethernet addresses 2778 2779 follows the TRILL method of using RBridge hop to RBridge hop forwarding. When the frame is received from FIA2 2787 it is forwarded to FIA3 2789 after the following modifications. The outer Ethernet destination MAC address 2702 is changed to FIA3s 2789 MAC address, the outer Ethernet source MAC address 2701 is changed to FIA2s 2787 MAC address. When the frame arrives at FIA3 2789, the TRILL frame is decapsulated into a FCoE frame 2703, which is also decapsulated into the native Fibre Channel frame. The resulting Fibre Channel frame is transmitted to N_Port2 2710 in Fibre Channel Device2 2792, Note for each hop through a TRILL network a new FCS is calculated 2771 2794.

Figure 45:
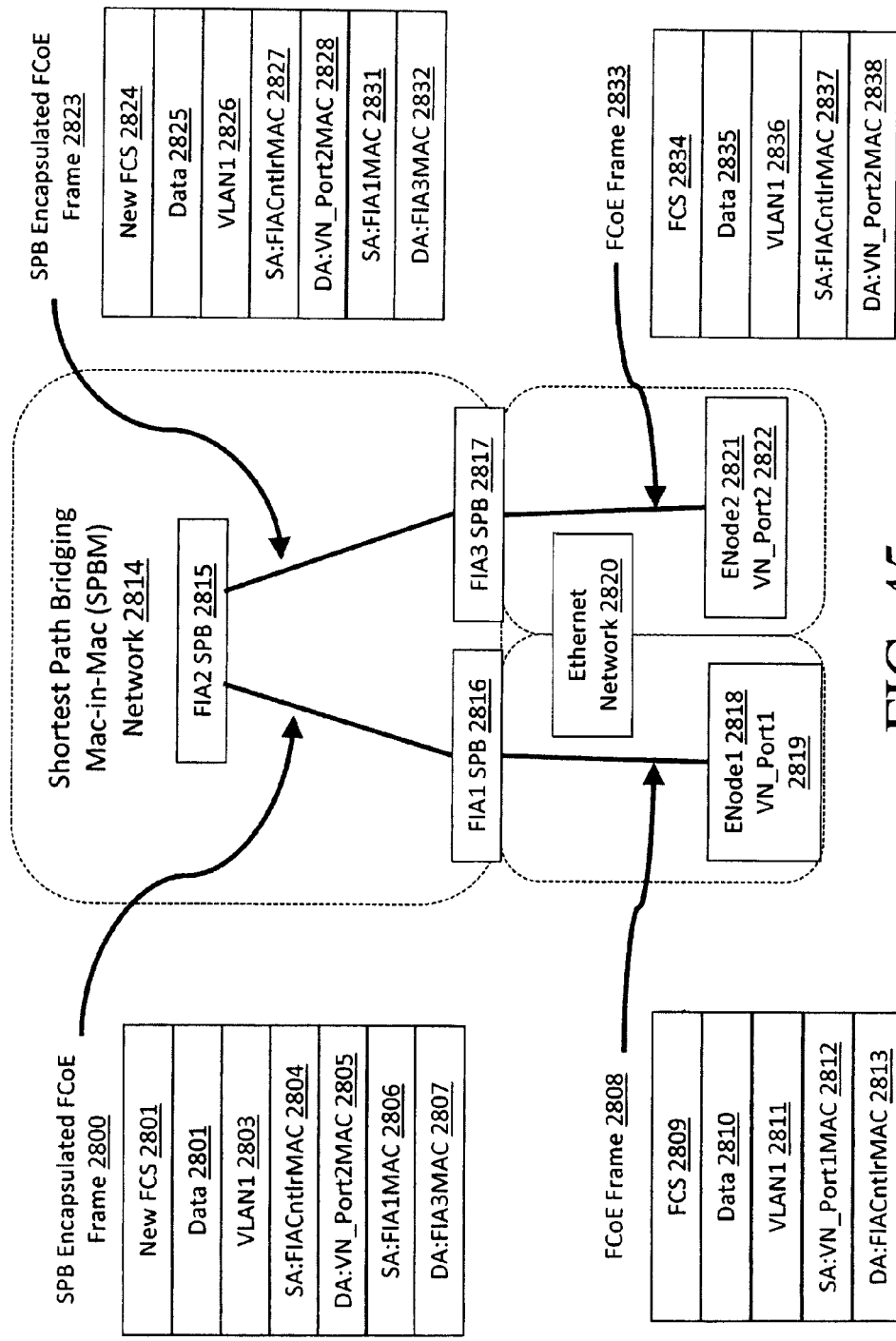
FIG. 45 is a diagram showing the interconnection of ENodes over a Shortest Path Bridging MAC-in-MAC (SPBM) Network.

Shortest Path Bridging (SPB) is an IEEE draft (802.1aq) that may be included in the 802.1Q standard. There are two SPB models for multipath bridging: Shortest Path Bridging VLAN (SPBV) and Shortest Path Bridging MAC-in-MAC (SPBM). FIG. 45 is a diagram showing the interconnection of ENodes through a Shortest Path Bridging MAC-in-MAC (SPBM) network 2814. A FCoE frame 2820 sent from an Ethernet connected ENode 2818 through a network of FIA adapted to implement Shortest Path Bridging 2816 2815 2817 to a destination Ethernet connected ENode 282.1 over a SPBM network 2814. FIA 1 2816, FIA2 2815, and FIA3 2817 form a SPBM 2814. The links from FIA1 2816 to ENode1 2818 and from FIA3 2817 to ENode2 2821 are Ethernet links 2820. The FCoE frame transmitted 2808 from VN_Port1 2819 in ENode1 2818 includes the following values: Ethernet destination FCF-MAC address of the FIA Controller (FIACntlrMAC) 2813, Ethernet source MAC address of VN_Port1 (VN_Port1MAC) 2812, a VID 2811, data 2810, and an FCS 2809. FIA1 2816 substitutes the destination MAC address with VN_Port2's MAC address (VN_Port2MAC) 2805 and substitutes the source MAC address with the FIA Controller FCF-MAC address (FIACntlrMAC) 2804. After substituting the destination Ethernet address 2807, FIA1 2816 encapsulates the frame in a SPBM frame, i.e., adds a MAC-in-MAC header. The outer destination Ethernet MAC 2619 address contains the value of the egress FIA MAC address, in this case the symbolic MAC address FIA3MAC 2817. The outer source Ethernet. MAC address 2806 contains the value of the current FIA MAC address, in this case the symbolic MAC address FIA1MAC. The frame is received by FIA2 2815 and forwarded to the egress FIA, FIA3 2817. FIA3 2817 removes the outer MAC header and forwards the frame to VN_Port2 2651 in ENode2 2631 with the inner source and destination Ethernet MAC addresses unchanged. The Shortest Path Bridging network in FIG. 44 can be adapted to use Shortest Path Bridging VLAN (SPBV) in lieu of SPBM by using the Shortest Path VLAN ID (SPVID) to designate nodal reachability.

FIG. 46 is a diagram showing a source and destination Ethernet MAC address replacement logic. Certain fields from the incoming frame are loaded into received frame registers 3000. The fields include the source Ethernet MAC address 3001, the Ethernet TYPE 3002, the Fibre Channel destination address identifier (FC DID) 3003, and the destination Ethernet MAC address (Ethernet DA) 3005. The Ethernet TYPE field 3002 is compared to 3011 the FCoE_TYPE 3010 value in the Ethernet TYPE Register 3009. If the values are equal a Read EN signal 3012 is asserted and used as a buffer enable to the data output 3007 of the FCID to MAC Lookup Table 3004 and an input into the Source MAC Substitution FSM 3014. The Source MAC Substitution FSM 3014 takes another signal, the entry_found signal from the MAC lookup table 3015 to select 3020 by a multiplexer 3023 either the FIA Controller MAC 3013 or the received source Ethernet MAC address for insertion into the source Ethernet MAC address in the outgoing frame 3022. The FC DID field in the received frame is used as an address 3008 to lookup the assigned VN_Port MAC address 3006 in the FCID to MAC Lookup Table 3004. If an entry is found, the entry_found signal 3015 is asserted, and the VN_Port MAC buffer 3016 contains the matched VN_Port MAC address that corresponds to the Fibre Channel address identifier. The Destination MAC Substitution FSM 3019 selects which MAC address to use 3017, either the received Ethernet DA or the matched VN_Port MAC address, to insert into the Destination Ethernet MAC address register 3018.

Figure 47:
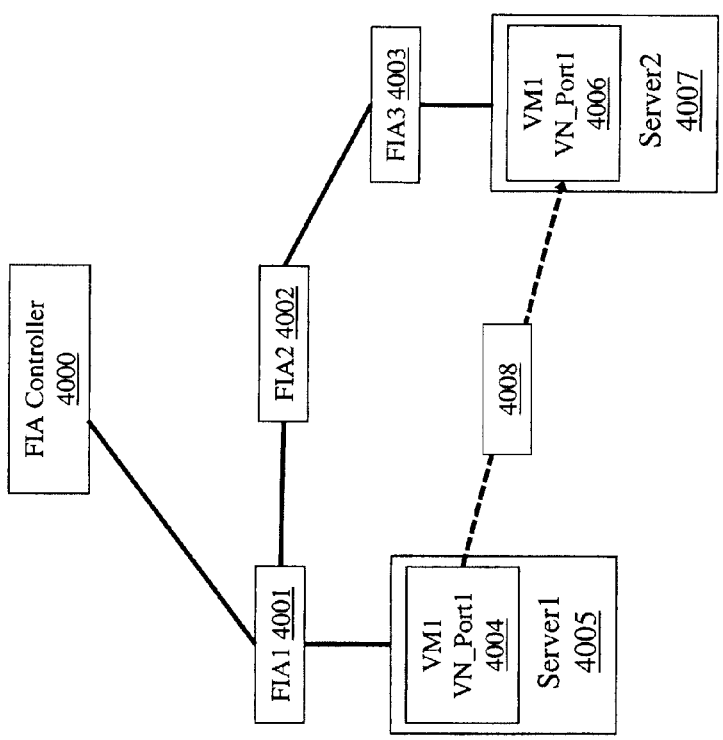
FIG. 47 is a diagram showing the migration of a Virtual Machine from a server connected to a FIA to another server connected to another FIA.

FIG. 47 is a diagram showing the migration of a Virtual Machine from a server connected to a FIA to another server connected to another FIA. Virtual Machine 1 (VM1) 4004 in Server1 4005 is migrated 4008 to Server2 4007. Server1 4005 is connected to FIA1 4001. FIA1 4001 is connected to the FIA Controller 4000, FIA1 is also connected to FIA2 4002. FIA2 4002 is connected to FIA3 4003. FIA3 is connected to Server2 4007. The steps involved in migrating VM1 4004 are further described. The hypervisor control apparatus in Server1 4005 signals the FIA Controller 4000 of the impending migration and that VM1 4004 has been temporarily suspended. Since both the MAC and Fibre Channel address identifier assignments for VN_Ports are centrally assigned and managed by the FIA Controller 4000, no address reassignment needs to be accomplished. After signaled by the hypervisor control apparatus in Server1 4005, the FIA Controller 4000 sends messages to all FIAs 4001 4002 4003 to remove the MAC address assigned to VM1 4005 from its forwarding tables. Clearing the forwarding tables cause the forwarding paths or routes to be recalculated. If the FIA is an Ethernet Bridge, the forwarding table is the Filtering Database, FIG. 10 403. The FIA Controller 4000 then responds to the hypervisor control apparatus that VM1 4004 migration 4008 to Server2 4007 is clear to proceed.

Figure 48:
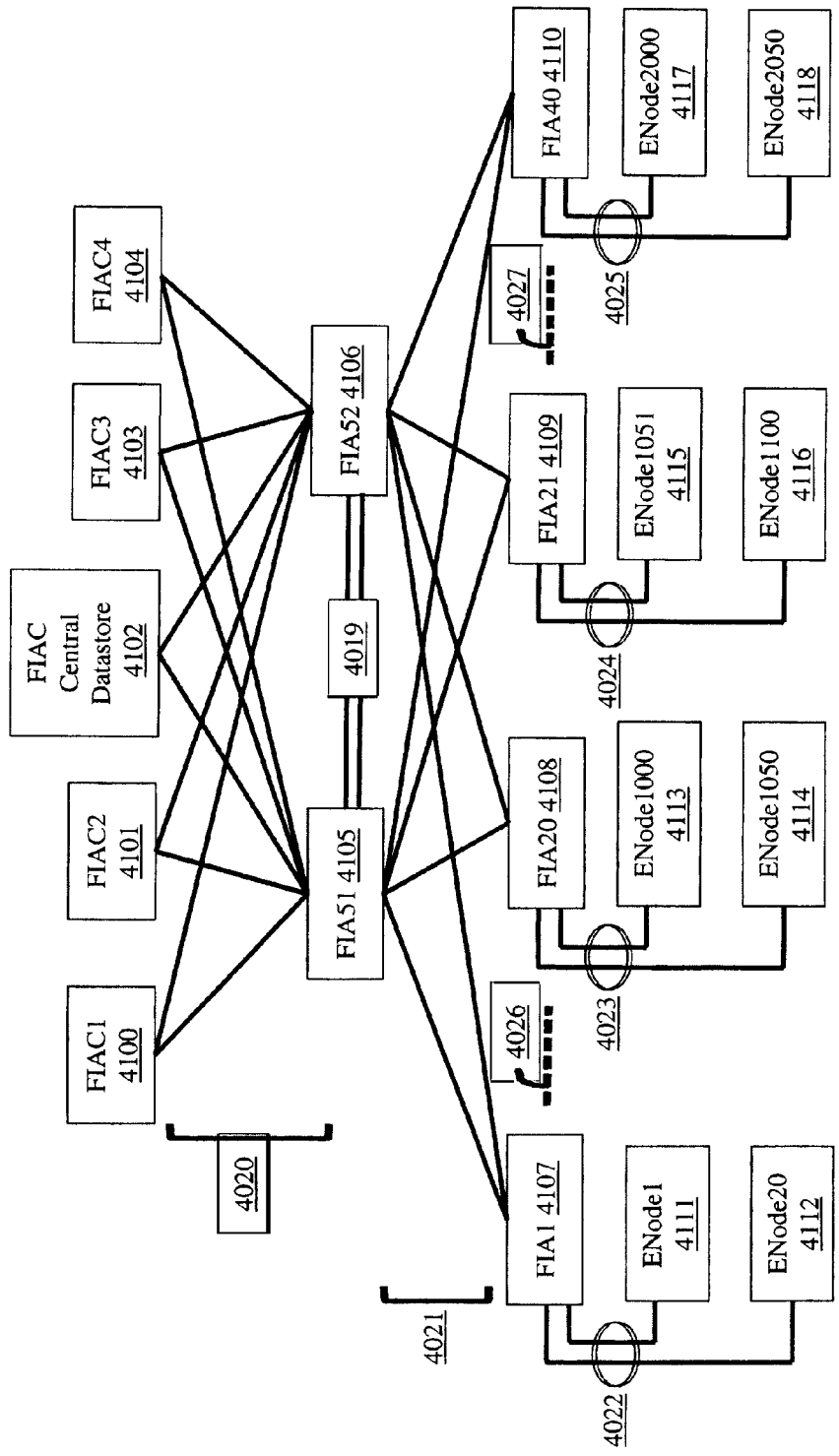
FIG. 48 is a diagram showing a distributed FIAC deployment.

FIG. 48 is a diagram showing a distributed MAC deployment. The diagram shows four FIACs, 4100 4101 4103 4104 and a central FIAC Datastore 4102. The FIAC Central Datastore 4102 is the central storage for certain FIAC information. The diagram also shows two core FIA's, FIA51 4105 and FIA52 4106, which interconnect all FIAC's 4100 4101 4103 4104, the FIAC Central Datastore 4102, and the forty FIA's which include FIA1 4107 through 4026 FIA20 4108 and FIA21 4109 through 4027 FIA40 4110. There are also redundant connections 4019 between FIA51 4105 and FIA52 4106. Links 4020 4021 4022 4023 4024 4025 and 4019 may be Ethernet links. Each FIA connects a plurality of ENodes. For example, FIA1 4107 connects 4022 to ENode1 4111 through ENode20 4112, ENode2 through ENode19 are not shown. FIA20 4108 connects 4023 to ENode1000 4113 through ENode1050 4114, ENode1001 through ENode1049 are not shown. FIA21 4109 connects 4024 to ENode1051 4115 through ENode1.100 4116, ENode1052 through ENode1099 are not shown. FIA40 4110 connects 4025 to ENode2000 4117 through ENode2050 4118, ENode2001 through ENode2049 are not shown. The FIAC's divide management of the FIAs. FIAC1 4100 manages FIA1 4107 through FIA10 (not shown). FIAC2 4101 manages FIA11 (not shown) through FIA20 4108. FIAC3 4103 manages FIA21 4109 through FIA30 (not shown). FIAC4 4104 manages FIA31 (not shown) through FIA40 4110. An FIAC manages a subset of FIA's, which allows a network to scale to a large number of supported ENodes by adding FIAC's. FIA management may include but not be limited to controlling the FIA FME and ACLE tables and responding to FIP and certain FCoE frames. For example, the FIA's forward FIP FLOGI frames to the FCF-MAC of the controlling FIAC. The FIAC's synchronize with each other through the FIAC Central Datastore 4102. the FIAC Central Datastore 4102 may be implemented by the following: a relational database, an object store database, in memory storage, and a filesystem. If the FIAC Central Datastore 4102 is implemented by a relational database then access to the database can support Structured Query Language (SQL), which supports data insert, query, update, delete, schema creation and modification, and data access control.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended All publications and patents cited in this specification are herein incorporated by reference as if each individual publication or patent were specifically and individually indicated to be incorporated by reference in their entirety.

What is claimed is:

1. A method for forwarding Fibre Channel Initialization Protocol (FIP) and Fibre Channel over Ethernet (FCoE) frames with a FCoE device interconnection apparatus (FIA) from a source FCoE device to a destination FCoE device, the method comprising:
receiving the FIP frame from the source FCoE device by the FIA, the FIP frame including destination Ethernet MAC address and source Ethernet MAC addresses, the FIA being capable of substituting destination and source Ethernet MAC addresses,
forwarding the received FIP frame to a FCoE device interconnection apparatus controller (FIAC) over an Ethernet link, whereby the FIAC processes the FIP Frame and the FIAC returns a FIP link service accept (LS_ACC) or a FIP link service reject (LS_RJT) frame,
receiving the FCoE frame by the FIA from the source FCoE device, the FCoE frame including destination Ethernet MAC address and source Ethernet MAC addresses,
replacing the destination Ethernet MAC address and source Ethernet MAC addresses of the received FCoE frame and maintaining the contents of the encapsulated Fibre Channel Frame within the received FCoE frame, and
forwarding the received FCoE frame with the replaced destination Ethernet MAC address and the replaced source Ethernet MAC address to the destination FCoE device.

2. The method of claim 1 wherein the destination Ethernet MAC address of the received FCoE frame is replaced by the MAC address assigned to the remote FCoE device VN_Port, the remote FCoE device VN_Port identified by the Fibre Channel destination address identifier in the embedded Fibre Channel Frame of the received FCoE frame.

3. The method of claim 1 wherein the replaced source Ethernet MAC address of the received FCoE frame is the FCoE Forwarder MAC (FCF-MAC) address of the FIAC.

4. The method of claim 1 wherein the destination Ethernet MAC address in the received FCoE frame is the FCF-MAC address of the FIAC.

5. The method of claim 1 wherein the FIA comprises one or more of the following: an Ethernet Switch, an Ethernet Bridge, a Virtual Switch, a switch embedded in a Server, a switch embedded in a Storage System, and a switch embedded in a Converged Network Adapter (CNA).

6. An apparatus for interconnecting a plurality of ports for forwarding received Fibre Channel Initialization (FIP) and Fibre Channel over Ethernet (FCoE) frames between the ports, the apparatus comprising:
a first port adapted to transmit and receive FIP and FCoE frames, a second port adapted to transmit and receive FIP and FCoE frames, a connectivity apparatus, the connectivity apparatus disposed between and coupled to the first port and the second port, the connectivity apparatus forwarding frames between the first and second ports, a destination Ethernet MAC address replacement apparatus, a source Ethernet MAC address replacement apparatus, a Ethernet Type field match apparatus, storage, the storage containing the FCoE Forwarder MAC (FCF-MAC) address from a FCoE device interconnection apparatus controller (FIAC), and a frame processing apparatus, the frame processing apparatus configured to identify one or more FCoE frames and signal the destination and source Ethernet MAC address replacement apparatus to replace the source and destination Ethernet MAC addresses in an incoming frame but maintaining the contents of the encapsulated Fibre Channel frame within the received FCoE frame, the frame processing apparatus further configured to identify FIP frames and forward the FIP frames and FCoE frames to the connectivity apparatus to be forwarded out an egress port.

7. The apparatus of claim 6 further including incoming frame field matching storage.

8. The apparatus of claim 7 wherein the incoming field matching storage utilizes one or more of the following; Fibre Channel address identifiers, MAC addresses, Virtual Local Area Network Identifiers, egress port and egress port group.

9. The apparatus of claim 6 wherein the source Ethernet MAC address replacement apparatus replaces an incoming frame source Ethernet MAC address with the MAC address in storage.

10. The apparatus of claim 6 wherein the frame processing apparatus is configured to forward the FCoE frames containing Fibre Channel Fabric Services destination address identifiers to the connectivity apparatus with the original source and destination Ethernet MAC addresses in a received FCoE frame.

11. The apparatus of claim 6 wherein the frame processing apparatus forwards the FIP frames with the destination Ethernet MAC address including one or more of the following: the group address for all ENodes (All-ENode MACs) and the group address for all FCoE devices (All-FCF-MAC) MAC addresses.

12. The apparatus of claim 6 further including a third port, the third port adapted to transmit and receive Fibre Channel frames, encapsulate Fibre Channel frames into FCoE frames before forwarding from the third port to the connectivity apparatus and decapsulate from FCoE frames into Fibre Channel frames for frames received from the connectivity apparatus.

13. A system for interconnecting Fibre Channel over Ethernet (FCoE) devices, comprising:

a first FCoE device, a second FCoE device, a FCoE device interconnection apparatus (FIA) including;

a first port adapted to transmit and receive Fibre Channel Initialization Protocol (FIP) and FCoE frames, the first FCoE device being coupled to the first port of the FIA, a second port adapted to transmit and receive FIP and FCoE frames, the second FCoE device being coupled to the second port of the FIA, a third port adapted to transmit and receive FIP, FCoE, and IP frames, a connectivity apparatus, the connectivity apparatus disposed between and coupled to the first, second and third ports, the connectivity apparatus forwarding Ethernet frames, a source Ethernet MAC address replacement apparatus, a destination Ethernet MAC address replacement apparatus, and a frame processing apparatus, the frame processing apparatus configured to identify FIP frames and forward the FIP frames to the connectivity apparatus with the original source and destination Ethernet MAC addresses, identify FCoE frames and signal the source and destination Ethernet MAC address replacement apparatus to replace the source and destination Ethernet MAC addresses but maintaining the contents of the encapsulated Fibre Channel frame within the received FCoE frame, and a FCoE device interconnection apparatus controller (FIAC) including a first port adapted to transmit and receive FIP, FCoE and IP frames, and the first port of the FIAC being coupled to the third port of the FIA.

14. The system of claim 13 wherein the source Ethernet MAC address replacement apparatus replaces the source Ethernet MAC address of incoming FCoE frames from a port with the Ethernet FCoE Forwarder MAC (FCF-MAC) address of the FIAC.

15. The system of claim 13 wherein a FIP frame is identified by the frame processing apparatus in the FIA, forwarded to the FIAC with the original source and destination Ethernet MAC addresses, the FIAC receiving and processing the FIP frame.

16. The system of claim 13 wherein a FCoE frame with an embedded Fibre Channel destination identifier of a Fabric Controller is identified by the frame processing apparatus in the FIA, the FCoE frame being forwarded to the FIAC with the original source and destination Ethernet MAC addresses, the FIAC receiving and processing the FCoE frame.

17. The system of claim 13 wherein a FCoE frame is identified by the frame processing apparatus in the FIA, the source Ethernet MAC address being replaced by the source Ethernet MAC address replacement apparatus, the destination Ethernet MAC address replaced by the destination Ethernet MAC address replacement apparatus, the resulting FCoE frame being transmitted out the second port to the second FCoE device.

18. The system of claim 13 wherein the FIA further includes a fourth port, the fourth port adapted to transmit and receive Fibre Channel frames, the fourth port coupled to the connectivity apparatus, a Fibre Channel device, the Fibre Channel device coupled to the fourth port.

19. The system of claim 13 wherein the FIA further includes a fourth and fifth port, the fourth and fifth ports adapted to transmit and receive Fibre Channel frames and coupled to the connectivity apparatus.

* * * * *